US012767292B2

(12) United States Patent
Paturu

(10) Patent No.: US 12,767,292 B2
(45) Date of Patent: Oct. 20, 2026

(54) GENEREL AND OFF SHORE FIRE ESCAPE DEVICES INCLUDING SINKING AND RISING OF A DETACHABLE ISLAND RIG

(71) Applicant: Sumathi Paturu, Huntsville, AL (US)

(72) Inventor: Sumathi Paturu, Huntsville, AL (US)

(73) Assignee: Sumathi Paturu, Huntsville, AL (US)

( * ) Notice: Subject to any disclaimer, the term of this patent is extended or adjusted under 35 U.S.C. 154(b) by 975 days.

(21) Appl. No.: 17/803,373

(22) Filed: Jun. 2, 2022

(65) Prior Publication Data

US 2023/0391434 A1 Dec. 7, 2023

(51) Int. Cl.

*B63B 23/30* (2006.01)
*A62B 3/00* (2006.01)
*B63B 35/44* (2006.01)
*B63C 9/04* (2006.01)
*B63C 9/22* (2006.01)

(52) U.S. Cl.

CPC .................. *B63C 9/22* (2013.01); *A62B 3/00* (2013.01); *B63B 35/44* (2013.01); *B63C 9/04* (2013.01)

(58) Field of Classification Search

CPC ......... B63B 23/30; B63B 29/02; B63B 35/44; B63B 2043/003; B63B 45/04; B63B 2713/00; E21B 41/0007; E21B 43/0122; G05D 1/0011; E02B 17/00; B63C 9/22; B63C 9/04; A62B 3/00

See application file for complete search history.

(56) References Cited

U.S. PATENT DOCUMENTS

| | | | | | |
|---|---|---|---|---|---|
| 4,356,789 | A * | 11/1982 | Hammett | E21B 41/0021 | 114/365 |
| 4,527,503 | A * | 7/1985 | Connelly | E21B 17/015 | 441/87 |
| 4,781,144 | A * | 11/1988 | O'Brien | B63B 23/32 | 182/47 |
| 4,861,299 | A * | 8/1989 | Ueberschaer | B63C 9/00 | 114/365 |
| 5,078,073 | A * | 1/1992 | Betz | B63B 23/60 | 114/379 |
| 5,597,335 | A * | 1/1997 | Woodland | B63B 7/082 | 114/348 |

(Continued)

*Primary Examiner* — Edwin J Toledo-Duran

(57) ABSTRACT

The invention encompasses fire-escape models of off-shore rigs with emphasis on a 'Detachable Island Rig' (DIR) with a bottom air capsule. The DIR unlocked from permanent underwater basement, is steered away upon a rig-fire, while also sinking and rising the unit controlling a fire. The basement's fire-escape for the crew with devised 'water-seal' also serves as fire-escape model for Jack-up rigs. Converging 'spray-walks' to a 'spray-room', 'water-tracks' with 'track-drives', or simpler 'spray-drives' are evacuation accessories. Other gas-fire protective measures include gas-chasing fans and pressured air-circuits, while canisters of soda lime absorb CO2 and CO. The wheeled 'life-boats' and 'lift-boats' are remotely let out boarded/un-boarded without collision injury. Strut-burlaps air-dropped from hovering cranes, drones or helicopters can smother a rig-fire. Countering devising for water-wind turbulences is herein actuated for floating rigs without legs. Vital needs like safe evacuation and fresh air supply are herein devised as affirmed provisions.

17 Claims, 16 Drawing Sheets

(56) References Cited

U.S. PATENT DOCUMENTS

Figure 1:
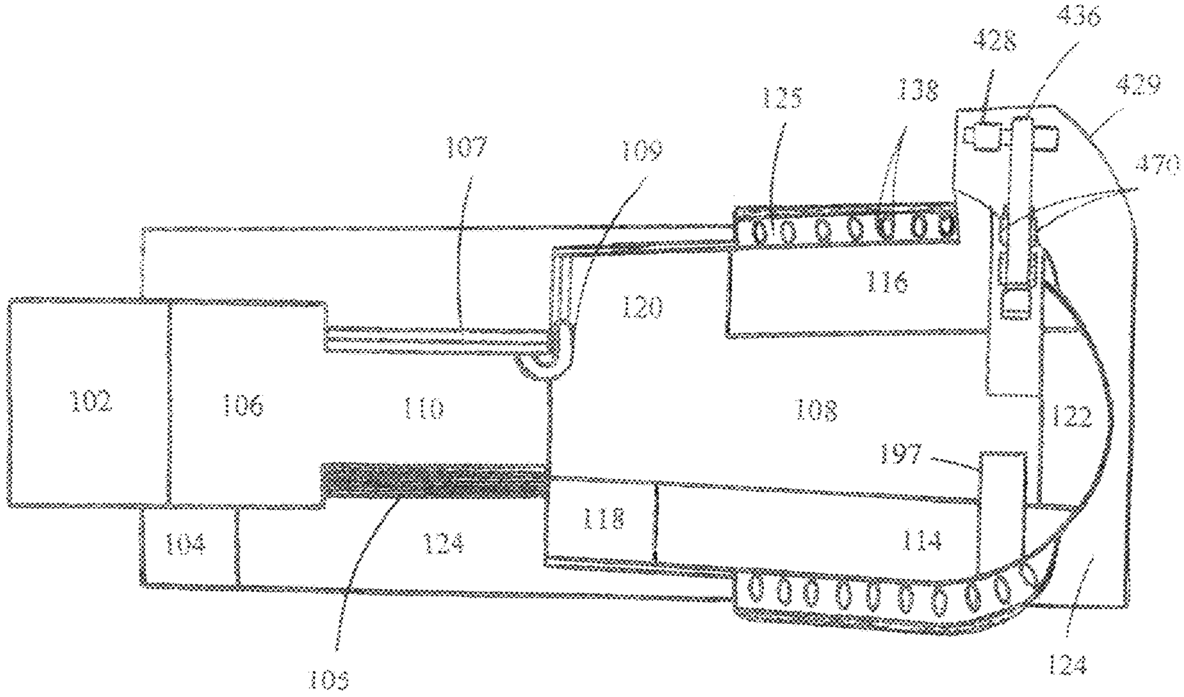

| | | | | | |
|---|---|---|---|---|---|
| 6,138,605 | A * | 10/2000 | O'Brien | B63B 23/32<br>182/213 |
| 6,510,808 | B1 * | 1/2003 | Tormålå et al. | B63B 35/4413<br>114/365 |
| 6,920,839 | B2 * | 7/2005 | Pelley | B63B 23/58<br>294/82.27 |
| 7,131,878 | B2 * | 11/2006 | Austevoll | B63C 9/26<br>114/365 |
| 7,223,142 | B1 * | 5/2007 | McDonough | B63C 9/26<br>441/83 |
| 8,347,804 | B2 * | 1/2013 | Van Loenhout | B63B 22/02<br>114/230.1 |
| 9,109,406 | B2 * | 8/2015 | Lammertink | E21B 19/002 |
| 9,884,669 | B2 * | 2/2018 | Paturu | B63B 23/30 |
| 10,807,681 | B2 * | 10/2020 | Paturu | B63B 29/02 |
| 2007/0051294 | A1 * | 3/2007 | Pike | B63G 8/001<br>114/348 |

* cited by examiner

GENEREL AND OFF SHORE FIRE ESCAPE DEVICES INCLUDING SINKING AND RISING OF A DETACHABLE ISLAND RIG

CROSS REFERENCE TO PRIOR APPLICATIONS

US PATENT NUMBER: U.S. Pat. No. 9,175,549; TITLE: EMERGENCY SALVAGE OF A CRUMBLED OCEANIC OIL WELL
FILING DATE: Jun. 6, 2011

US PATENT NUMBER: U.S. Pat. No. 9,884,669; TITLE: EMERGENCY DETACHABLE ISLAND RIG AND FIRE ESCAPE'
FILING DATE: Nov. 3, 2015

US PATENT NUMBER: U.S. Pat. No. 10,807,681; TITLE: FIRE ESCAPE DEVICES OF THE OFF SHORE RIGS WITH EMPHASIS ON A DETACHABLE ISLAND RIG
FILING DATE: May 25, 2017

US REISSUE APPLICATION: Ser. No. 16/974,265; TITLE: EMERGENCY FIRE ESCAPE DEVICES OF THE OFF SHORE RIGS WITH EMPHASIS ON A DETACHABLE ISLAND RIG
FILING DATE: Dec. 8, 2020

STATEMENT REGARDING FEDERALLY SPONSORED RESEARCH: NOT FEDERALLY SPONSORED

THERE WAS/IS NO JOINT RESEARCH AGREEMENT OF ANY TYPE.

This application claims the priority of the earlier domestic US applications as specified above.

BACKGROUND OF THE INVENTION

There are innumerable petroleum oil wells bored into the oceanic floor by highly evolved modern technological devices to tap the petroleum reservoirs. Oil is collected from the wells into surface tanks or into receptacles as large as ships. The drilling and production of petroleum oil from the earth's mantle is shrouded in danger and great hazard to the natural environment that includes marine life forms and the terrestrial ecosystem adjacent. The greatest hazard is the ignition of the entrained gases like Methane, causing dangerous fires, coupled with the risk of oil spewing and polluting the ocean waters. Such two man made calamities at the same time can be uncontrollable with available resources. For these reasons, error proof safety systems and highly trained personnel are required by law. Despite that, catastrophic events are still occurring, as the derived remedial measures through each unique adverse event experience are still nascent and less than perfect.

As any unforeseen adversity can happen at any time before the completion of the well to its last functional detail, safety measures to weather off such events have to be in place before beginning to venture such operation. This CIP application enumerates different fire escape devices of an off shore rig with emphasis on a Detachable Island Rig' (DIR). A contemporary U.S. Pat. No. 10,671,055 of the Inventor, titled as 'SUBSEA LEVEL DIVERSION OF A GAS ENTRAINMENT WITH INCORPORATED EMERGENCY MEASURES UPON A WELL BLOW OUT' and its continuation application to be soon filed and titled as 'WELL BORE TO OCEANIC DIVERSION OF A GAS ENTRAINMENT WITH PREVENTION OF A WELL BLOW OUT' have great bearing with regard to the counter measures encompassing a gas fueled rig fire. Without consulting and simultaneous implementing of their devised measures, the present invention can only be considered as incomplete.

Many inadvertent and unforeseen consequences were/are inherent to such ventures as the deep sea explorations shrouded in dangers and counting on tides of nature, yet to be conquered by the technological sophistication. Accordingly, the Author Inventor is neither personally responsible nor legally liable for any adverse events (involving the planetary ecology or its life forms), difficult to differentiate either as a mere association or as a consequence of the application of the structural and or procedural information herein enumerated. The structural and or procedural application of this disclosure in different situations, innumerable and unique, is a personal choice that involves analyzing and adapting swiftly to unforeseen situations which obviously is a responsibility discreetly and voluntarily undertaken by the involved company participating in the day to day practice of this invention, in part or as a whole, for which reason also the Inventor may not be held accountable.

BRIEF DESCRIPTION OF THE INVENTION

The invention delineates fire escape means of the off shore rigs. To achieve such means most effectively, emphasis is given to the evolving central theme, the 'Detachable Island Rig' (DIR) locked on a permanent 'under water basement', to be instantly detached upon a rig fire. With a designed 'water seal' about an 'in situ' fire escape entry of its basement, not destroyed upon a rig fire, it is devised as an exceptional fire escape model within the confines of a rig. An 'in site' under water fire escape entry is also herein devised with a 'water seal', for the most prevalent Jack up rigs with no provisions for an under water basement. A fire escape refuge devised as an 'off site' modular for all rig types as also the DIR, is a guarded vital source of unlimited fresh air supply upon a rig fire.

The disclosure envisions life boats and lift boats with train wagon wheels, to be lowered by remote control into the ocean waters under fire safe provisions, the boats further safe guarded against collision injury. It further enumerates fire safe means of: 'Spray Walks'; 'Water Tracks' with 'Track-Drives'; or else simpler means of 'Spray Drives'—as, at least one among these being suitably operable about any rig setting, new or old, as also about any catastrophic event and its consequences, to safely lead the crew to the destination of the fire escape entry structured within an eminently safe guarded 'spray room', the latter easily built in all types of off shore rigs.

With many a prototypes herein enumerated, the sought after vital needs (like safe evacuation, fresh air, protection from smoke and poisonous gases from early on, and rescuing the injured with no further injury), thus far elusive, and feared for the lack thereof, are yet herein accomplished with ease and affirmation.

Based on the cost and the mortality involved, a major part of the rig needs to be constructed as a detachable island from the permanent base and the conductor platform, the latter the inciting venue of a rig fire. This disclosure details how a DIR upon a rig fire is sunken into the ocean waters to put off the fire, and then be risen to the surface, for an unfailing ceasefire and salvage of an expensive rig.

DRAWINGS

FIG. 1: A schematic diagram of a workable outline of an Emergency Detachable Island Rig.

Figure 2A:
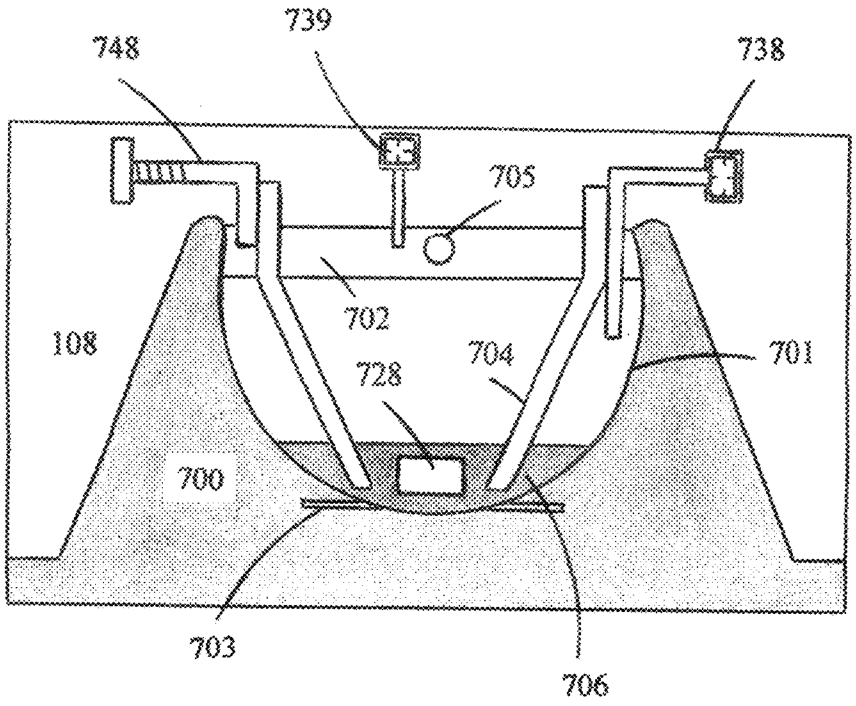
Figure 2B:
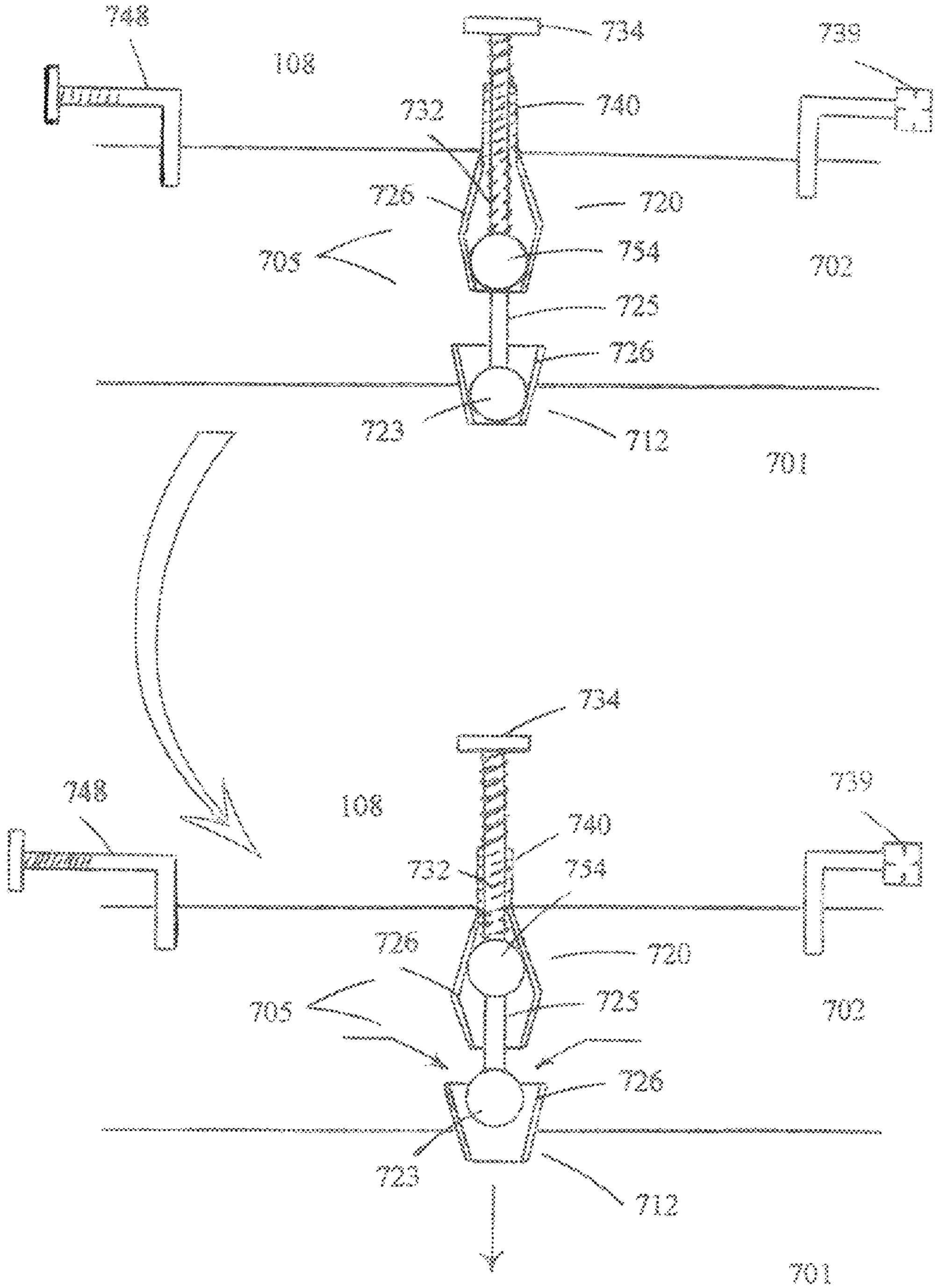

FIG. 2 A: A schematic diagram of a devised bottom air capsule of a Detachable Island Rig incorporating a pressured air chamber and water-inlet/air-outlet windows.

FIG. 2 B: A schematic of a pressured air chamber of a bottom air capsule of a Detachable Island Rig incorporating a manually operable Basket and Sphere model of one way air flow valve.

Figure 3:
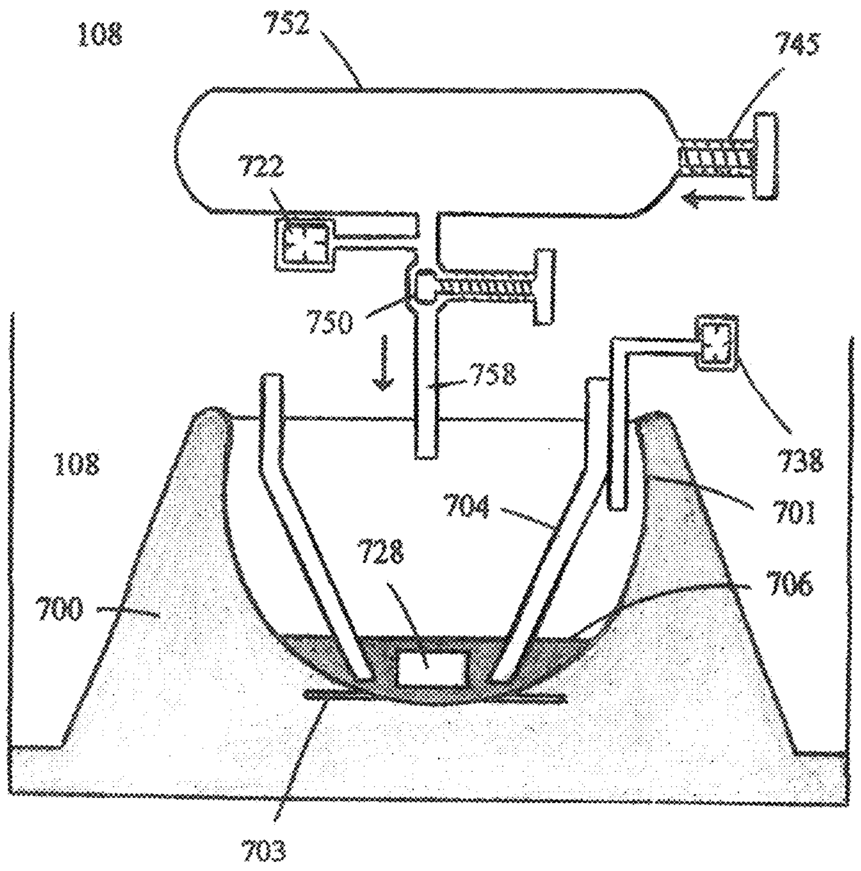

FIG. 3: A schematic of a pressured air cylinder with a one way air flow valve about an air inlet tubing entering a bottom air capsule of a Detachable Island Rig.

Figure 4:
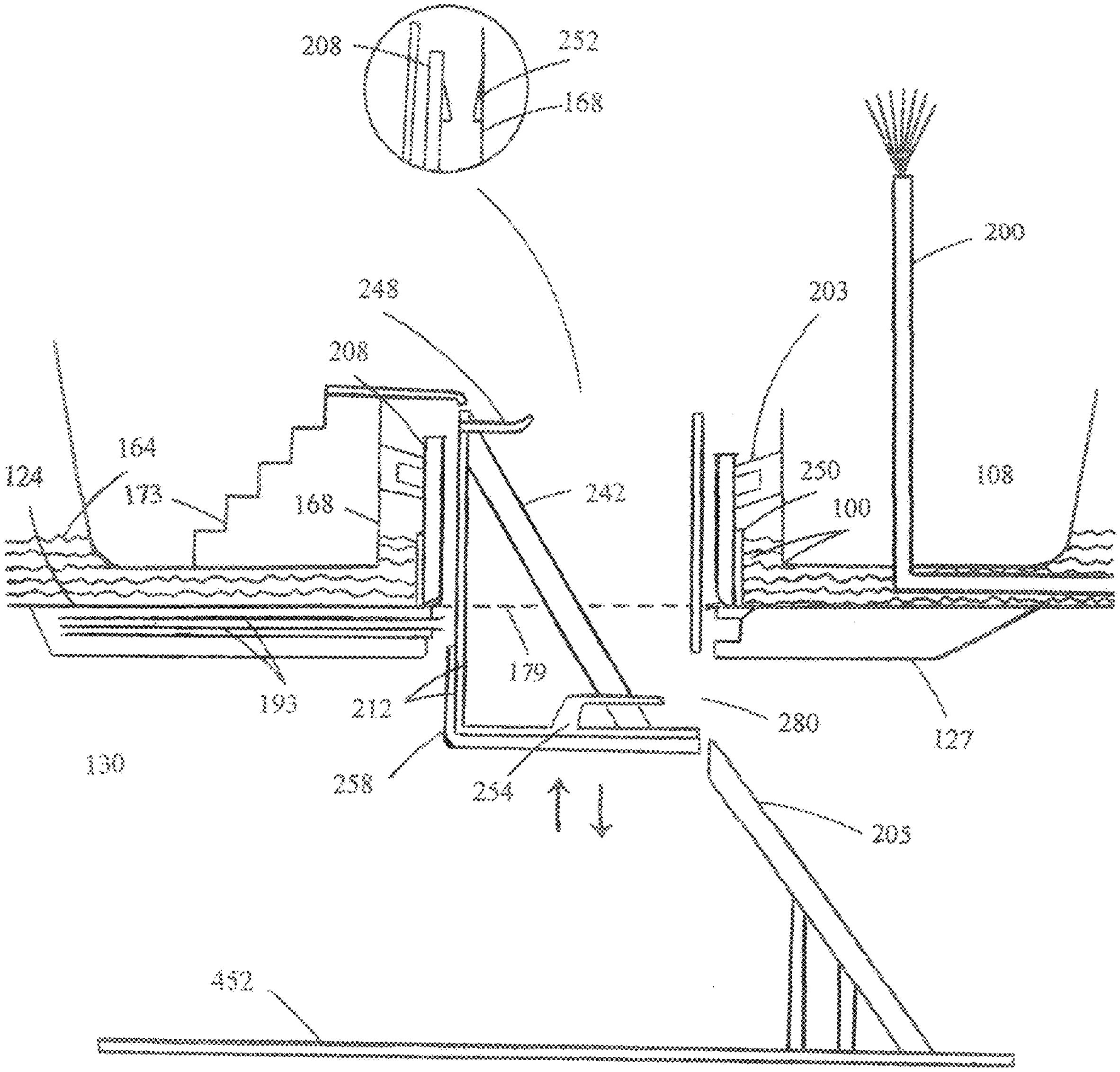

FIG. 4: A schematic of an 'in situ' emergency basement entry of a Detachable Island Rig, devised as a moving carrier model of fire escape, the fire escape entry water sealed upon a rig fire.

Figure 5:
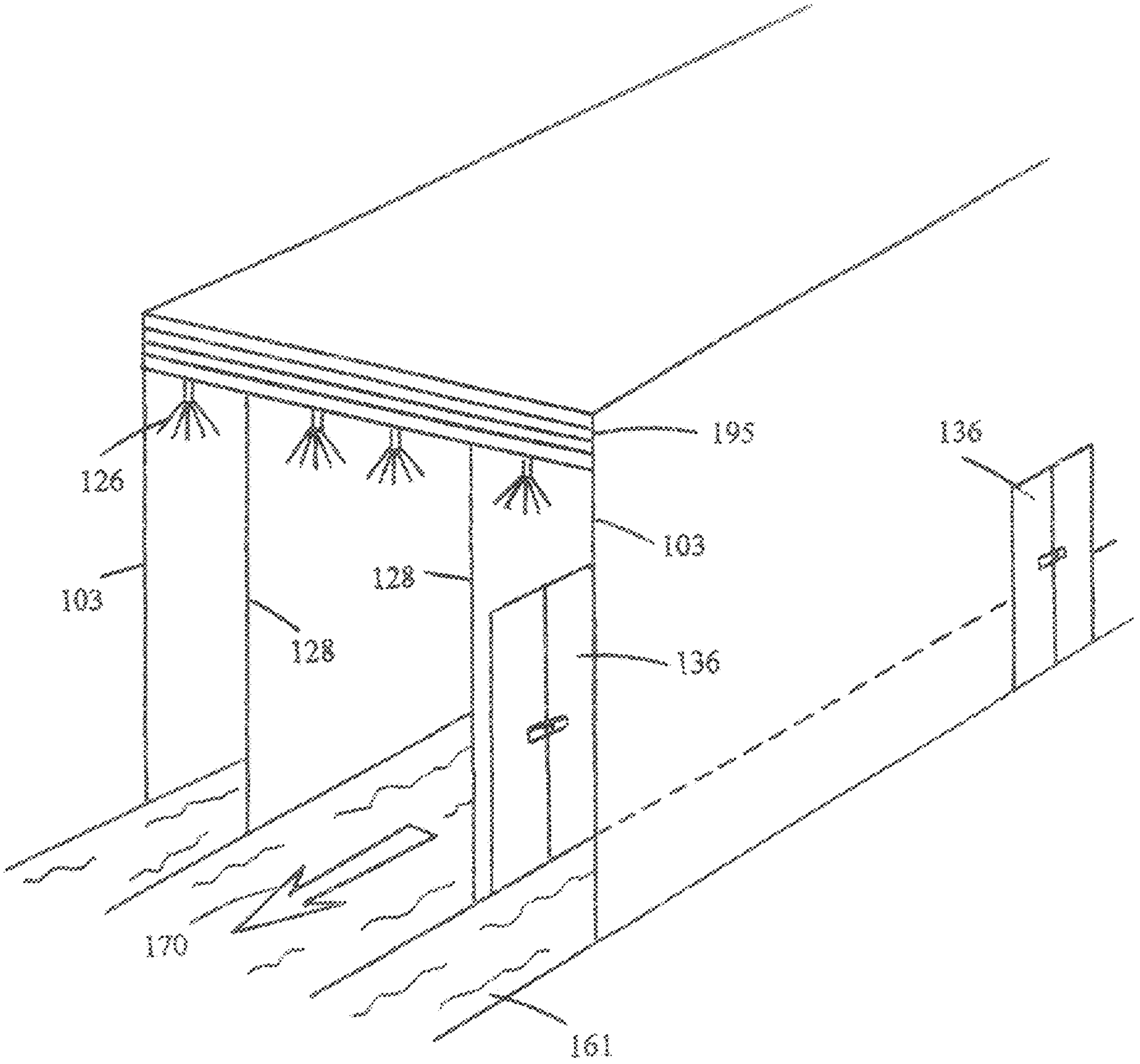

FIG. 5: A schematic of the devised Spray walks in the off shore rigs.

Figure 6:
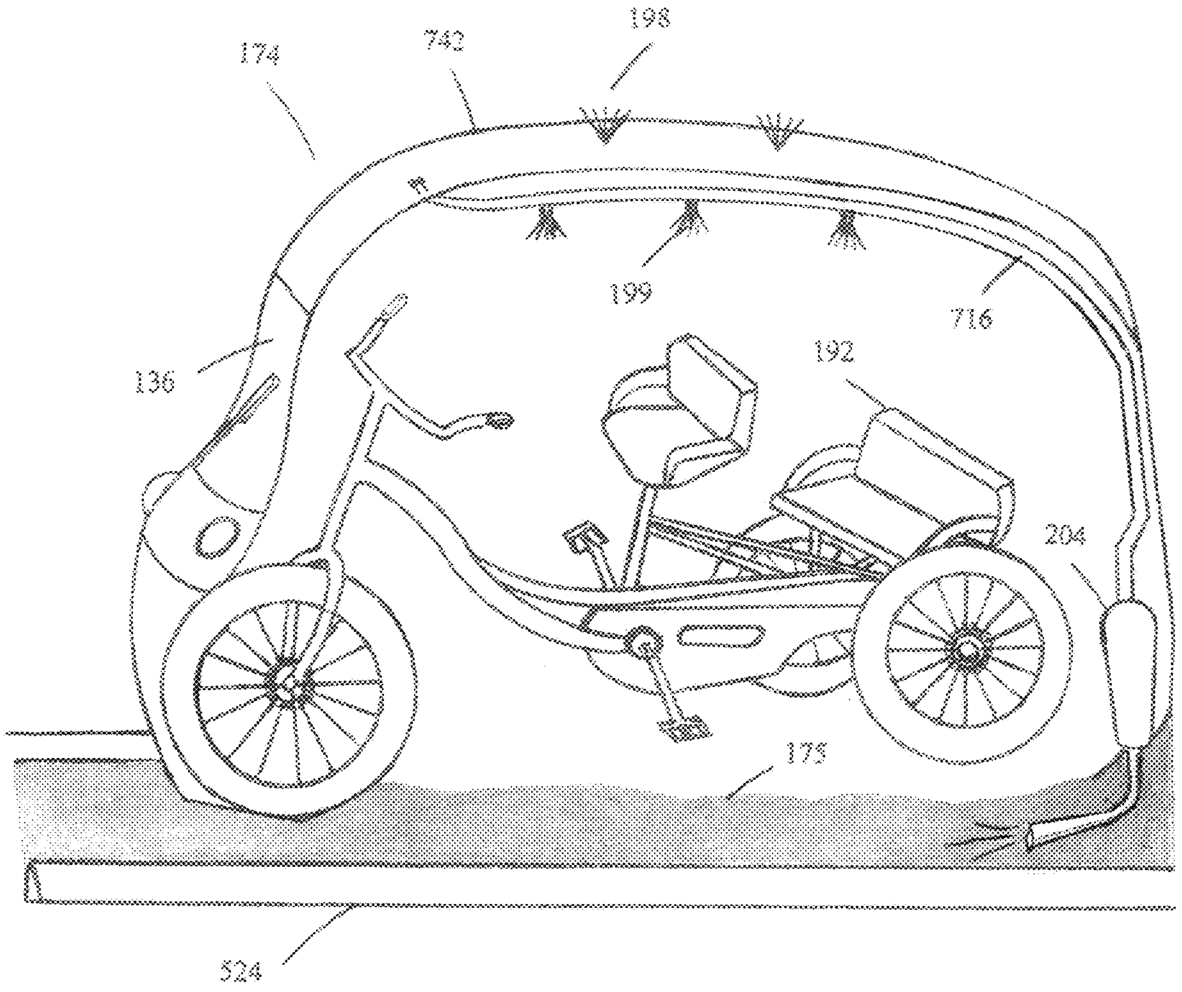

FIG. 6: A schematic of the devised Water tracks and Track Drives in the off shore rigs.

Figure 7:
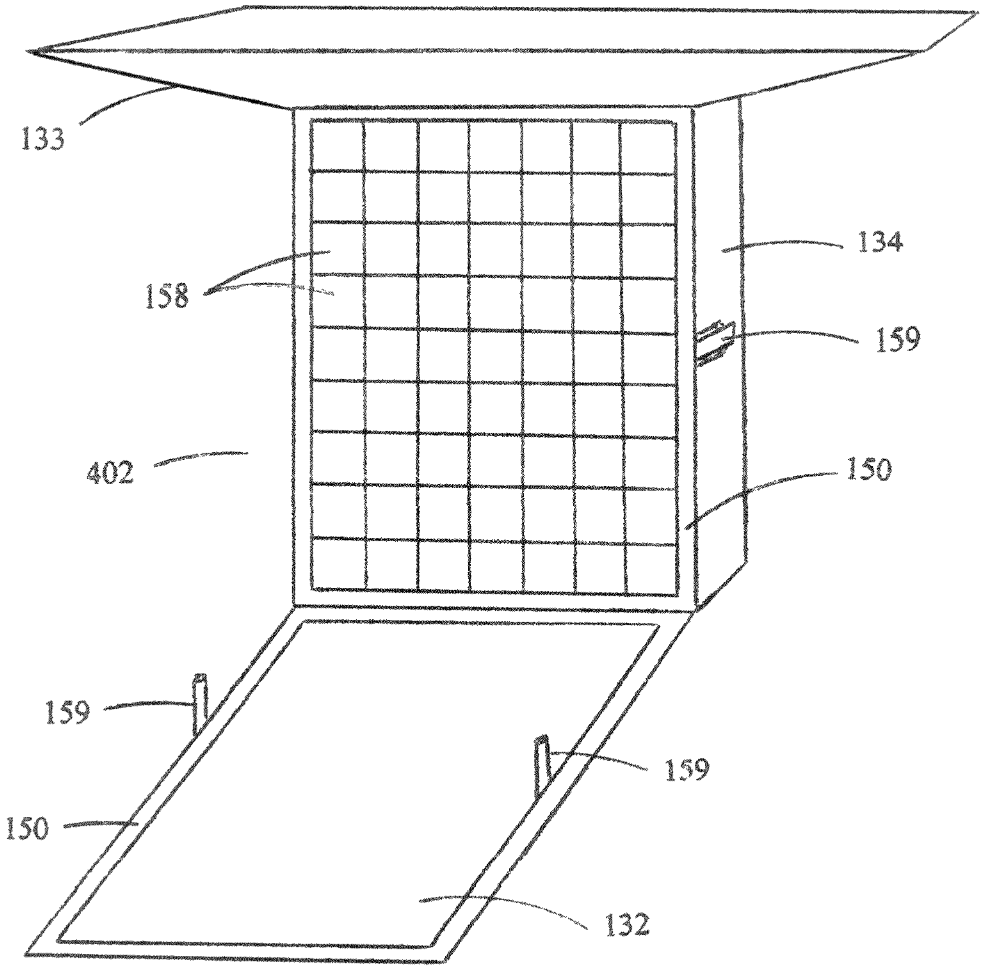

FIG. 7: A schematic of the devised large size canisters positioned in strategic places about a rig, to absorb carbon dioxide and carbon monoxide emissions upon a rig fire, the illustration depicting sealed as well as unsealed canisters.

Figure 8:
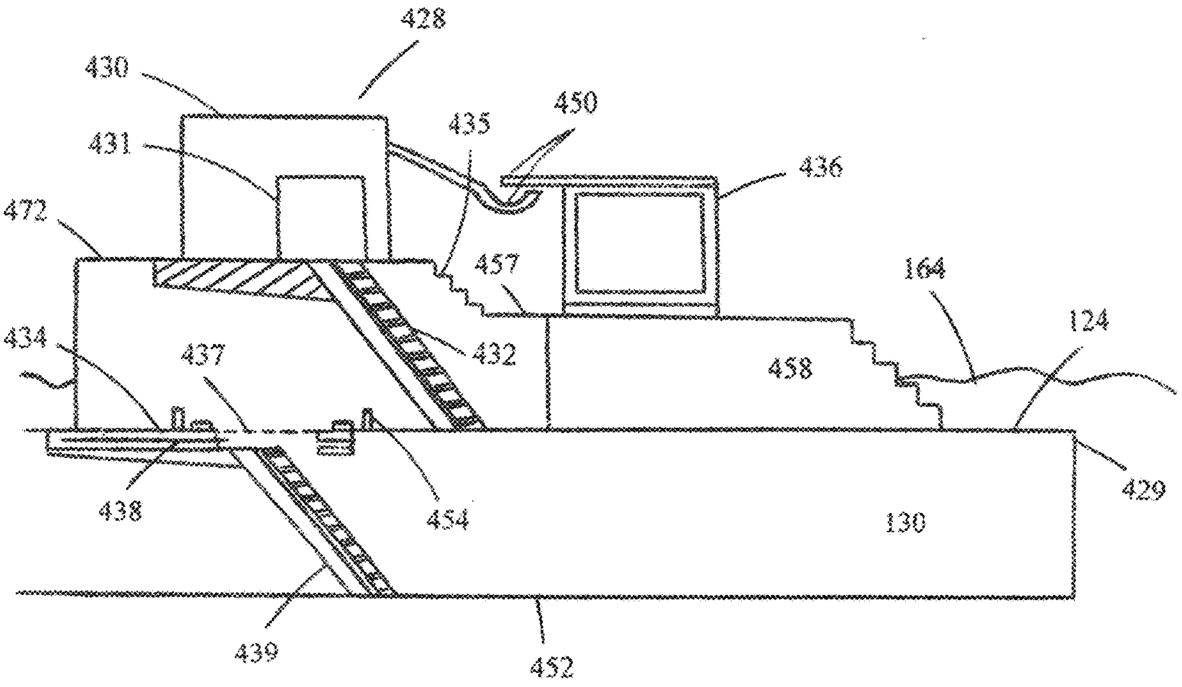

FIG. 8: A schematic of a basement access devised for a general purpose entry about a Detachable Island Rig, the general purpose entry model accessed via a truck crane, and is also devised to be water sealed upon a rig fire.

Figure 9:
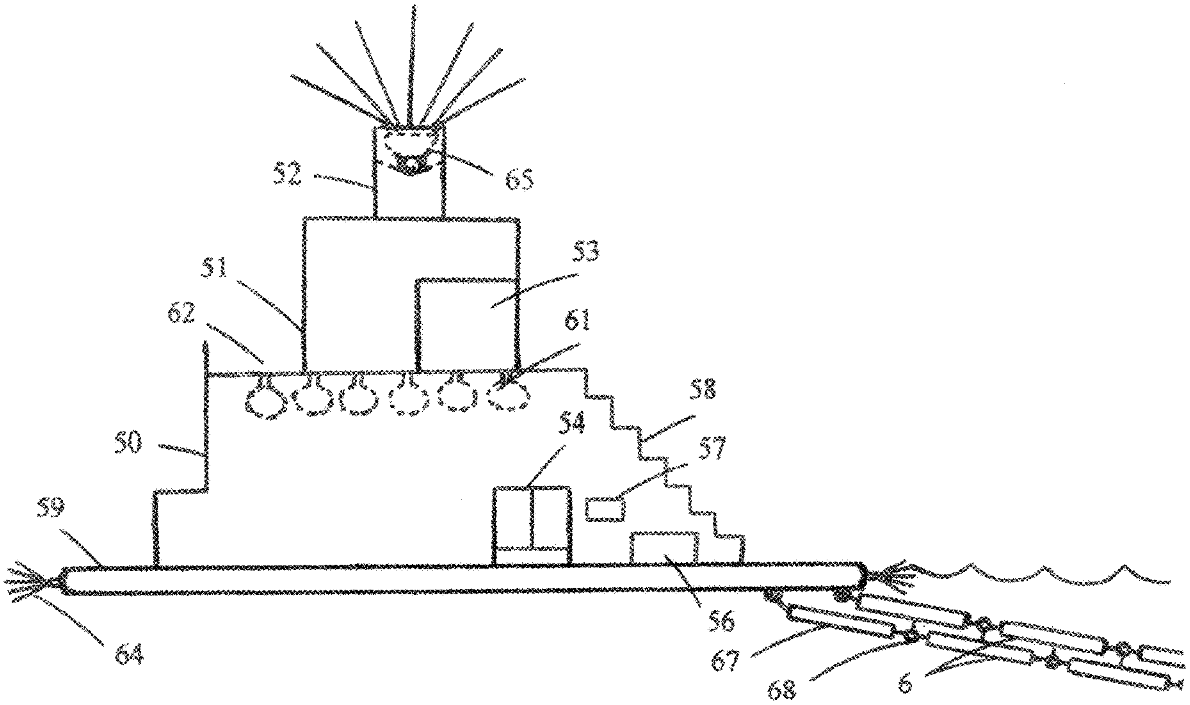

FIG. 9: A schematic of an 'off site' fire escape modular, a fire escape refuge to all off shore rigs.

Figure 10:
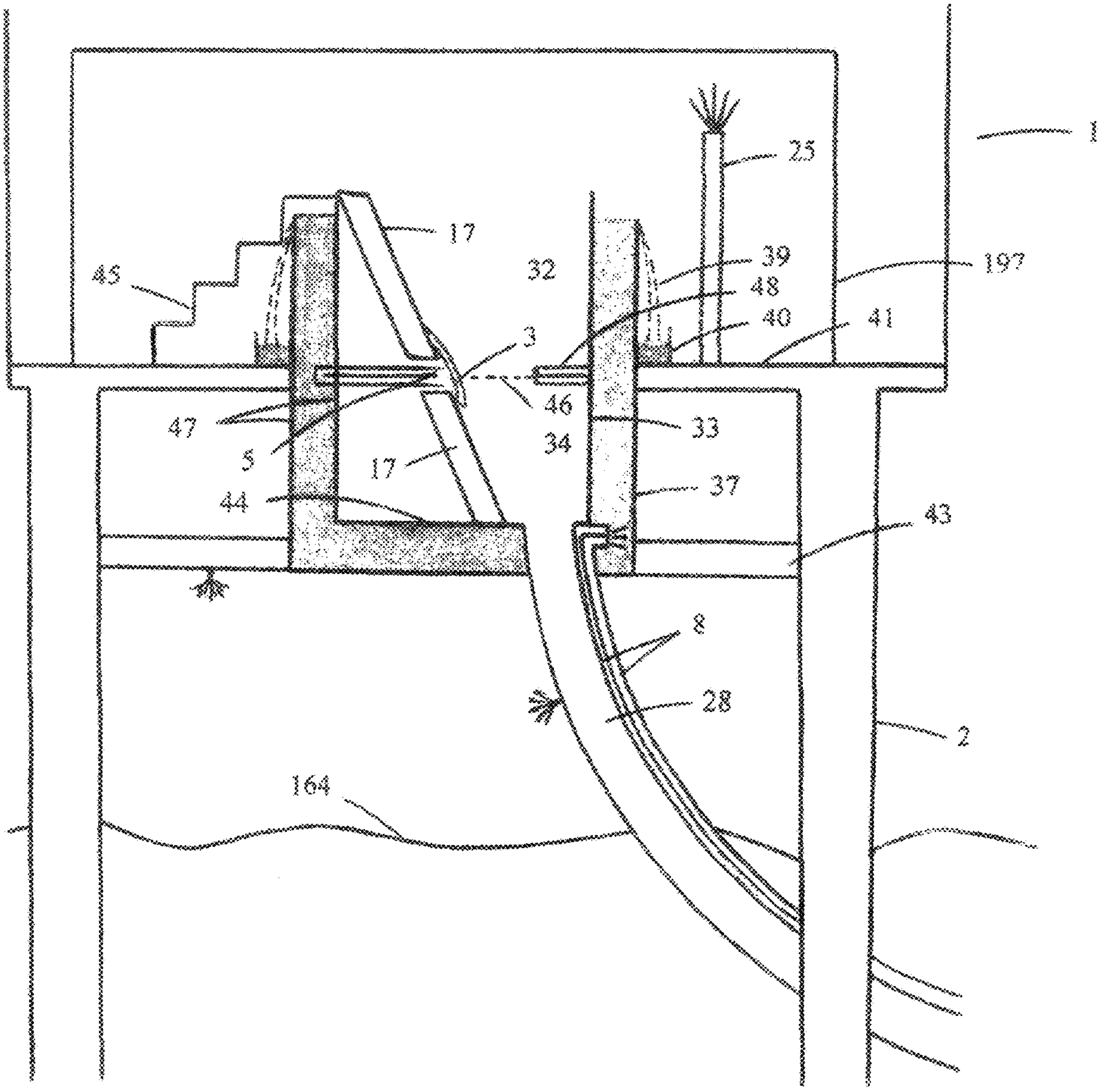

FIG. 10: A schematic of a devised 'in situ' fire escape entry within a commonly prevalent Jack-up rig, the fire escape entry devised to be water sealed upon a rig fire.

Figure 11:
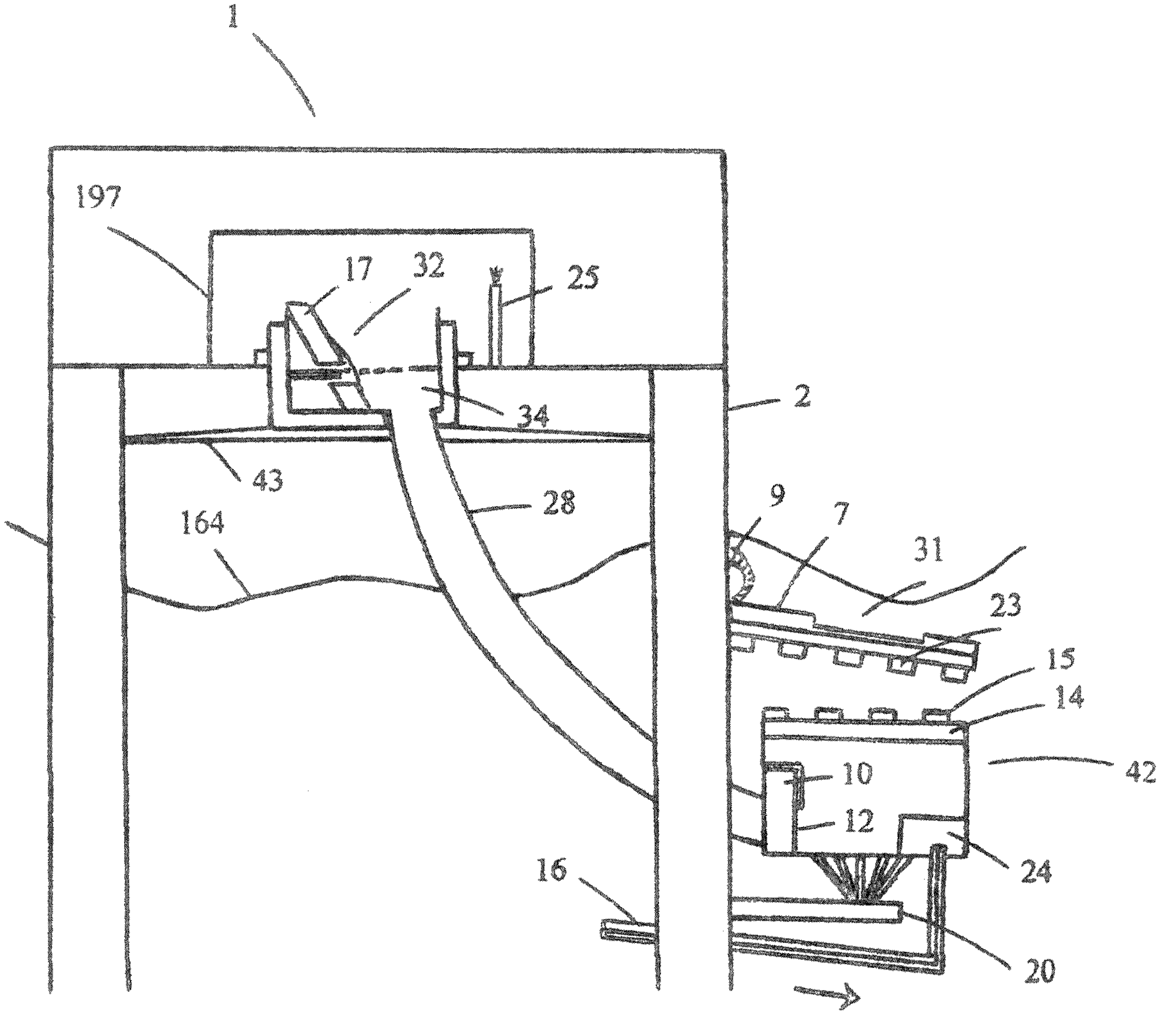

FIG. 11: A schematic of an 'in site' under water fire escape modular attached to a Jack up rig.

Figure 12:
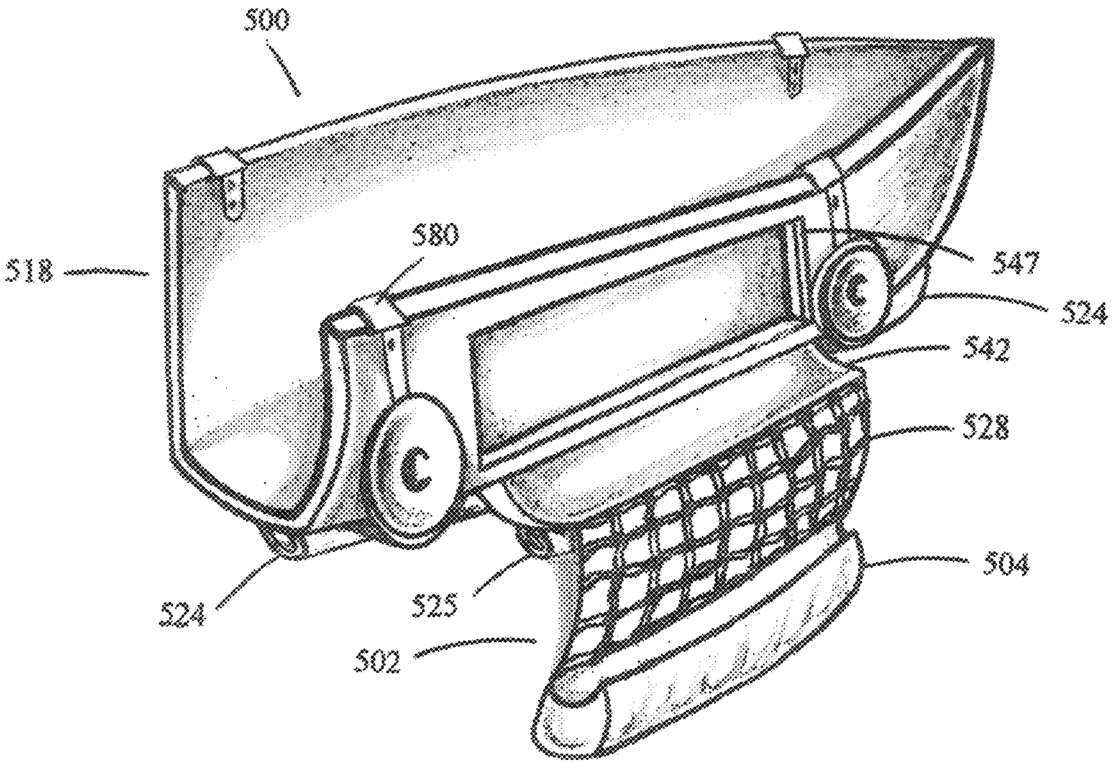

FIG. 12: A schematic vertical cut section-in-part diagram of a Hammock design lift boat in an off shore rig.

Figure 13:
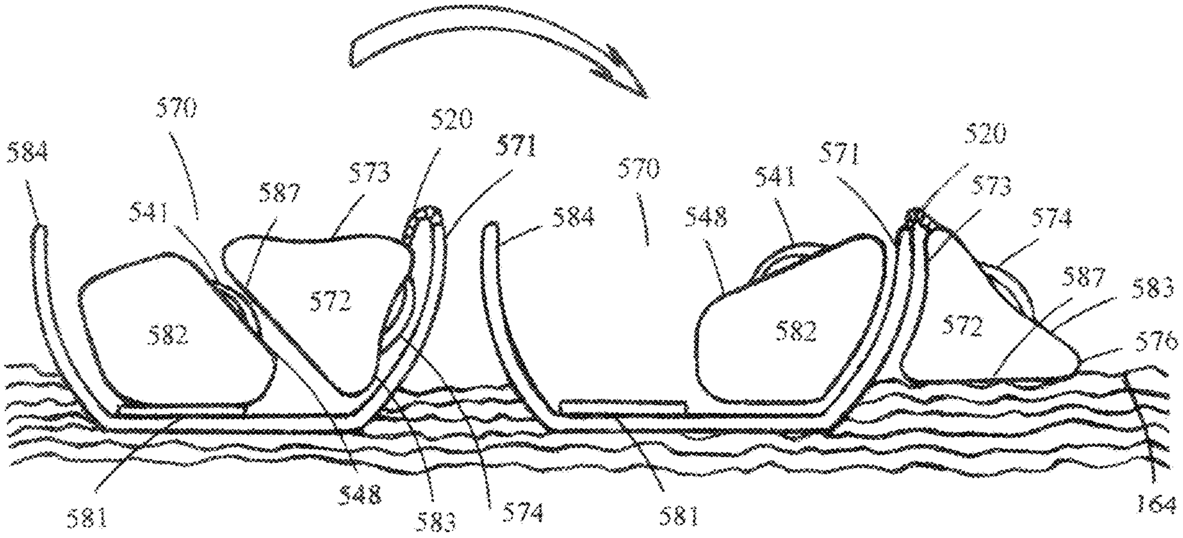

FIG. 13: A schematic end-on vertical cut section diagram of a lift boat in an off shore rig. devised in the model of an inflated lift mattress.

Figure 14A:
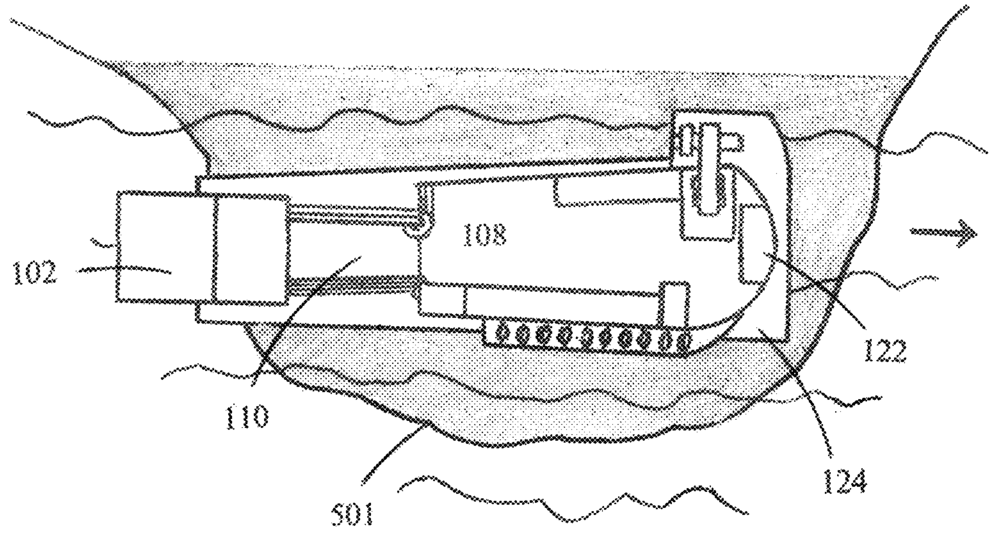
Figure 14B:
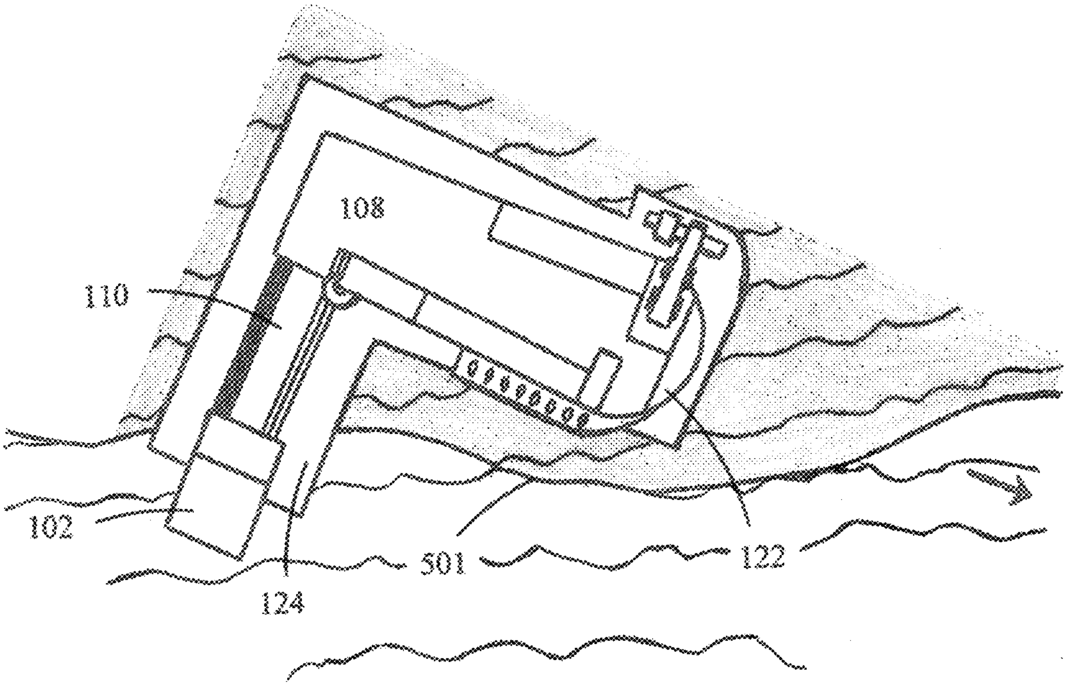

FIG. 14 A: A schematic of a Detachable Island Rig structured in a stump like projectile coast line of a natural island.

FIG. 14 B: A schematic of a Detachable Island Rig about a linear coast line of a natural island.

Figure 15:
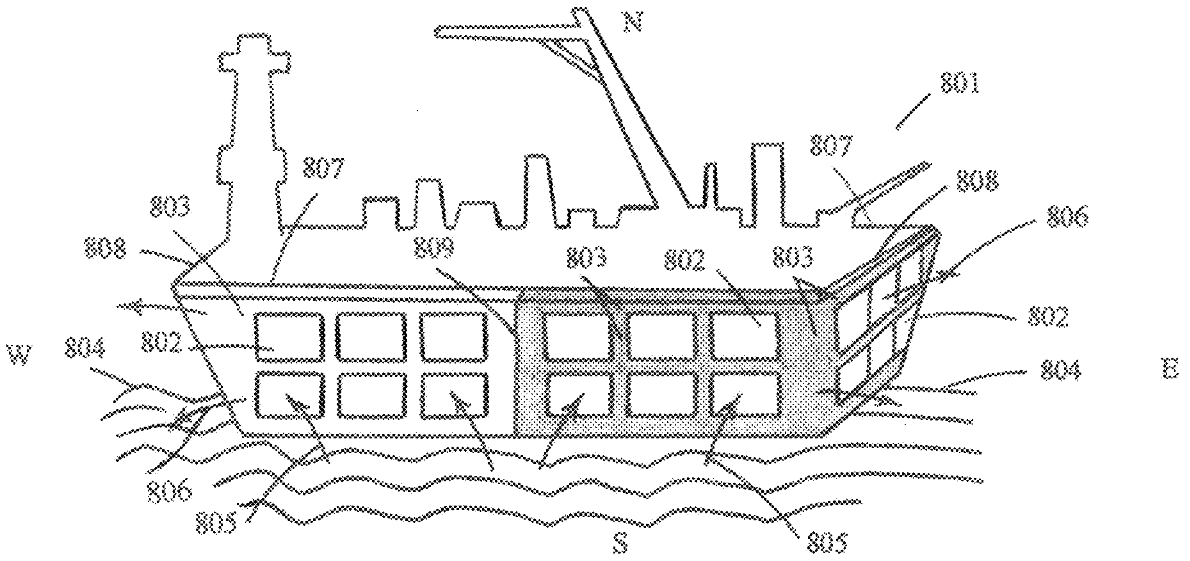

FIG. 15: A schematic of a turbulent water-wind shifting devising in a floating DIR without legs.

Figure 16:
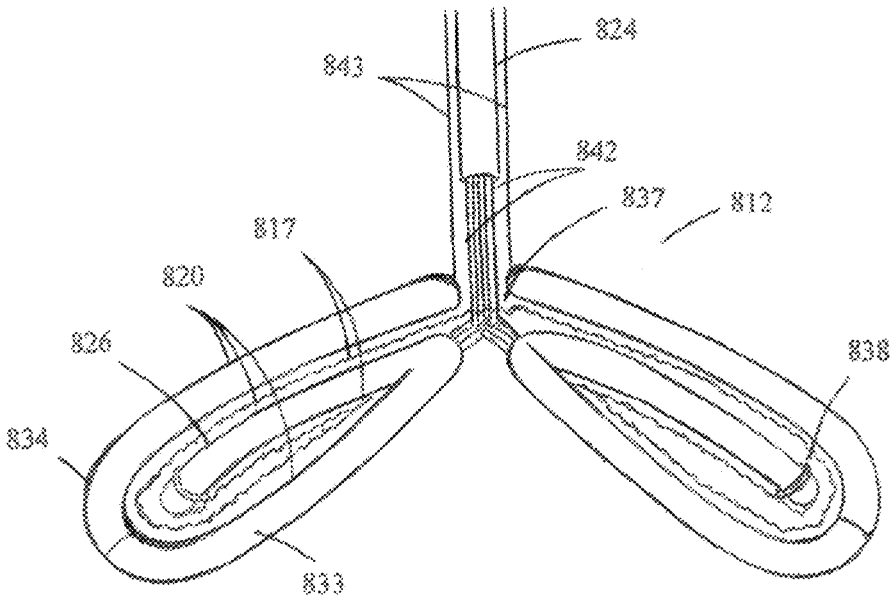

FIG. 16 A: A schematic of a strut burlap actuated into sac like configuration, the strut burlap devised for air-drop over a fire zone; FIG. 16 B: A schematic of a Fly-craft carrying a stack of flat strut burlaps for an air-drop over a fire zone; FIG. 16 C: A schematic of two fly-crafts on the left carrying a large burlap spool for an air drop over a wild fire also a large textile sheath with a bottom gas-sac is shown on the right for an air-drop by four fly-crafts about the corners; FIG. 16-D: A schematic of a crane terminal devised for air-drop of strut burlap sacs over a fire affected area; an inset shows an extension rod that can extend forwards as also can retract backwards into a passage tubing of the crane terminal, the rod also devised for a horizontal arc movement about its hinge joint; FIG. 16 E: A Schematic of tongs-like top terminal of the pole(s) erected in the water rely station(s) in the setting of the wild fires, the poles facilitating an aerial positioning of the water hose-hydrogen tubing, to effectuate water transfer from a distant source to the fire site 1.

DETAILED DESCRIPTION OF THE INVENTION

The invention directed to fire escape models of off shore rigs envisions an unique model of an emergency 'Detachable Island Rig' (DIR), the latter to be steered away by its designated crew upon an ignition fire initiated in the stationary rig, thereby salvaging the working amenities. The rig's permanent under water basement with a devised 'water seal', not to be destroyed upon a rig fire, is an instant fire escape for the rest of the crew. Additionally, its prototype 'water seal' serves as an imitable though not identical schematic of 'water sealed' fire escape for non detachable rigs like the conventional Jack up rigs, the latter not amenable for an underwater basement.

It is a modern day irony that a rig fire is the greatest unsolved concern for the off shore rigs, amidst ocean size of water. Probing into the historical events is herein warranted to delineate the problem and design a solution that must be 'as a whole inquiry'. The most recent calamity of well blow out in US territorial waters involving BP oil well happened before the 'Production Tubing' and the 'Production Packer' were installed, wherein the wide production casing acted as a tunnel for the gusher. The oceanic water in turn quickly found its way into the oil containment through the expansive production casement. It was worse due to the absence of the down hole safety valve (DHSV) usually placed in the 'Production Tubing' (the valve being the last resort to contain the leak from a disrupted well) as far below the surface as deemed safe, to be unaffected by a wipe out of the surface well head platform. In such instances of an uninstalled 'production tubing', yet, the well should have a protective provision, to let any pressured emanations to pass through a 'Gas Entrainment Diversion Tubing' (GDT) as described in the contemporary application of the Inventor, titled as—'Well Bore to Oceanic Diversion of a Gas Entrainment with Prevention of a Well Blow Out', the latter describing diversion and dissipation of an immensely pressured giant gas entrainment from the well bore itself. If that fails to contain wholly, and part of the gas entrainment reaches the rig exploding into a rig-fire, the giant entrainment being reduced to a manageable size, the fire will not last incessantly feeding upon itself, as was the recent event in the gulf shores. The DIR must be steered away by the steering crew from the source of continued danger. All the unfailing measures herein put together should minimize the fire, as also the rest of the crew emergently gets into the underwater refuge of the rig. In a desolate oceanic habitat with limited off shore provisions, simpler the means are, lesser are the 'difficult to circumvent' situations—a pervasive notion that herein resonates and is deemed to succeed, mostly as preventive measures as also as instant countering responses.

In prevailing oceanic climate of the oil wells, after a bore well structure is disrupted, the oceanic water continuously gets into the oil well and therefrom into the oil containment, progressively raising its pressure. As the ocean water fills in the oil containment, the oil rises to the surface, because of the relative densities of the two liquid bodies concerned, contributing to the spewing gush at a later time, while it would be a mere spill to start with. Accordingly, it is imperative that immediate action be taken to stop the ocean waters pouring into the oil containment, thereby breaking a brewing cycle. It is also obvious that the preservation of a functional rig (which is possible with a DIR) is imperative for the needed emergency measures to plug the well leak at the earliest instance (as described in the Inventor's U.S. Pat. No. 9,175,549) when it is merely a spill, but a formidable task at a later time.

Ground stability can be a factor in opting for a permanent rig base. In the model herein described, the detachable island rig is an immovable structure with ground stability, yet with a provision to steer away from the base and adjacent conduction plat form (a site of the initial fire). In view of the crew, the ultimate destruction in the Deep Water Horizon Oil Well explosion is terrifying and demoralizing. What ever can be salvaged should be salvaged including all personnel in one pack, working to distance from the source of fire, that soon may turn into a raging inferno. The following details are more than an introduction about the scope of the devised DIR, so that its incorporation into a rig can be affirmatively contemplated for what can be stated as its best assets—the ability to serve as an 'in situ' fire escape that is water sealed upon a rig fire, and the ability to be sunken into nearby superficial ocean waters to put off an uncontrollable fire, and be risen soon after.

The Schematic of a Detachable Island Rig

FIG. 1, not drawn to scale, shows a schematic outline of an oceanic rig that incorporates a Detachable Island Rig (DIR) in its structuring. The FIG. 1 schematic only shows a possible plan of the DIR and does not represent the operative configuration, exact dimensions, or the true shapes of the individual units, as it is only intended to show a workable outline by which the detachment of the DIR 108 is easily accomplished, and how the structural arrangement should be geared towards that goal. On one end of the rig is a conduction platform 102 that includes an appendage of fire station 104 (with its assigned crew). An adjacent segment 106 stations structures for the immediate operations of the conduction platform 102, the segment 106 connected to the DIR 108 by a stretch of fire resistant corridor 110 that is sufficiently long. The foregoing structures numbered as 102, 104, 106 and 110 are the rig's permanent stationary base structures. As in FIG. 1, the depicted tubing 107 and electrical wiring 105 running to the DIR traverse on either side of the corridor 110. The metal tubing 107 are substituted by short segments of rubber tubing 109 at the junction of the corridor 110 and the DIR 108. The DIR detachable from the fire resistant corridor houses costly and heavy equipment, needed daily supplies, work area 114 (having remote controls to the conduction platform 102, well head, and functional and security devices), living quarters 116, a security monitoring and response station 120, and a spray room 197 containing the fire escape entry to the basement. The DIR 108 also accommodates a fire station 118 with its own crew, and a steering station 122 (located at the opposite end of the conduction platform 102), with a powerful engine, its design similar to a small ship in its scope of operations. The devised distancing of the DIR 108 through the stretch of the fire resistant corridor 110 gives few minutes time for the DIR 108 to be prepared to steer away from the inciting area of danger.

The DIR 108 as a whole is on a concrete/steel roof platform 124 of a basement, the latter submerged totally in water, and designed as a permanent base configured on structures (legs) erected from the sea floor. Being reversibly locked to said stationary platform 124, the DIR is partially submerged. The areas represented by the numerals 102, 104, 106, and 110 are located at a higher level (as the DIR's open platform itself) over the basement's roof, whereas there can be variable structures about the bottom level of the DIR, one herein relevant structure being a centrally located wide spread metal block of air capsule (to be further detailed) as also the emergency fire escape entry way to the basement. Its structural components also include the locking equipment to the basement roof structures, the former being similar to the locking of a car door (in a magnified size with an allowance for imprecision), wherein the locking is accomplished by remote controls. These multiple locks are located on both sides of the DIR nearer to its bottom, whereas the complimentary components of the basement roof have risen above by stout appended structure.

In the foregoing paragraph it was mentioned that the areas represented by the numerals 102, 104, 106, and 110 are located at a higher level over the basement's roof, and it is important, as obviously the conduction platform 102 should be much higher than the surface waters. Additionally, if there is a well head blow out involving the marine riser the water enters into the riser pipe wherein the level of water equalizes with the level of the ocean water, and if there is a rise in ocean tide, can flood the areas represented by the numerals 102, 104, 106, and 110 if they are not in a sufficiently higher level.

The fire resistant corridor 110 is connected to the DIR by a short watertight detachable bridging walkway (not shown in the FIG. 1), and it is shut off on the side of the corridor 110 by a water tight closure when the DIR needs to be detached, as the DIR's own watertight closure is also shut off. It can be compared to the arrangement of passenger entry way of an aero-plane being detached from the passenger walkway of the airport terminal before its take-off. High caliber sprinklers of the closure of the DIR and the closure of the permanent base are activated about the same time as of their closure, while the rest of the sprinklers were already activated upon a fire alarm.

It should not be a concern that the open working platforms of the DIR 108 may be drenched by giant waves. As in a ship, such open platforms are sufficiently high from the ocean surface, and they get wet only as much as a ship gets wet. The platform can be made as high as desired, but such height also dictating the distance away from the basement's fire escape entry, to be traversed during an emergency, which however can be amicably planned, as is outlined later. Such height also gives needed space to accommodate the DIR's bottom metal block of air capsule. The rig about its periphery may have weather resistant plastic shielding with metal support rods in equidistance, inclined towards the ocean. The shielding can have zippered windows, kept open for a fresh breeze. They are of minimal investment, but offer the highly desired work area cleanliness and comfort. If subject to fire, being inclined towards the ocean, the burnt plastic shielding will drop into the ocean.

The Bottom Block of Air Capsule

The DIR 108 demands reversible measures to overcome its buoyant forces for a later submersion, for example, as when the steered away DIR returns to be stationed on the base platform 124. To that effect, the geometrical center of the DIR bottom comprises a symmetrically built room size air capsule. The air capsule, dipping into the ocean waters, imparts great buoyant effect to the unit. The part comprising the air capsule is structured like a 'spray room' (wide infra) spraying cold water, wherein the sprinklers are automatically activated upon a fire alarm, so that the air capsule is not exposed to high temperatures upon a rig fire. By virtue of the devised reversible buoyant forces, sinking the unit also serves as the means to control an otherwise uncontrollable fire. A bottom water proof annex of the steering station 122 that is connected to the rooming station of the air capsule, is securely protected, being away from the conduction platform, for the crew in a diving mode, to perform the needed operations of the DIR submersion, whereas the SCUBA (Self Contained Under water Breathing Apparatus) devices are brought out only about the time of DIR submersion.

The structural/functional details of the air capsule—the FIG. 2 A shows the schematic of a workable plan encompassing the air capsule, not drawn to scale, wherein the convexity of a hemispherical air capsule 701, made of PVC, is shown facing the ocean 700, and is designed to be occupying an approximate geometrical center of the DIR bottom. It can be shaped like a hemi structure of an ovoid capsule also, to conform to a rectangular shape of the DIR, yet configured to be geometrically centered. The inverted domed configuration maximizes the exposure of the air capsule to the ocean waters, the shape also letting the water into the air capsule in a controlled symmetrical manner preventing undue tilting of the sinking unit to any one side that may otherwise cause jolting of the larger structures. A set of four water let-in windows 728 situated about the bottom of the air capsule, in circumferential equidistance and operated by remote/manual control, can instantly effectuate its function without any pressure controlled valves. All or few of the water let-in windows 728 are opened, for an emergent or non-emergent sinking of the DIR, as also to control the needed depth of the sinking. As ocean water 700 flows in, the air is simultaneously let out from the air capsule 701 through the same windows 728. When sole manual operation is elected, four divers can also open the locked windows 728 of the air capsule from outside to let in water, and to that effect, the exterior of the air capsule is set forth with stand-on platforms 703 and grab bars about these sites. As a communication to the divers from the steering crew when the DIR had sunken to a desired depth, a red light blinks outside above the windows 728, so that the window doors can be closed.

About the top of the air capsule 701, a pressured (compressed) air chamber (PAC) 702 with a manually operable one way valve 705 directs the air flow to the capsular interior. The manually operable air flow valve is reliable, being devised to be securely air tight. Though the air capsule 701 is constructed in PVC (polyvinyl chloride) to be economical, it is a wise option that the PAC 702 is devised in metal, to contain the pressured air, wherein a pressure gauge 739 to measure the needed pressure, is also provided. An air filler 748 with a threaded-in massive cap, both in metal, aid filling the PAC 702. In circumferential equidistance, large suction tubes 704, at least four in number, dip from the roof/top of the air capsule into the bottom, to facilitate suctioning out of the water 706 from the bottom. Contrary to the drawing, the suction tubes 704 can also run along the walls of the capsule 701, a configuration that adds strength to the tubing. Few video devices to cover all areas, a pressure gauge 738, and brightly lit lights, aid monitoring the capsular interior. For mending operational failure, divers can get into the capsule at any time, as the functional conditions of all the windows (especially their water/air tight sealing) and the suction devices 704 are periodically checked while the DIR is locked onto its base. Bridging structures joining opposite sides, four stand-on platforms to stand near the water let-in windows 728, grab-bars on the walls about the windows 728, are the needed accessories for a stable disposition of the divers on a sloping milieu of the capsular interior. The windows 728 and the air flow valve 705 have rubber edgings to have washer like air tight effect. The one way valve 705 of the PAC 702, manually operable from the rig 108, prevents air flow into the rig 108 but allows it into the air capsule 701.

Two compressed air chamber models each with an one way air flow valve, are devised for this purpose, and they are described below—

(1) The Basket and Sphere model—in this model, the elaborated one way valve 705 is depicted to be located in the part of the PAC 702 shown to be contained between two horizontal lines, as illustrated in a top as well as a bottom schematic depictions of the FIG. 2 B; the interior of the DIR 108 is defined by the space above the two horizontal lines, whereas the interior of the air capsule 701 is defined by the space below the two horizontal lines; the top depiction in the FIG. 2 B shows the structural disposition when the valve 705 is closed, and the bottom depiction shows the structural disposition when the valve 705 is open allowing air flow into the air capsule 701.

In conformity thereof with the FIG. 2 B, the valve in the Basket and Sphere model comprises an upper component 720 housing an upper metal sphere 754, and a lower component 712 housing a lower metal sphere 723, both the upper and lower components having basket-like structuring with a nested configuration; though described as basket-like, the upper and lower components are open on both sides, and are set forth with rubber linings 726; the lower component 712 is a single basket unit; the upper component 720 is a two basket unit, wherein the two baskets are connected by their open broader faces opposing each other; the two metal spheres are connected by a connecting rod 725, while the upper metal sphere 754 is also connected above to a threaded metal rod 732 that can be threaded upwards into a threaded tubular continuity 740 of the upper component 720, to terminate into a rod handle 734; being connected to each other, the two spheres, the connecting rod 725, and the threaded metal rod 732 move up or down as an unit, when the rod handle 734 is turned clockwise or anti clockwise, the positioning of the spheres being tightly controlled by the threaded maneuvering of their rod connections; as can be seen in the drawing, the upper component 720 is situated about the rig side of the PAC 702 though not open to the rig interior 108 at any time, whereas the lower component 712 is situated about the capsular side 701 of the PAC 702, and is designed to be either closed or open to the air capsule 701, as dictated by the manual operation of the one way valve 705.

The top depiction of the drawing shows the rod handle 734 lowered (threaded) down, when both the metal spheres are wedged into the baskets closing them, and in this disposition, the PAC 702 is closed from the air capsule 701, as also it is closed from the DIR's interior 108, where from the valve 705 is manually operable through the rod handle 734.

The bottom depiction of the drawing shows the rod handle 734 fully lifted up, when the lower sphere 723 opens the lower basket, allowing the air from the PAC 702 to enter the air capsule 701, whereas the upper metal sphere 754 closes the PAC 702 from the DIR interior 108 in either position of the rod handle 734.

The threaded rod 732 depicts markings so as the positioning of the lower sphere 723 can precisely control the air flow into the air capsule 701 as 'slow-medium-fast', to equalize it to the atmospheric pressure, aided by a pressure gauge 738, a devising that is important, as when the air capsule 701 is air filled to attain required buoyancy, the capsular pressure should be equalized to the atmospheric pressure, aided by the pressure gauge 738; as the atmospheric pressure is approaching, the flow should be minimized so that the precise target pressure is attained, as a higher pressure due to higher air volume, lowers the buoyancy of the air capsule 701 by increasing the mass/density of the air within; similarly, a devised pressure gauge 739 about the PAC 702 denotes the pressure of the air within the PAC so that the required high air pressure is achieved while it is filled with air via an air-filler tubing 748, following an air let-out from the PAC 702 into the air capsule 701 about the time a sunken DIR 108 is risen to the surface ocean waters; the threaded air filler tubing 748 is securely closed by a massive cap with a threaded-in stem that contains the high air pressure of the PAC 702.

(2) The air cylinder model—the air cylinder model as shown in FIG. 3 can be considered as a simpler model which the industry is familiar with. The PAC 702 occupying the roof of the air capsule 701 as a spread out flat air compartment in the fore going model, is herein replaced by a metal cylinder 752 of compressed air. It encompasses the following structuring—the air cylinder 752 has an air outlet tubing 758 entering the air capsule 701, the tubing 758 comprising a manually operable gas control valve 750, that allows high or low air flow volumes, and said air flow model being familiar, any reliable pressure resistant gas control valve the oil industry uses, can be used in this setting; to start, stop, or adjust the (volume of) air flow about the control valve 750, only minimal movement of the flow-control handle is needed (just like the flow control of the tap water), though a long threaded stem of the handle is shown in the drawing, such lengthy structuring devised to preclude any air leak at this site, and may not be misconstrued as needing multiple turns of the handle, as also guide-markings are shown to indicate 'partially open', 'fully open', and 'closed' attitude/position of the control handle; the air flow into the air capsule 701 is so adjusted that it is equalized to that of the atmospheric pressure, a precise measuring aided by a capsular pressure gauge 738; proximal to the valve 750, a devised pressure gauge 722 denotes the air pressure within the cylinder 752 itself, so that a required high air pressure in a limited volume of the cylinder 752 is achieved while the cylinder is filled with air via an air filler tubing 745, following anair let-out from the cylinder 752 into the air capsule 701 about the time the DIR 108 is risen to the surface ocean waters; the cylinder 752 is located near the air capsule 701 in a room with sprinkler sprays so as it is not exposed to excessive heat upon a rig fire.

Sinking and rising of the DIR—the following is the simplest plan devised for the crew members during a fear and anxiety stricken situation, with steps they do not need to dwell deep into.

(1) Sinking the DIR—to start with, for the DIR to be submerged emergently, the air tight water let-in windows 728 are opened when the bottom of the air capsule 701 starts filling with water (while the displaced air is simultaneously let out through the windows 728), and the DIR begins to descend. Only a required amount of water 706 is let into the air capsule 701 through the windows 728 to submerge the DIR to the desired depth so as the fire is put off, and soon after, the windows 728 are closed. When opening/closing the windows 728 are effectuated manually or via robotic arms, it is done from outside the air capsule, and when the fire is put off, the steering crew communicates the divers, as also a red light blinks next to the windows 728, so that the divers can close the windows 728 and come onto the surface. The window lock has a lit up key hole, and the key is large for an easy maneuvering. The security crew carries the key all the time. The windows 728 are numbered, and have high powered lights next to them that can be put on after a night fall.

(2) Rising the DIR—for the DIR to be risen, water 706 is suctioned out of the air capsule from the rig, via the suction tubes 704, when vacuum can be created in the air capsule. The DIR floats to the surface instantly, as the created vacuum causes more buoyancy than air filling, meaning, air filling the capsule, theoretically, is not necessary. However, air filling is a better choice, as, in case the created vacuum is compromised for any reason after the DIR initially floats to the surface, it can submerge again to a certain depth, as air is heavier than the vacuum. Hence, it is a reliable option that air from the PAC 702 is let into the air capsule 701 through the one way valve 705, so as the DIR rises to the surface, where after, the air tight PAC valve 705 is closed. Once the DIR rises to the surface, suctioning of the water 706 from the air capsule is also stopped. The crew need not panic that the DIR will sink to the utmost depths of the ocean, if the steps of air filling and the water suctioning are delayed for any reason. About the time the water-filling is stopped, the DIR will not sink any further, and stays submerged/suspended about the same level, in the subsurface of the ocean waters. It is also helpful to know that pressured air is less buoyant than the regular atmospheric air, when either occupies the same unit volume, the pressured air being of heavier weight containing more of unit mass in an unit volume, as can be practically noted that a compressed oxygen cylinder is very heavy.

After the DIR returns to the base, it is a cautious measure that only 1-2 window(s) 728 should be opened, as water filling of the capsule should be very gradual and slow, so that the DIR will not crash on to the basement roof. Opening/closing of the windows 728 can be manually done at this time also, as there is substantial amount of space around the air capsule 701. Additionally, for an unrestricted entry and exit, a tunnel can be created about the DIR bottom, the tunnel originating from one window that has lit up green lights. After the DIR is locked to the base, needed amount of water is let out from the air capsule 701, and air is slowly released from the PAC 702 to fill in the same volume. The capsular air pressure is equalized to that of the atmospheric air, as higher pressure only lowers the buoyancy. It is a wise choice to always leave enough water in the bottom of the air capsule 701 so as to immerse the windows 728, which by itself acts as a good air seal to the windows 728 and the dipped-in suction tubes 704. After the one way valve 705 of the PAC 702 is closed, it is filled with pressured air again through the air filler tubing 748, while a needed pressure is monitored via the pressure gauge 739, for the DIR 108 to be readied again for the function it is intended for.

In a Different Embodiment

In a different embodiment, the air capsule 701 is built without any windows 728 of the earlier described entity. In this model both water-filling and water-emptying are done by wide caliber suction tubing 704 dipping from DIR into the air capsule, and are functional as one or many, based on the mode of use. Many tubing are at once used to water fill the air capsule 701, when the DIR is needed to be emergently sunken to put off the fire, whereas, one or few are used for gradual water-filling, as when the DIR 108 is brought down onto the basement roof. However, in this model, there has to be a separate set of air-suction tubing, also originating from the DIR and the latter having their lower ends terminating near the top of the air capsule 701. As water fills in the air capsule, equal volume of air is suctioned out, whereas, both the functions were simultaneously facilitated by the windows 728 in the earlier model.

For the DIR to rise to the surface, water is suctioned out of the air capsule, while equal volume of air is filled in with the air that is let out from the PAC 702, as in the previous model. As was mentioned earlier, delay in accomplishing this step will not let the DIR sink to the bottom of the ocean waters. All the suction tubing can run along the walls of the air capsule, and are numbered and color coded. In this model, at least one window 728 is yet essential, for the divers to get in for any structural mending.

Emptying the air containments—in the event the fire is spreading and DIR 108 could not be mobilized (due to malfunctioning of any of the locking devices or their controls), all the air-locking enclosures have to be freely opened to the ambient atmosphere. It can be very simple. In the Basket and Sphere model, the PAC's air filler tubing 748 and the one way valve 705 of the PAC 702 have to be opened wide, so that all the air-locking enclosures including the air capsule 701 are open to the atmospheric air. In the air cylinder model, the air flow valve 750 and the air filler tubing 745 are opened wide so that all the air-locking enclosures freely communicate with the atmospheric air. In addition, the PAC 702 and the air cylinder are devised with locked hidden compartments with 'air let out' provisions that only the key members of the crew are aware of, and are opened, for the pressured air to be let out, while also the air containments instantly communicate with atmospheric air.

Planning during DIR construction—to prevent undue jolting of the larger structures, equal distribution of the weight in all four quadrants of the DIR 108 is aimed during its construction. One plan can be—building the four quadrants as the constructional needs demand, and equalizing the weights of all quadrants by incorporating compensating weights wherever is needed. Said compensatory weights are in the form of large water barrels in all quadrants, with water inlets and outlets to facilitate equalizing the weight, such equalization programmed by computer soft ware. A preliminary of the DIR can be constructed by the manufacturer as a proportionally exact mass of miniature model, and trial sinking it without a tilt, to confirm the unit mass of water needed in each quadrant. It is presumed that the heavy structures are mostly stationary, the conduction platform with the derrick being not included in the quadrants. The manufacturer marks the lines that separate the quadrants, wherein the weights are equalized. Upon a later date, any shifts in the large or small equipment should be noted by the computer, and the balancing weights adjusted accordingly, by input/output into the water barrels. As the crew's work assignments and stationing are known during each shift, the head count should be also balanced by the computer just before the shift starts. As the DIR is prepared to be steered away, the security should access the computer programming to fine tune the weights of the four quadrants of the unit. This should be easy, as, who stays in the steered away DIR is predetermined, except for others who could not enter the basement in time. These people stay in the spray room, and enter their names via data entry portals, for their weights to be accounted for.

Wherein oil is collected in the rig—in case oil is collected in a rig before its pipe line diversion to land facilities/receptacles (as there can be unavoidable interruptions to such landward diversion), said rig collection/storage of the oil (wherein minimal gaseous admixture of the oil is aimed) should be carefully planned, to achieve the 'strived for' results, as also aimed in the foregoing paragraph. Rig fire is possible due to many reasons, arson being one of them, especially when oil is stored in the rig. The undue tilting of a submerged DIR should be prevented even in this situation of rig-rooming of oil. The oil collection barrels/storage units should be devised to be arranged in concentric circles spread through the rig, wherein each containment circle is connected to its inner and outer counterparts for a continuum of oil flow. The arrangement can be oval also instead of a circle, as the DIR is rectangular in shape. The oil enters from the top of the storage unit through a small inlet, and also leaves from the top through a small outlet after the unit is filled in, wherein there are joint configurations (as described at the end of this disclosure) as also clamps, incorporated into the intervening connections of adjacent storage units. It facilitates each unit to be detached as necessary, as also it can be detached from its bottom fixation bolts. The clamps stopping the flow to each unit help a strict leak proof handling of the oil and its storage units, as ground spillage can be a breeding ground for a rapid spread of a rig fire. As the oil collection continues in concentric circles, rather than as 'one quadrant at a time', the four quadrants of the rig maintain approximately equal weight at any time. The storage units having fluid-proof bolted lids with vulcanized rubber sealers, as also they are fixed to the floor, facilitate a worry free instant sinking of the DIR. An empty barrel should have a provision for a vacuum sealing, but in most instances the collection units do not stay empty.

As an alternative thereof, standby rig side receptacle(s) in the form of small ships can be elected, which is/are normally bypassed for a direct landward diversion of the oil via the pipe line, but used when there is an impediment to such land side diversion.

In this design, very fine adjustments are made with remarkable swiftness and precision. With also the easiest provision of sinking the DIR, such an off shore model should be seriously considered.

The air capsule should have sufficient air volume to counter a pre-configured weight that the DIR may not exceed (that includes the numbered crew, or oil collected), however with a wide safety margin. To preserve the vital function of the air capsule, its bottom is structured to be in flush with, or 1-2 inches above the bottom of the DIR. During manufacturing or later, the DIR equipment is waterproofed. Its enclosed utility compartments are always kept closed with provisions for an automatic vacuum creation soon after they are closed, or else, the air as a whole within all the enclosed utility compartments can create significant buoyancy, and resistance to sinking.

The DIR's detachment—within the DIR 108 past the water tight door of the detachable walk way, a 'crash cart' is equipped to disconnect the traversing tubing 107, and the wiring 105. Each tubing and wiring is differently color coded. At this junction the threaded metal tubing 107 are made of conjoining rubber tubing in C or U configuration 109 for their easy severing, after the ends of the metal tubing 107 are clamped on both sides in any conventional manner. Devising threaded metal tubing throughout, allows conjoining at a later time by instant 'joint structures' (wide infra). The connected wiring 105 in this area can be instantly disconnected. After the cut ends of the Cor U tubing on either side are drawn into the corridor 110 as also into the DIR, the watertight doors are closed. The signal to unlock the DIR from its base is set forth by key personnel with remote controls.

The crew can move away only as far as it is deemed safe, but working about the security devices through remote controls, being also vigilant about the expert fire fighters left in the base, trying to prevent the well explosion, if anticipated. The crew returns soon after the fire is put off, and starts the reparative processes. After emergency reparative processes to restore the temporary and permanent well integrity by plurality of measures as described in the cross referenced applications (the U.S. Pat. Nos. 9,175,549 and 10,871,055), a planned rig structuring/renovation is done as needed.

The unlocking/locking of the DIR to the base platform—in right positioning, the DIR 108 is locked (or unlocked) by equipment similar to the locking of a car door (in a magnified size with an allowance for imprecision) by a remote control. These multiple locks are located on both sides about the bottom of the DIR. Locking/unlocking is done individually, each side also being locked by a common control. Upon the rise of the DIR to the water surface, the steering is automatically activated to a slow straight course, until taken over by the crew, so that the sudden movement of the unlocked DIR 108 is not jolting to the tall and heavy structures.

The DIR has massive retractable hooded wheels for finer adjustment of its positioning and locking, upon its return to the base. It is obvious that the DIR gets on to the base in a reverse gear that it is capable of on water, in a slow locomotion. Fine tuning of the DIR positioning is helped by the guiding color coded lights set forth about the multiple locking devices configured to be flushed with the basement's roof structure. They are color coded for the corresponding lights about the sides of the DIR itself, for each pair of color coded lights to be brought into a proper vertical alignment, when the DIR itself is properly positioned to be locked with the basement's roof, such precise vertical alignment mostly tried while the DIR is still upon the water surface. Two down facing video devices positioned above the color coded lights of the DIR on either side, and viewed by the steering crew can help said maneuvering of the DIR. The air from the bottom air capsule of the DIR's is then evacuated by letting in the water. The submersion being aimed to be a slow process, the DIR 108 descends without unwanted crashing onto the base platform. The retractable hooded wheels that are structured very sturdy are drawn out before landing, where after, further fine tuning is facilitated by the video devices. Approximating one set of colored lights on either side will properly position the rest, as can be inspected getting out, by the steering crew. If all locking devices are not operative, locking opposite corners are yet effective. The components of the locking devices should be cleaned, if locking is unsatisfactory. Other commercial locking devices can also be used before or at this time.

Accessory fire control, salvage, and reparative measures—multiple spools of burlap stored in reserve at strategic places in roof structures and above heavy equipment (with their lower ends secured, to be easily reachable) to be instantly made wet and thrown on burning objects/affected crew members, are the most effective accessory measures in putting off the fire. The wet burlap is very resistant to fire. Perforations of the rolls as in a kitchen 'paper towel' enable instant severing of the needed length of a burlap, so that different objects/equipment/affected crew members can be swiftly wrapped up in wet burlap, to put off the fire. Lengthy tongs to catch and direct the wet burlap sheets onto the large burning objects, and powered jetting sprays are also needed in this setting. Such measures are best effectuated in conjunction with instantly closing the threaded tubular systems, to shut off the unceasing gas emission from a compromised conduit line. The heavy/costly equipment are wholly jacketed with layers of fire proof structures and sheaths of burlaps over a water proof underlay during manufacturing, their appended connection tubing threaded, to promptly reconnect if the tubing is destroyed. Self bathing sprinklers are obligated wherever feasible, inside or out, and they also accompany any tubing not submerged in the territorial waters. The fire extinguishers are high powered to be far reaching. The outer walling of the DIR is studded with self bathing sprinklers, whereas they jet powerfully about the water surface surrounding the DIR, to force out fire on water.

The crew can move away only as far as it is deemed safe, but working upon the security devices through remote controls, being also vigilant about the expert fire fighters left in the base, trying to prevent the well explosion, if anticipated. The crew returns soon after the fire is put off, and starts the reparative processes. After the emergency reparative processes to restore the temporary and permanent well integrity by plurality of measures as described in the cross referenced applications (U.S. Pat. Nos. 9,175,549 and 10,871,055), the rig structuring/renovation is done as needed.

For additional protection, the heavy/costly equipment are wholly jacketed with Saffil alumina blanket material (sealed by aluminum vapor to at least saturate the surface blanketing layers on either side) and sheaths of burlaps over a water proof underlay during manufacturing.

Rescue measures—when it is clear that staying back only endangers the lives of the fire fighters, every body leaves the base. It is in the best interest that all crew members are trained in basic fire fighting. Those skilled and stayed back, should jump into the ocean in threatening situations. They must dive in (to avoid surface oil) and swim to clearer waters, that is, towards the darkest direction. The DIR's steering crew should keep vigilance with night vision binoculars, and as they leave, at least two will go in a lift boat to follow and rescue the fire fighters, by swimming if needed. The solar lights of the lift boat can hint the fire fighters the direction to pursue in water.

Sumathi Paturu's Moving Carrier Model for the Dir Basement's Fire Escape Entry The DIR's basement apart from a storage place and a 'power house' of electric generators, serves as an in situ 'fire escape' right within the rig. It is a critical and legitimate concern as how to access the underwater basement from the DIR 108 above, with an intervening layer of ocean waters, with out an unwanted compromise. The entry is structured therefore with unfailing accessories as also meticulous security measures, to safely enter the fire escape destination. The schematic of a water sealed in situ basement entry devised as a 'Moving Carrier Model' (Sumathi Paturu's Moving Carrier Model), not drawn to scale, is shown in FIG. 4. Being configured as fire escapes, the basement's fire escape access is structured to the purpose, so that a safe and quick entry is accomplished upon a rig fire. The following description, in conformity thereof with the illustrating FIG. 4, enumerates the devised model.

The moving carrier model shown in FIG. 4, as desired, is a simple model of fire escape entry, right within the detachable rig 108. Said entry to the basement conforms to a rectangular opening 100 of the DIR's floor structure, and is located within a specially configured 'spray room' of the DIR 108. Around the DIR's floor opening (DFO) 100, there is a rectangular permanent concrete DIR enclosure (PDE) 168. FIG. 4 further more shows the basement's roof window (BRW) 179 and its two window closures 193 structured within a reinforced roof structure 127, wherein the top closure is made of steel, and the bottom closure made of bullet proof glass.

A moving carrier 212 is capable of moving up from the basement floor 452, to rise through the BRW 179 and the DFO 100, so as its opened top surpasses the surface 164 of the ocean waters, as also to be nearer to the top of the unenclosed PDE 168. The moving carrier 212 is configured to be immovably fixed onto a bottom support 258, said support 258 structured to be open only in areas of the sideward window structures 280 of the carrier 212. The support structure 258 strengthens the bottom of the carrier 212. It also aids in the moving maneuvers of the carrier 212 facilitated by the 'moving devices' located in the basement 130, by their anchoring/approximating to the support structure 258. The BRW 179 is closed from the ocean water by 'Water Barrier' structures 208 erected around it on the basement's roof in a rectangular configuration, to create an enclosure. The two structures 208 in the FIG. 4 represent the vertical cut sections of a Water Barrier (WB) enclosures erected about the lengthwise dimensions (the lengthwise barriers, LWB), whereas the distance between them represents the widthwise dimensions of the barrier structure. The height of the WB enclosure 208 is devised to surpass the surface level 164 of the ocean waters. The barrier structures 208 are preferably in steel, and apart from their outer hinge joints to the basement roof structure, their inner walls are additionally sealed' to the concrete/steel roof platform 124 of the basement with a thick and sturdy water proof sheet (preferably with vulcanized rubber component), in a manner similar to a domestic dish washer door 'seal' to the washer compartment. The LWB 208 erected to stand in an upright 90° angle are capable of full inward movement towards the BRW 179, but otherwise restricted by outwardly placed brackets 250 arising from the basement floor. The WB structures 208 about the widthwise dimension (the widthwise barriers WWB) are also devised to stand by 90° about the roof platform 124, but their movement in outward direction is possible, whereas, moving inwards towards the BRW 179, they articulate with the sides of the LWB 208, the latter augmented to be sufficiently thick (nearing the thickness of the metal door of a typical bank vault) for a secure articulation that is reliably water-proofed. The WB structures 208 have no weight bearing function, being designed as only barrier structures isolating the ocean waters.

The emergency entry of the crew upon a rig fire—about one of the lengthwise dimensions of the PDE 168, a broad staircase structuring 173 within the DIR 108 provides a swift access of the crew to the carrier 212, the projectile structure of the staircase 173 approaching the top of the moving carrier 212 situated inside the erected WB structures 208. A continuous frame work of staircase 242 stretches within the lengthwise dimension of the carrier 212, being only separated by hand rails, to facilitate an orderly movement of the crew. Said rails are provided with secure hand supports 248 at the top, and supports 254 below (upon the floor of the carrier 212), where about, the adjacent windows 280 of the side wall of the carrier 212 open to a basement's staircases 205. Each staircase 205 has only basement floor supports with no material connection to the carrier 212, the latter being devised as a movable structure. In a completely descended disposition of the carrier, the carrier's windows 280 directly open to the basement floor 452. The floor of the carrier 212 and the adjoining receptive basement floor 452 are cushioned to protect the crew from accidental falls.

The water isolating units—about the opposing surfaces of the LWB 208 and the PDE 168, a water-isolating unit 203 made up of rubber, guards the normally open structure of the PDE 168, and the open BRW 179 of the basement from unexpected rising tides and turbulence of the ocean waters. The PDE component of the unit 203 that runs through the entire lengthwise dimension on either side, comprises a linear block of rubber with a central indent into which a complimentary structure, also made of rubber, arising from the LWB 208 engages, creating a rubber seal. However, as a different structuring about the widthwise barriers (WWB 208), shown as a vertical cross-section in an inset of FIG. 4, two wedged structures 252 in the inter-space of the WWB 208 and the PDE 168 create a nested configuration about the widthwise dimensions, wherein a rubber guard, by virtue of a smaller linear dimension, is manually inserted for a water tight closure. This different structuring of WWB 208 facilitates outward movement of WWB 208 beyond 90° when the rubber guard is not in place, so that a snapping closure is possible during an articulation of the WWB 208 with the LWB 208.

The closure of the WB-after the basement's roof window (BRW) doors 193 are locked during the DIR's disengagement, the disarticulation of the WB enclosure is done via remote controls by responsible personnel. The rubber guards about the widthwise dimensions are removed first, and the two WWB 208 are unlocked by remote control, when they fall outwards by few degrees. With also a remote control, the two LWB 208 close over the BRW 179 opposing each other like two doors of a room, following which the two WWB 208 also close towards the BRW 179, resting upon the two LWB 208. The WB 208 can also be held by 'holders' that are slowly released for a controlled 'slow motion closure'. Ideally, if the measured width of the entry structure and the height of WB structures 208 are optimal, the two LWB 208 can close opposing each other like the two doors of a room. The basement roof about the basement entry is structured lower than the rest of the roof platform, so that the structures of the WB 208 when closed, are in flush with the rest of the floor, or else stay lower. Following the dis-articulation of the rooming structures of the WB 208, the DIR is freed to steer away.

When the DIR returns, its proper positioning upon the basement roof floor achieved by a precise alignment of the color coded lights described earlier, and the locking of the DIR to the basement following it, also facilitate the precise positioning of the DIR's floor opening (DFO) 100, and the rectangular permanent DIR enclosure (PDE) 168 over the basement's roof window (BRW) 179. For re-articulation of the WB 208 from within DFO 100, and the PDE 168, the structures WB 208 are lifted manually by divers, or by lift prongs. The outward movement of the LWB 208 being limited to 90° by the brackets 250, their precise articulation with WWB 208 is always possible, as also it facilitates proper engagement with the indents of the water-isolating units 203. Following the restructuring of the WB 208, water is suctioned out from within the roomed enclosure, where after the basement's roof window doors 193 are opened.

The ascent and descent of the basement carrier-many conventional devices are available for the short distance ascent and descent of the carrier 212. It can be done with remote control—1) by a giant lift prong; 2) by a crane wherein the 'carrier' conforms to a spread out terminal of a crane; or 3) by pulleys moved by powerful motors. In the movement facilitated by pulleys, the maneuvering ropes are fixed to the center of the bottom support structure 258 about both widthwise dimensions, where from each rope ascends to pass through a pulley positioned about the nearest ceiling area of the basement. After a descent, each rope traverses another pulley about the basement floor, where after the terminal is maneuvered by a powerful motor. There can be two floor pulleys for a secure maneuvering. The motor facilitates either a clockwise or an anticlockwise movement of the ropes about the pulleys. Downward pull of the ropes as they are reaching the floor, lifts the carrier 212 upwards, towards the BRW 179, whereas said movement reversed, brings down the carrier 212 to the floor of the basement. The pulleys have hooded covers to prevent de-grooving of the ropes, a very important precaution to preclude any unexpected catastrophic mal-functions.

Executing the carrier's ascent and descent maneuvers at least once in a month ensures the workability of the basement carrier, as also it makes the crew familiarized with the practical aspects of its operation. The maneuvers of the barrier enclosure 208 and the roof window doors 193 should have been practiced by the security and steering crew, and few of the security crew should get into the basement upon a rig fire to maneuver the carrier. A security guard communicating with the steering crew controls the basement access, and following his announcement after the carrier 212 is brought down for the last time to the basement floor, the BRW 179 is closed, while the DIR is steered away.

A 'general purpose entry' later described, is an alternate basement entry, in case the carrier 212 is not operative. The carrier 212 normally stays in ascended position. Its descent is needed only when the BRW 179 needs to be locked before the DIR is steered away. Additional basement entries of remote rig areas are possible, and the crew in this areas should contact the security upon a rig fire.

The capillary suction tubes—the sheeted rubber seal of the water barriers 208 is mandated to be periodically inspected. Multiple 'capillary suction tubes' are positioned upon the properly 'leveled' basement platform covered by the rubber seal, around the BRW 179 and inside the barrier enclosure 208. As even minute amounts of leaked water can rise up in the capillary suction tubes, an alarm provision can signal a water leak, to close the basement roof window doors 193 for the rubber seal to be replaced or repaired. The movement of the WB 208 that is a rarity, takes away the brunt upon this vital sealing structure, as also it is isolated from the sheer forces of the ocean tides.

Safe Evacuation Accessory Provisions

The 'Spray room'—the fire escape entry of the off shore rigs is devised to be structured in a 'spray room' 197. It has spray poles 200 (FIG. 4), each carrying multiple feeder tubes arising from the bottom of the DIR (or from a similar bottom structure of a Jack up rig), and drawing water from a deeper level about the ocean (this being applicable to all the sprinklers within the rig), the surface water being occasionally oil laden. The spray is a wide caliber stream that jets water all around, only sparing 2-3 feet about the PDE 168 of the fire escape entry. The sprinklers are directed down into the room, self-bathing the poles, while some are within the room's roof structure, drenching its layers. The roof sprinklers are activated when the fire seems to be spreading. The roof of the spray room is made of layering such as: a sturdy top metal sheet with surface sprinklers, layers of burlaps, layers of mattress like sponge, and a bottom comprising a layer of highly fire resistant material such as any of the Ceramic Matrix Composite (CMC) insulators, the layers in between capable of stagnating water. Other fire retardant materials can be used. There are heating coils in the roof to dry up its layers after the fire is controlled. Covering the basement entry, there is a lamp shade like metal umbrella (with peripheral water channels) set forth to protect the basement entry from the water-sprays. There is an inch of water stagnation on the floor, whereas the walls of the room are protected outside by similar roof and floor being extended outward. Despite the initial signs of a fire seeming insignificant, the crew must get into the spray room. The entry doors of the spray room are guarded by a curtain of Saffil's High Purity Polycrystalline Alumina (HPPA) blanket (HIB) (a fire resistant material withstanding upto 1600° C. temp) (sealed both sides by aluminum vapor) ensheathed in thick burlaps with heavy bottoms, the outermost layer bound to the adjacent walls by large bands of Velcro (hooks and loops), the drenched burlaps hindering fire and passage of gas and smoke. Those entering open the door only minimally, and closing both the Velcro clasps and the door after them. The sprinklers about the doors are set forth to be wide and forceful. The spray room has lights fixed on the walls, their circuiting derived from the flooring.

Outside the doors (excluding those leading to the boat deck) a high shelf like metal screen structured in an U configuration with convexity outwards, hoards high powered fans of exceeding size, their upward incline forcefully blowing off approaching smoke and gases, a commonly encountered gas like Methane being lighter than air. Such fans can be set forth in strategic places about the rig including the open areas. With the foregoing devices, the fire spreading into the spray room through the roof, the walls, or else through the door, is unlikely. Additionally, the carbon dioxide ($CO_2$) content of the emanating smoke is substantially diminished, as, its diffusion and solubility coefficient in water being exceptional, about 20 times more than that of oxygen, it is dissolved in and drained away by the intervening sprays, making smoke ($CO_2$) inhalation not as dangerous as it is deemed otherwise. As a means of safeguarding the rig in entirety, the provisions of a spray room are modified as follows: (1) wherein the work stations are isolated, multiple spray rooms are set forth, with multiple basement entries; (2) wherein work stations are about different levels, upper level spray room and 'spray walks' (wide infra) are required, the former located above a lower level spray room, with a conjoining sliding structure, the basement entry being common.

Ocean side exit from the spray room—people who could not enter the basement and stayed in the spray room of the steered away DIR, can enter a boat deck from the other side of the spray room. As an alarm rings if the DIR needs to be sunk, they can leave the deck in life boats. The spreading fire in the steered away DIR is not met as a dramatic befalling, but rather be reasonably foreseen.

The basement is a better refuge if fire is initiated in the DIR, for a remote possibility that the DIR may not be mobilized. The basement is built to be break resistant and is made fire proof by a 'water seal'. The intervening space between DIR and the permanent base is well devised, and is made wider about the basement entry, to create an unfailing water seal that still protects even if the DIR could not be mobilized. The whole area of the basement roof is made of concrete, and it also has 2-3 layering of sturdy metal grid underneath for an unbeatable protection, as also it can be recalled that the two doors 193 of the BRW 179 are made of steel and bullet proof glass.

The 'Spray Walks'—in conformity thereof with the safeguarded structuring of a spray room, it is imperative for the rig to have spray walks shown in FIG. 5. They cover the entirety of the rig, securely leading the crew to the spray room destination, the strategically located entry doors about the spray walks providing access/exit to different venues including the decks of the boats. The spray room and the spray walks can be set forth as modular units, tailored to the existing rigs, wherein they are structured to be minimally space occupying, yet serving the needs. The spray walks shown in FIG. 5, not drawn to scale, mirror the spray room in its roof structuring 195. They have 'walk ways' confined by two inner walls 128 and two outer walls 103, coursing parallel, with top water jetting sprinklers 126. There is water stagnation 161 about 1 inch deep in the walk ways between the two inner walls 128 as well as the narrow area in between the two outer walls 103. The doors 136 of the inner and outer walls are not positioned to be opposing, to prevent easy entry of the spreading smoke and gases. The doors of the outer wall comprise a curtain of Saffil's High Purity Polycrystalline Alumina (HPPA) blanket (HIB) (a fire resistant material withstanding upto 1600° C. temp) (sealed both sides by aluminum vapor) ensheathed in close woven burlaps with heavy bottoms. The crew must be familiar with the structuring about their work venues, and the course therefrom. The brightly lit floor arrows 170 of the spray walks, solar powered, point to the direction of the spray room, to direct the crew even as the area is heavily smoke filled. A basement if elected as living area, even a moderate sized rig is deemed to avail space for the spray walks.

The spray room and the spray walks are activated emergently as the gas/fire alarm rings (the gas sensors activating the alarms are positioned about different levels of the well bore), and reaching a nearest spray walk is an easy maneuver to count on. As the spray walk/spray room is reliably protected, it is worthwhile activating them, even though the fire is seemingly trivial, as there is no water damage to the work areas, the sprinkler sprays intended to be fairly confined to the designated areas. The $CO_2$ content of the smoke is substantially diminished by the intervening sprays of the spray walks. Following significant fire damage, only the outer walls 103 of the spray walks need restructuring, the inner walls 128 being sufficiently water sealed. Stretchers with 'on and off' domes are used in the spray walks, or else, the 'injured' is covered by an attached water proof sheet.

The 'Water Tracks' and 'Track Drives'—wherein the spray walks cannot be accommodated in a rig, less space occupying water tracks can be substituted, its schematic along with a track drive, shown in FIG. 6. The water tracks are canals of cement/concrete dipped into the rig floor and are water filled upon a fire alarm. In rigs where 'below the floor level' canals are not elected, the water tracks are set forth as modular rail road like tracks 524 in metal, above the floor level. In conformity thereof with the fore going structuring, there are 'track drives' or 'track wheelers' 174, in similar number as the crew members, to be riding from a merger track stand of a work station. A track wheeler 174 shown in FIG. 6, has an outer shell built like a three wheeled motor vehicle (sized for an adult pedaling an un-motorized model of a child's tricycle), preferably with sloping outer contours, especially about the top, for an easy down-flow of the sprinkling water. The front wheel is devised to be large so as to accommodate the minimally sized pedaling hardware within the interior of the vehicle, even about the time of its downward circling. However, in recent times, even children's version of drivable tricycle or cart has interior foot pedal and a steering wheel, just like a car. Hence, as an alternative thereof, to make the devising simpler, a similar tricycle pattern with interior foot pedal and directional steering wheel is easier to make, as also better in this setting. It is motorized, needing constant foot pedaling, which implies, they stop without foot pressure on the pedal, precluding hitting front wheelers by a fire victim losing control. The walls of the wheeler are low set, however not to be touching the floor even during a bumpy ride. A back seat 192 is sized for 1-2 people, and all the seats have cushioned back rests and side supports. The wheeler's closely set up back wheels and a converging bottom make the tracks narrow, thereby saving the rig space, as also people can normally walk over the tracks. The water tracks 175 are precluded to overflow, whereas on either side of the tracks, the rig floor has a narrow sieve that drains away the splashed water. The fore structure of the wheeler is fitted with a transparent plastic shield 136 and a single wiper blade to make the water tracks 175 clearly visible for directional steering, and to prevent from colliding with the wheelers ahead. The wiper blade is used only if necessary, as routine wiping of the flow is not protective. There is a transparent plastic window to the front door also. The wheeler is lit by solar head lights and solar power also charges the wheeler battery, wherein the power is stored when not used, while similarly lit track arrows direct to the spray room even when the area is smoke filled.

Upon a fire alarm, a suction pump 204 within the wheeler 174 is activated, as the water tubing 716 within the wheeler derives water from the merger water track about each work area, to drench the wheeler 174 as people approach. A bottom outlet from the wheeler drains out the collected water into the water tracks 175. The wheeler is jacketed by layers of burlap as also covered by a sheet of burlap a layer of Saffil's High Purity Polycrystalline Alumina (HPPA) blanket (HIB) (a fire resistant material withstanding upto 1600° C. temp) (sealed both sides by aluminum vapor) ensheathed on either side by layers of burlap as also covered by a sheet of aluminum vaporized Saffil alumina, sheathed in burlap (split about the entry door, not shown in the drawing), its heavy bottom edge dipping about the track waters. The closely spaced self bathing top sprinklers 198 of the exterior wet the top 742 and its surface burlaps, whereas the interior sprinklers 199 wet a hung in burlap attire (with also a head cover and eye-grids, to be worn by any burnt victim to put off the fire). There is also a thin hung-in burlap sheet, if the fire victim feels it easier to cover himself with the wetted sheet.

Wherein few people in a work area together can approach a track wheeler 174, it can be devised for more people with multiple doors, however, one bigger vehicle being required in each work station to transport an injured. Such wheeler has a narrow removable stretcher affixed to the seats, and a sliding side door. Bigger wheelers are only lengthier, and in effect, have additional back pedaling without a directional steering, augmenting the speed of the wheeler. Each crew member should elect to proceed to the spray room with out waiting, if there is undue wait time for three people to get into one wheeler (it may be noted that the wheelers are provided as per the total head count), as delay may crowd the water tracks, and an earliest proceeding if at all possible, is the best time to clear the pathways to the later coming vehicles. The least injured person pedals the wheeler. Each vehicle hoards a wooden plank inside, so that if the vehicle can not be driven by any one of the boarders and stops in the tracks, a member in the vehicle behind needs to get the vehicle off the tracks 175 by using the wooden plank as a ramping device. The disabled is/are transported in stretcher(s) of a larger vehicle. Motorized model is not advisable because—if an injured person boards and later loses control, the vehicle can hit the wheeler ahead, and following it, there can be other wheelers ahead being hit also in a similar manner.

The 'Spray Drives'—any one of the fore going plans is more appropriate to newly constructed rigs. Older rigs can be tightly packed, being not able to avail any space. In such instances, the rigs can yet have spray drives or spray wheelers. Apart from having the required general features of the track drives, the spray drives have the herein devised additional technological provisions. The spray drive differs in having two wide set back wheels for better stability, and more height, so that a water compartment is structured about the top, supplying the exterior and interior sprinklers. The wheeler has interior foot pedal and a directional steering wheel. The wheeler interior is furthermore structured with a bottom basin like receptacle, to receive the down pouring water from the interior sprinklers. Said basin receptacle spreads from one side wall to the other. The air tight snapping entry door about the front seat is suitably located above the basin receptacle. A recirculation draws the water from the bottom receptacle to return to the water tank. A bottom water channel about the exterior also collects dripping water, to divert into the interior basin, whereby most of the water is re-circulated. There is a provision to make the interior sprinklers wider and forceful, in case a person entering, had caught fire. The water re-circulation keeps the surface burlaps wet unto the time of reaching the spray room destination. The spray drive's water compartment must be cleaned periodically.

The exiting slide tubulars—the exiting slide tubular (wide infra) is the single most useful fire escape device, in any number, that the crew can count on, as will be evident in a latter section.

Fire uniform and the SCBA mask—the rig crew is familiar with the fire fighter's uniform (body attire, head gear, and gas mask) and the SCBA (self contained breathing apparatus) device, the gas mask incorporating a mini canister of soda lime that absorbs both carbon dioxide and carbon monoxide (the latter mostly absorbed by the sodium hydroxide of the soda lime, if the SCBA is open circuit). The uniform and the SCBA are stored in a safe work area, and the crew must be familiar with the workable time of the canister and the air tank, depending upon the unit selected. The closed circuit SCBA device also protects from methane, hydrogen sulfide, and sulfur dioxide exposure.

A work station can have a common shower room with wide caliber roof sprinklers and burlap attires (that include sole reinforced and top elasticized knee highs and head covers having narrow grid work of burlaps threading as eye shields) hanging from the ceiling, and any worker can thoroughly soak himself as also wearing a drenched burlap attire, and get into a wheeler to reach the spray room destination. It takes at least 3 minutes to access and wear the fire fighter's uniform, whereas the burlap attire that is already wet, can be worn in less than a minute, as even a few seconds count in making a difference. Wearing the uniform is the first choice if time permits, and only in dire situations, one can quickly get out wearing an already wet burlap attire. However, every attempt must be made to wear a SCBA device to be protected from poisonous gases. Metal shelves with snap doors can be positioned through out the rig along with adjacent shower heads, and a worker can access a burlap attire or a burlap sheet about the nearest shelf and can wet him self, if he is outside the work station and can not access the fire fighter's uniform. From outside, availing a burlap attire, as also approaching a wheeler first is easier rather than trying to get to the designated work station.

Wherever burlap is encountered in the foregoing such as the fire protective attires of the crew and the like, Saffil alumina blanket material (sealed by aluminum vapor) ensheathed in close woven burlap on either side can be a better alternative in its fire protective properties up to 1600° C.

Canisters of soda lime in strategic places of a rig—even minimal fire can cause dense smoke with dangers of smoke inhalation (which is also carbon dioxide and carbon monoxide inhalation) very early on. Huge boxed and sealed canisters of soda lime can be placed in strategic places of a rig, as inside the work areas and adjacently about the merger tracks, to absorb carbon dioxide ($CO_2$) and carbon monoxide (CO). The canisters are specially devised so that a sealed canister (the $CO_2$ scrubber) is unsealed by remote control upon a fire alarm, as also it may not be exposed to direct sprays of the sprinklers when unsealed. For such desired purposes, the following canister structuring, as shown in the schematic illustration of FIG. 7, is devised.

As a better alternative thereof, the panels and doors of the canister can be comprised of any of light weight but sturdy Ceramic Matrix Composites (CMCs) and Saffil alumina blanket material (sealed by aluminum vapor) wherever it is appropriate.

The FIG. 7 depicts a large sized box like canister 402 with approximating dimensions of ½' depth, 3' width, and 5' height, larger or smaller sizes not precluded. The sides 134, top, and the bottom of the fire-proof canister 402 are permanently closed, whereas a front panel 132 and a back panels are locked to the sides 134 of canister 402 by locking devises 159. They can be unlocked by remote control, upon spreading fire, whereby the two panels will disengage and drop to the floor. The locking can be by any means, the simplest being similar to the lock of a car door that can be unlocked by remote control, and an universal remote can unlock all the canisters of the rig. The FIG. 7 shows the front panel 132 unlocked exposing the interior of the canister 402, wherein it shows pigeon hole like compartments 158 of the canister, wherein pellets of soda lime occupy almost to a full extent of each compartment. The pellet like structuring sets forth recesses in between for maximum exposure of soda lime to the pervading $CO_2$ and CO. The front and back panels are light weight being made of sturdy fire-resistant material with a thick sheet of plastic underlay, a solid support given by a thin PVC edging. The contacting outer frame work of the boxed canister and the frame work of front and back panels comprise rubber edging 150 so that when the panels are locked, the canister 402 is made air tight, as the soda lime should not be exposed to atmospheric air except when its use is intended in the event of a rig fire. To protect it also from the direct sprays of the rig sprinklers, the canister 402 has a permanent 'spray shade' 133 on all sides about the top, the shade configured with an upward incline approximating 15-20° from the horizontal plane. A downward incline or a horizontal disposition as of a conventional shade is differed, as the devised structuring is more receptive to $CO_2$ and CO that are heavier than atmospheric air. The spray shade 133 is devised fire-proof and has an outlet that drains away collected water. As the canister 402 has meager depth compared to its width and height, its bottom has support structures for the needed stability. $CO_2$ can be recaptured from the exhausted soda lime and can be used for the major purpose of urea synthesis.

The Reasons for not Demonizing the Use of Fossil Fuels (and the Emitted CO2) as Long as their Use is Necessitated—

1. As long as the use of fossil fuels is necessitated, means to lower the carbon foot print as also the means to utilize the demonized $CO_2$ for useful purposes are the mandates, as indeed it can be a very useful gas. Apart from planting and saving trees, soda lime is the single most utilitarian provision that the present day world can rely on, apart from countless evolving measures that can be also relied on for 'carbon capture', the latter being a great solace for fossil oil's obligated short term and possibly long term use in the future. Soda lime is made available as $CO_2$ scrubbers for its prolonged use as noted above, and the $CO_2$ recaptured from it can be used to manufacture urea (ammonia+$CO_2$=urea), the world's ubiquitous plant fertilizer, whereby $CO_2$ disposal storage in geological reservoirs may not be necessary. Presently, $CO_2$ needed for urea synthesis is generated by large scale fossil oil burning by the manufacturers. Blue urea discharges least amount of $CO_2$ when used as a fertilizer, however, whatever amount is discharged, can be readily utilized by the plants/trees for photosynthesis. The farmers need detailed incentivizing education about the ways of using the fertilizers, that is—(1) the sacs of fertilizers with no wide openings have to be kept sealed and only opened just before they are scattered in the fields, and each sac should contain educational material in plastic pouch outside the sac, with a bold label 'Please Read'; (2) the fertilizers are to be scattered into the fields at sun rise and never at sun down, so that the discharged $CO_2$ from urea is immediately utilized by the green chlorophyll of the plants/trees in the presence of sunlight, for photosynthesis; similarly, it is to the advantage to water the crops early in the day, as photosynthesis, as in its chemical equation shown below, also requires water.

Photosynthesis: $6\ CO_2+6H_2O=C_6H_{12}O_6+6\ O_2$

Glucose ($C_6H_{12}O_6$) shown in the equation, by complex aggregation, is stored as starch or converted into cellulose that makes up the fiber or bark in the plants/trees). As also shown, a greater hidden advantage is, in the process of photosynthesis, for one molecule of glucose synthesized, 6 $CO_2$ molecules are taken in by the plants, to also give back 6 molecules of oxygen (6 $O_2$) into the atmospheric air (a doubled gift in great amount by the plant kingdom to the human race), whereas the $O_2$ used by the plants for their own respiration is only a fraction. The equation is amazingly persuasive as even well read and well informed people may not be aware that 6 molecules of $CO_2$ and 6 molecules of $O_2$ are involved (a 12 fold benefit), as there is a world of difference between 1 and 12. Hence, it is an obviously easy proposition to reduce carbon foot print by encouraging people throughout the world to plant as many trees and plants as possible, where ever they can and whenever they can, evergreens that stay all through winter being equally preferred as the big trees that grow tall and wide. Every citizen of the world should take up said remedial responsibility as long as the use of fossil fuels is necessitated as mere complaining may not change the situation.

2. Luckily, rigs do not otherwise release excessive $CO_2$ if flaring is stopped. An earlier mentioned contemporary application 'WELL BORE TO OCEANIC DIVERSION OF A GAS ENTRAINMENT WITH PREVENTION AND RESTORATION ABOUT A WELL BLOW OUT' enumerates a best mode contemplated, how the admixed gases of the crude oil can be separated mostly at the rig level, so that flaring can be slowly weaned by the oil companies for the common goal of zero carbon emissions, and to be responsible future survivors in their business ventures. It also helps against negative outlook of future to embrace countering measures with positive attitude.
3. OFF SHORE NATURAL OIL SEEPAGE—in fact, a surprisingly less known fact is, off shore oil and gas production benefit economy and environment (Bruce Allen, The Heritage Foundation, *Environment*, Nov. 30, 2009), especially in areas of active oil seeps like Santa Barbara of California where seepage exceeds 240, 000 barrels every 4 years. Papers by British Petroleum in early 1900s show that 75% of world's oil bases contain surface oil seeps and according to National Academy of Sciences, 63% of hydrocarbon pollution in US waters stems from natural seeps and only 1% is from off shore drilling and extraction. Research indicates if off-shore production were expanded in the seep zones, methane and ozone forming reactive organic compounds would be further reduced by lowering the pressure of the underground reservoirs. The world should rethink about oil ban and drilling should be encouraged and carbon emissions should be tackled by one great provision easily doable—planting trees, and any money spent on that is money well spent.

RIG FIRES—rig fires can be quickly extinguished by air drop of air blocking struts on to the fire, said struts being made of sheets of Saffil's High Purity Polycrystalline Alumina (HPPA) fiber, and its derivatives made as flexible ribs for the strut's support frame work.

Saffil, as was noted, is High Purity Polycrystalline Alumina (HPPA) fiber stabilized with silica. Alumina is Aluminum oxide ($Al_2O_3$). Saffil (a brand name) is very light weight, its density being 1.7 g/$cm^3$. Saffil HPPA has exceptional handling strength at high temperatures up to 1600° C. It is available as felt, mat, blanket, paper, and further as Ceramic Matrix Composite (CMC), it is also made into more rigid structures like boards; furnace liners, and turbine vanes of engines. Softer versions by their un-fiberized 'shot', can cause temporary mechanical irritation to skin, eyes and respiratory tract upon contact. The Saffil HIPPA Blanket (HIB) is available in thickness of 13-25 mm, a maximum length of 48.5 feet, and a width of 2 feet, and it also resists temp up to 1600° C. Hence, it is suitable as a strut to be air dropped over the fire zone to act as a mechanical fire extinguisher by blocking air/$O_2$ supply, while it never catches fire. Saffil blanket sheet about its exposed surface layers is saturated with aluminum spray to cause no 'shot'. Strut burlap (made of jute fiber) is an alternative but can be heavy when wet.

While Strut air-drop creates a physical barrier by blocking $O_2$ supply from the top, the generated $CO_2$ from the fire that is warmer and lighter accumulates just beneath, both means being very effective in smothering the fire.

Protecting a jack up rig—the devised modular fire escape station of a jack up rig though exceptional in saving the lives of the rig crew, the rig along with expensive rig amenities, unlike the DIR, can be subject to a total destruction. Additionally, some crew members can be left out about the time the fire escape window doors are closed. Hence, it is paramount that a helicopter and the helideck are always ready for an instant flight and air drop of Saffil struts, while the crew can yet temporarily hide under the sprays of the roofed spray walks and the spray room, where they can also be protected from $CO_2$ smoke inhalation, the predominant $CO_2$ and the particulate matter being washed away by rapid water turnover of the sprays. Gas fueled fire can quickly turn into a raging inferno, unless the fire is curtailed at the outset by most effective measures, wherein wide spread rig sprinklers, the old-fashioned 'tried and true' fire extinguishers, with forceful jets, still taking the top spot. There is no reason why the whole rig, in the midst of ocean size waters, is not covered by sprinklers (that also have the incentive of washing off $CO_2$ and particulate matter to a large extent), wherein some high powered jets can be directed from a distance to areas that cannot be directly covered, for whatever reason. The novel fire escape measures herein described are unsurpassed in their own way, whereas a contemporary application 'WELL BORE TO OCEANIC DIVERSION OF A GAS ENTRAINMENT WITH PREVENTION AND RESTORATION ABOUT A WELL HEAD BLOW OUT' (U.S. Ser. No. 17/803,746) by the Inventor, is exceptional in preventing the most common instance of well and rig fire in the first place. Without simultaneous application of said inventive measures, the instant disclosure can be only considered as 'incomplete'. The Inventor's most recently filed application (U.S. Ser. No. 18/831,909), titled 'COUNTERING NATURAL DISASTERS—FOREST AND DWELLING FIRES, GLOBAL WARMING WITH EXTREME SUMMER HEAT, HURRICANES, FLOODS, AND EARTH QUAKES', is relevant in this context for many fire countering measures it teaches, despite being written as terrestrial in scope.

SUMATHI PATURU'S HIB STRUTS (HIBS)—a rectangular HIB Strut (HIBS) 812 is made of a Sheet of HIPPA Blanket (HIB) 817 (FIG. 16) with a thickness of 13 mm, a width of 6-8 feet, and a length of 48 feet (when spread out), wherein the lengthwise dimension is folded to minimize the length to 16 feet, if carried by a helicopter while variations are not precluded, smaller versions being carried by a heavy lift drone. The HIB 817, as noted, resists temp up to 1600° C. The HIBS 812 has a central pivot and on either side about the lengthwise dimension has two down going thin flexible ribs of ceramic matrix composite (CMC) of Saffil Allumina (CMCA) or else a thermoplastic (of thermo-elastomers/thermo-rubber) with memory, wherein said rib frame holds underneath the HIB 817 of similar dimensions, as shown in the schematic FIG. 16, not drawn to scale. Each rib as a framework 820 with three segments, is folded twice inwards, the outer segment 826 folded onto the middle segment 833, and the outer-middle segments together folded onto the inner segments 834. The segments are measured to be ⅓$^{rd}$ of the dimension of the radiating rib frame work on either side, and when the strut frame-work 820 is fully folded as described, the bent-in folds between the outer and middle segments 826 and 833 are positioned about the center of the strut frame work 820 that has a small circular central perforation 837.

As devised, the folded strut has a length of 16 feet spanning 8 feet on either side of the central pivot, such measurements being accommodated by the HIB available in a length of 48.5 feet, whereas the width can be tailored by the Saffil manufacturer. Two central ribs in the widthwise dimension, each spanning 3-4 feet, and radiating from the central pivot, is an option. The HIB 817 near its edges about the lengthwise dimension is held loosely by eyelets 838 to the outermost rib segments 826 of the rib frame work. Lengthy Dyneema strands (generic ultra high molecular weight polyethylene strands; the Dyneema fiber though flexible, is 15 times stronger than steel, weight for weight, and is also highly abrasion resistant) 842 covered by fireproof HIPPA paper (of thickness 0.5 mm) (aluminum sprayed) and originating from the conjunctional area of the outer and middle rib segments 826 and 833 (now located about the center of the fully folded framework), pass through the central perforation 837 to travel for a predestined length to pass through a metal tubing (not shown in the drawing) of about 1 foot linear dimension, where after they are conjoined and held by the pilot along with the metal tubing. To prevent tangling, the Dyneema strands are bound in a thermoplastic sheathing 824. About the conjunctions of the outer and middle segments 826 and 833 (that are positioned near the central perforation when folded) of the rib frame-work, there are eyelet ring structures (not shown in the drawing) through which a Dyneema 'purse-string' strand is passed, tightened, and knotted, so as the frame-work 820 stays folded. The HIBS 812 is supplied in a zipped sac fully folded, while the lengthy Dyneema strands 842 held together by the sheathing 824 are conjoined at the higher terminals after passing through the metal tubing. Each Dyneema strand 842 passes through the HIBS 817 creating no perforation in its center, as the it has to be totally intact, to prevent passage of air/$O_2$ through it when dropped onto the fire zone.

After rising to a safe preconfigured altitude about the fire zone, the pilot slides the folded HIBS 812 about a foot down into the air, and then cuts off the 'purse-string" knot, and slowly lengthens the sheathing 824 allowing it to descend. During this time, the strut's own weight keeps it from unfolding while the strut frame work 820 is still supported by the Dyneema strands 842. The aircraft flies in a preconfigured altitude so that when the sheathing 824 is fully lengthened, the fixed length of the sheathing drops the strut to the top of the flames where the Dyneema strands 842 are ready to be released when the strut is properly, positioned. There should be at least 15 feet distance from the top of the flickering flames when the Dyneema strands 842 are released (it may be recalled that each unfolding rib of the frame work 820 by itself is of 8 feet dimension). When the HIBS 812 is ready for an air-drop, the pilot cuts all the Dyneema strands 842 just below the site of their conjoining above the metal tubular, when the rib framework with memory is released to be unfolded and spread out, while dropping the underlying HIB 817 onto the targeted area. The eye-lets 838 about the periphery of the HIB 817 hung loosely but are not tied down about the outer segments 826, now slide down from their down-slants when the rib segments are spread out. Two strong and lengthy Dyneema ropes 843 connect the center 837 of the strut frame work 820 to the top metal tubing, and after the HIB 817 air-drop, the whole strut frame work (CMCA) 820 can be drawn-up via the ropes 843 to be retrieved for recycling, a worthwhile measure for such large structure. In like manner, the sheathing 824 connected to the metal tubing is also retrieved. The air drop crew must have security harnesses that go around the waist and both thighs, and are securely tied about the helicopter's door-way.

Following the drop of the first HIBS, the aircraft hovering above moves 23 feet forwards and will slide down the second strut to be similarly air-dropped, care being taken for an overlap over the previous strut by at least 1 foot. In the case of a strut burlap, the burlap is fully water-drenched by immersing the strut burlap in a water tank of the air craft. With their great dimensions, a burlap also efficiently smother the fire by cutting off $O_2$ supply about any fire zone it covers. Burlap is a great fire retardant and it is especially good when wet. However, the weight can be substantial and a mechanical device is needed to hold the strut burlap during its descent. The Dyneema strands and ropes are very effective, having proved their strength as parachute strands. The cost of a HIB/burlap is worth the fail-proof fire control it can deliver.

Water Provisions to Wild Fire Zones

Water transfer to remote wild fire areas is the central problem to fire control as the water hoses are not of unlimited length to reach the nearby lakes, ponds or nearest existing wells. Air-carry by existent means are also not unlimited. Accordingly, learning from people who live in the wild or rustic/rural communities lacking expensive modern provisions, is the key to work in similar areas like wild fire zones that are beyond the reach of all heavy duty modern equipment. Digging a bore hole in each of the wild fire zone in the fastest way can be a practical solution. The expert environmental agencies can access and explore some simple means of DIY projects that are easily accomplished with minimum time/equipment. There are quite many but these are some of them—

(1) 40 feet in minutes—best method to dig a well; (2) Homemade jet—fastest way to dig a well—easy DIY complete guide; (3) How to drill a well—most powerful home made jet—a complete guide; (4) fastest way to get water—new method—how to just drill a well using a mud pump and pressure washer; (5) Fastest way to get water—how to jet a well with pressure washer and connect pump, a complete guide. All of them come with a step by step video-clips. However, prior ground water detection should be done by PMR (proton magnetic Resonance), an easily portable device, its recordings interpreted in site in few seconds (Wiki Water). By experience, the time taken for bore hole digging based on the nature of the soil should be known and by any means, it should be less than the estimated time that the spreading fire can encroach the area. To avoid such danger of approaching fire, the bore hole digging area should be sufficiently far, but in a reachable distance for water transfer by mediating relay stations, as described below.

Very rocky areas like hill slopes and such, may not be amenable to the above, wherein water transfer from the nearest source is the only choice, as penetration of rocky tables can be difficult and time taking. The following devised by the inventor should be perfected by practical means as no precise numbers are herein proposed, but a plan is proposed which can be quickly carried out to respond to a fire before it is out of control.

Water Transfer to Wild-Fire Zones (Sumathi Paturu's Technique of Aerial Water Transport from a Distant Source)—

Relay stations—from a remote water source, 4-5 or more relay stations should be quickly planned in equidistance. For example, they are called A-E, A being the first relay station from the water source, and E being the last, near the fire zone, the distance between each being lower than the length of the available water hose. Each site is cleared of trees and shrubbery to create a reasonably flat ground to accommodate 4-5 portable collapsible large water tanks as also a high pole 40-50 feet height with a terminal tongs like structure. For easy transport, the pole is made segmental to be threaded together at the site. The pole is bound to a tree trunk, the tree in this context being carefully chosen. One with a straight trunk and few spread out branches are preferred, the Loblolly pine, Austrian pine, Long leaf pine, Gray pine, Canary Island pine and Norway pine that grow tall and lose lower branches as they age, being suitable examples to easily anchor a pole. Any other tree types that are prevalent can also be chosen as long as their diverging branches are not too much interfering. The collapsible large water tanks differ few inches in their dimensions, to be stacked up for easy transport by an air-craft. Three sets of water tanks (4-5 each) are necessary to carry out the operation. The pole should be present at the water source also.

Hydrogen Aerial Tubing—the fire stations should also have a thin but sturdy-walled tubing structured with parachute like waving through out, its diameter 3-4 times (it is only a near approximation) larger than the water hose itself. It is filled with hydrogen gas through out under no pressure, as high pressured containment will add to the weight, as the aim is to add more air-lift (pay load) than weight. The tubing is used for aerial transport of water from a distant source. Hydrogen has smallest atomic size and is the lightest gas prevalent in nature (14-15 times lighter than air), and for the same reason it can penetrate through rubber and plastic in no time, and hence, the tubing material should have aluminum coating (by some microns of aluminum vapor deposit). The preferred material at present is polyethylene therephtalate (PET) sealed by thin layer of aluminum vapor (Bo PET). It can also be coated outside by aluminum paint to be protected against sun light (used by NASA spaceships to contain Hydrogen used for air-lift). The tubing can be additionally covered by Dyneema (brand name) (ultra high molecular weight poly-ethylene fiber) which is flexible yet tougher than steel (15 times) and Kevlar and resists all types of punctures and abrasions (which is very much required in this setting). Yet, the tubing can be made of 3-4 compartments, so as not all will be lost upon an injury. Hydrogen hoses are used by stations that cater to hydrogen powered vehicles and their usability can also be explored, and they are many layered and made very stout. Helium (has double the weight of hydrogen) is another gas of choice, contained by rubber except silicon. Normally, the water hose is connected to the Bo-PET hydrogen tubing (WHB) by intermittent closely set strong bindings that are separated only when necessary.

The pole terminal—the FIG. 16 E illustrates the devised configuration of the terminal of the pole 74 that aids the aerial positioning of the WHB basically actuated by the hydrogen tubing. The tong structuring at the top terminal of the pole 74, as a means of easy detailing, is described to have a pair of graspers 72 above, and a pair of handlers 73 below. Indeed each grasper 72 is an extension of the handler of the opposite side. The structures crossing each other in the center, are hinged by a central pivot 23, about which they move to come together or diverge apart. The tongs being structured like scissors, also opens and closes like the scissors, that is, when the handlers 73 below move to the center towards the pole 74, the graspers 72 also move towards the center closing the circular space between them, the latter created by the sickle like shape of the graspers 72. The handlers 73 at their free ends are configured to have helium capsules 26 by which the handlers 73 in their natural disposition tend to be lifted up thus moving away from the center while also making the graspers 72 also move away from the center, a designing that keeps the space between them wide open. Strong ropes 48 made of Dyneema fibers are firmly affixed to the handlers 73 as shown in the drawing, and the ropes coursing down cross each other in the center, and further down about the opposite side, each rope passes through a hooded pulley 38, to then course downward to the ground where they can stay free, or pass through a ring structure arising from the pole 74 on either side. In such disposition, if the ropes are also pulled down over the pulleys, they bring the handlers 73 to the center while also closing the graspers 72. A drone flying over the pole 74 carries the WHB to the pole terminal from the ground where the WHB is connected to the water source. The drone holds the WHB at a measured distance equal to the height of the pole, and maneuvers it to pass through the open space of the pair of graspers 72, and after the WHB is positioned in said opened space, the ropes 48 can be pulled down by the ground crew and be tied with each other by a surgical knot, so that the positioning of the WHB within the graspers 72 is not undone until the graspers 72 are again opened by releasing the ropes (when needed), when also a drone flying lower down, picks up the WHB by a similarly operating tongs to bring it to the ground.

The pole stationing is carried out as follows—to start with, a ring structure is drilled into the tree trunk that the pole is elected to be anchored to, as high as possible. The terminal of the pole with the designed tongs is passed through it from above, and the segment lower to it is threaded to it, the maneuvering requiring two or more crew members. It is easier if all the segments are of similar configuration. As the segments are added lower down, the pole terminal gradually rises up until it reaches the destined height when the lowest segment (that is different by its ring structures) is added, and at times some branches need to be cut down to continue the course. Essentially, the WHB is risen to a height and stabilized there. Positioning the pole tangentially to let its terminal stay away from the tree, is preferred. Multiple anchoring ropes tie down the pole to the tree trunk, mostly lower down, yet sufficient to steady it. Such stationing of the pole prevents tangling of the water hose to the tree branches that can cause punctures and also major damage, as a single investment of buying it initially should serve for decades to come.

The Aerial course of the WHB—to start with, a siphoning suction devise is connected to the water source and such syphoning devices should be there in all relay stations A-D. The water hose was connected to it, but water pumping not yet switched on. A drone (preferably Griff Aviation Guardian and the likes with a pay load of 200 kg, or more) then carries the other end of the WHB to fly about a lowest height, to reach the first relay station A, where the water tanks are set up on the ground. The tanks have communication tubing so as the water flows between one another. The drone after flying over the opened tongs of the pole (where it will be steadied by the ropes) at station A, comes down to the ground. Now the terminal of the WHB is dipped into the nearest water tank, while a message is sent to the site of the water source, to switch on water pumping. The pumping is stopped after all the tanks are filled in, and the terminal of the WHB in the tub is steadied in its position. Following it, the drone goes back to the water site, disconnects the hose from the water source and the pole, and then caries the terminal to station B, which has the similar set up and similar distance as also having the second set of water tubs. The WHB after passing through the open tongs of the poll as before, dips the terminal of the WHB into the nearest water tank to fill all the tanks while the tanks at station 'A are being simultaneously emptied. The drone then flies to the station A to carry the emptied collapsible stack of tanks to the station C to transfer the water from station B. The process is repeated until the water reaches the fire site station E. At the fire site each tank has 4-5 wide caliber spread-out spraying tubes from the main tube, to spray a wide area from each tank about the same time. Having a third set of tanks at the fire site can facilitate the spraying process to be continuous, that is, as one tank set is being filled in, other set can spray water simultaneously without a pause. To repeat the process all over, two drones have to carry both ends of the WHB from station E and D to the station A as also to the site of the water source, while flying with synchronized similar speeds (while half of the water tanks can be carried by each drone). The relay stations can be planned and prepared during the time a bore hole is dug, so that the water transport can be immediately initiated.

Water jetting in $CO_2$ ejected area is a tricky situation. It was sufficiently detailed in earlier sections that $CO_2$ has a very high solubility and diffusion coefficient in water resulting a high affinity to the solvent, and immediate water jetting following $CO_2$ ejection or vice versa (with the notion that they are mutually beneficial), will make the gas unavailable for its intended function and sufficient time lapse should be allowed after it is made certain that the gas had not yielded expected benefits.

PROPELLERS—as water flows through the water hose, the weight to be lifted by the WHB is substantially greater. To aid the situation, very light weight propellers are appended in equidistance to the Bo PET tubing about the top, to swirl in a horizontal plane (opposite to the plane of swirling of the propeller of an aero-plane in its fore structure). The size and mechanics of the propellers can be similar to the smallest toy fan children use, with the blades encased as also in a fan, but the blades are tapering rather than spread out. The encasing frame work can be widely spaced being only a dimension smaller than the WHB tubing, so that they do not touch the blades in their swirling motion. The propellers can be battery or electrically operated, as a generator should be always carried by the fire crew, and at least one end of the Bo PET tubing is on the ground at any time. All the propellers or half of them can be operational as needed, as the aim is to keep the WHB tubing in the same height in the air when also the water is flowing through the water hose.

Recently, a small ceiling fan with 10-11 inches size 'blade encasement', is available in the market, and the unique feature is, it can be screwed into a light-bulb socket about the roof structure. Made as small as needed, it is a suitable model in this setting, as all the miniature fans can be screwed into as in a string, about the multiple sockets of a wiring electrically operated, and connected to a generator.

A wide spread fire zone is difficult to extinguish, however, its spread should be halted by guarding the fire-extinguished perimeter so that about $1/8^{th}$ mile away, a sufficiently wide area of trees and shrubbery are cleared to create a boundary of 'Mandated No Pass Perimeter' (MNPP) by the fire crew, of which arborists are a part. Even into deep forest areas, tree cutting equipment is carried by helicopters, to be assembled at the site, and the cut trees pulled out into the outer uncut tree area. If winds are blowing there is a danger of fire spread by sparks and cinders, but drones should hover outside the MNPP to ring an alarm if a fire is set up. As it is a localized area, extinguishing such fire is not difficult. If possible, wetting the trees in the outer boundary of the MNPP by a shower of sprinklers can be very protective. If water is sprayed onto the tops of the trees, the lower areas also tend to get wet, thus minimizing the effort as also the water used. The water spraying can be done from tree tops, the trees safely climbed by drilling stout pegs of foot rests higher up into the tree trunks as one climbs up. The fire station should always keep a large number of volunteers in reserve to be summoned for such spraying work, with the collapsible water tanks and hoses brought to the area, and water transported from the nearest water source or the dug bore hole. Vigilance at this perimeter is needed until no more fire spread is assured. Waiting for rain or snow to extinguish and/or to confine the fire is a terrible waste of nature's free bounty, that men at least should safe guard.

General measures—to keep the WHB in aerial positioning and not to be dropped to the ground, expert evaluation is needed to decide the caliber of the hydrogen tubing that in turn decides the volume of the hydrogen filling it. The fire stations in each geographical area should also know the height of the prevailing mature trees in the surrounding forests, so that the hydrogen tubing requirements are chosen accordingly that the tubing stays higher. Near the fire zone the terminal Bo PET tubing is dismantled from the water hose to a safe distance, as hydrogen is very combustible, and can also expand to heat. As an alternative thereof, the terminals are filled with helium, a neutral gas. The fire stations should carry hydrogen and helium cylinders and after each use of the Bo PET tubing, it should be tested for punctures and stored carefully for next use at which time there should not be any doubt about its intactness. Thoroughly patching of puncture sites should also be perfected by the fire crew. Use of WHB outside wilderness can be contemplated only after extensive experience with reference to safety profiles. However the mode of relay stationing of the water tanks can be carried out in a similar manner on the ground so that a distance that is double the length of the water hose can be covered with a single relay station, in a very short time.

Additional Options and Security Measures

The basement as the living quarters—wherein opted, the basement can be used as living quarters, with a cooking and dining area, indeed with added benefits. A gas alarm simultaneously rings in the basement as it rings in the upper level (it was noted that the gas sensors are deployed at different levels of the bore well), so that its ignition sources are immediately put off. In the 'fire triangle' of fuel-oxygen-ignition source, the ignition source is so eliminated. Methane, being lighter than air, the danger to a lower level basement is also eliminated from the fire triangle. The rig is better served as a smoke free area, as smoking can create a spark coinciding with a gas entrainment, though the latter is a rare event. However, when smoking happens on a daily basis, such coincidence is a sure event. Hydrogen sulfide is heavier than air, but due to its rotten egg smell, it can be detected at the upper level, and the basement locked immediately. Despite the basement made as living quarters, the fire fighters and the security crew are yet required to sleep in the upper level. The basement is provided with two emergency exit doors, wherein their outer structures are configured to articulate with a watertight 'staircase tubular' of an emergency marine unit equipped by the oil company to evacuate fire victims needing immediate treatment.

The medical aspects—the crew is required to be trained in water diving and in managing basic life support, intravenous (IV) line for hydrating a burnt victims (IV hydration being paramount in the treatment of burns), local care of burns, smoke inhalation, drowning, poisonous gas inhalation, shock, and oxygen therapy. The basement must contain large canisters (encased, to be unsealed as needed) of SODA LIME, to absorb carbon dioxide and carbon monoxide, when the basement is locked up following rig fire. Each crew member should have diving equipment in the basement, to get out of the basement through emergency exits. A SCUBA apparatus is the simplest under water breathing equipment suitable for the occasion. The basement's exits are opened upon an emergency, to exit in a 'diving mode', as, once a door is opened, water gets in instantly, and at least few have to wait. But, such situation is a rarity, as when other means of exits are not operable, and the exit doors are dysfunctional to articulate with the stair case tubular of a deployed emergency marine unit that may arrive to hospitalize critically unstable fire victims.

GENERAL PURPOSE ENTRY (GPE) TO THE BASEMENT—Wherein the under water basement is elected as a living area, a sturdy general purpose entry best serves the purpose. The following description in conformity thereof with the illustrating FIG. 8, enumerates such devised model. The general purpose entry on the base platform 124 is entered through a 'Housing Structure' (HS) 428 located about a basement corner 429, and rising far above the water surface 164, the housing structure accessed through a Top Entry Room (TER) 430. An Entry/Exit side Door (ESD) 431 of the TER 430 is reached from the inside through a Lengthy Stair Case (LSC) 432 arising from the floor 434 (conforming to the level of the basement platform 124) of an Exterior Staircase Room (ESR) 472, whereas it is accessed through a Smaller Stair Case (SSC) 435 from the outside. Said smaller staircase 435 adjoins a Bridging Structure (BS) 436 (connected to the DIR platform), the HS terminal of the BS 436 being situated on a Small Walk Way (SWW) 457, 15-20 feet long. A Floor Window (FW) 437 with a watertight Sliding Window Door (SWD) 438 about the floor 434 of the ESR 472 opens to the basement interior 130. The SWD 438 is 'water-sealed' upon a rig fire, wherein the top structure is burnt. The FW 437 opens to a Basement Stair Case (BSC) 439, the latter landing about the basement floor 452. The SWD 438 is opened by a remote key (carried by each crew member), and is designed to close in few seconds like an automated elevator door. The key additionally opens the ESD 431 of the TER 430. Outside the bounds of the FW 437, the ESR floor 434 is structured for a locking provision 454 for an 'entry tubular', the walls of the latter articulated in-situ (for an easy assembly), providing water tight approximation that rises above the water surface 164, to enter/exit as a temporary measure, when the surface structure of the ESR 472 is destroyed upon a rig fire. However, the ESR 472 and the permanent TER 430 need to be constructed soon.

THE BRIDGING STRUCTURE (BS) TO THE GPE—the small walkway 457 that the BS 436 is situated on, is built upon a sturdy concrete structure 458, the latter rising above the water surface 164, and is in a higher plane than the DIR's work platform. FIG. 1 shows a bird's eye view orientation of the HS 428 with adjoining BS 436, about the steering side corner of the basement platform 124. The BS 436 is configured in a 'Truck Crane' (TC) model, the 'crane structuring' 436 conforming to the bridging, mounted on a drivable truck 470 about the rig side terminal. The crane/bridging structure 436 is minimally inclined and resting on the SWW 457, however, not materially connected, such disconnection required of, about the time of the DIR's detachment. The drivable truck 470 is stationed on the DIR floor, whereas its loading platform (that is, the bridging platform) is in level with DIR's work platform. The bridging structure 436 is completely covered, so as the crew can use it as a walk way in any weather (wherein an overlapping approximation 450 will also protect from rain or snow). Yet, it can be instantly steered away due to its corner steering side positioning, thereby kept unobstructed in its course (FIG. 1). The craning BS 436 being rested on the SWW 457, it is most suitable for its designated function, with no strain imposed on its 'hoisting ropes' despite the tremendous trafficking. The BS 436 is protected by exterior layers of burlaps and self bathing sprinklers, whereas its terminal about the SWW 457 with out turned up-facing fans drive away the approaching gases. The devised passage doors about the enclosed bridging structure 436 are opened, when it is driven into the rig following DIR's detachment, and trafficking in the area is still possible.

An Off Site Fire Escape Modular (Sumathi Paturu's Off Site Model) Vital for all Types of Rigs Including a Dir with Intact Basement There exist many rigs without a safe and reliable fire escape plan. Additionally, the steering crew, the fire fighters of the DIR and the permanent base, and those that could not enter the spray room and left back in the steered away DIR, need a destination, especially in a freezing weather. There should be a safeguarded outside refuge as an 'off site' fire escape modular with sufficient medical amenities to care for the fire victims brought in for emergency care, as also to immediately air transfer the critically wounded, to coastal medical facilities, by air lifting from a boat about the modular premises. It is a better choice that the critically wounded fire victims brought to the spray room are taken to the off site modular by boarding a boat about the adjacent boat stand, rather than being taken into the fire escape of the basement, wherefrom moving to a coastal facility cannot be an immediate facilitation, especially if the fire continues to rage, as was in 'Deep Water Horizon' oil well and rig fire.

The off site modular though easily accessible to the crew, should be sufficiently distanced, as the oil may collect more at the interrupting rig side edge of the modular, and fire can reach upon surface waters. However, it is only a far fetched occurrence, as the fire fighters will not, and should not let the fire spread on the oceanic surface towards the modular, though oil may collect about its edge.

The FIG. 9, a schematic not drawn to scale, illustrates an 'off-site' fire escape modular housing, either small or moderately sized. The weather resistant modular housing is structured on a base 59 with a flat board (barge like) configuration. Said barge like base having down sloping edges with small poles and hand rails facilitates boarding a fire victim from water, by a single rescuer. The barge base is safe guarded with metal-shielded edges, as also jets of water 64 emanate forcefully about the edges preventing approaching fire of oil laden waters. About the outer walls of the modular housing, built in watertight compartments 56 store stretchers and rescue supplies, for immediate access.

The general outlining of the modular—the modular has a Bottom Room Structure (BRS) 50 and a Towered Top Structure (TTS), the latter having a Towered Roof Room (TRR) 51 with a terrace 62 around. The BRS 50 has a staircase structure 58 on one side, to access broad Sliding Doors (SD) 53, set forth about the TRR 51. The SD 53 are 5-6 feet high, and slide sideward into the walls of the TRR 51 by a remote control, whereas hand controls lock them from inside. The staircase structure 58 serves as general purpose entry. The BRS 50 also has an entry with high set threshold and watertight BRS Entry Doors (BRED) 54, with mini ramps on either side, protecting its interior from giant ocean waves. The BRS 50 is kept locked, except to emergently let in injured victims, and it is fully equipped with medical rescue amenities.

The exterior and interior of the modular—the BRS 50 is designed with air capsuled PVC flooring that conforms to the center of the wooden barge, and gives buoyancy to the unit with no strain to the legs it is anchored to; the TRR 51 houses a spacious hall, about the side of the staircase 58 outside, the hall comprises of a down going staircase leading into the BRS 50, wherein the staircase is sufficiently broad to carry injured victims in stretchers; both BRS and TRR have windows 57 fitted with bullet proof glass doors and night vision video monitoring devices; the TRR 51 is structured with a high tower 52, housing a guide light 65, the latter described below; the BRS 50 comprises of helium sacs secured to its ceiling or else it is structured with a flat helium chamber about the ceiling, ensuring stability of a swaying unit upon ocean turbulences.

The guide light—the TRR's high tower 52, is structured to have a top glass closure, housing a large rotating (about 180°) high beam sky light 65 facing skyward. It is put on by the residing crew as the fire alarm rings, whereby the strayed crew members in ocean waters are directed to the modular. Spanning day time, the light is pastel colored as lavender, yellow, or pink that contrasts against the blue sky. Additional high sounding bells are an option. The tower's top glass closure is devised break proof, and is warmed by heating coils about freezing weathers.

The anchoring of the modular—the modular lit by solar powered lights at night fall, is anchored to the basement of the DIR, or to the submerged legs of a Jack up rig below the surface water, by units of metal strings 6, each unit having two strings. Each string is made of sturdy but narrow metal rods or poles 67, about 2-3 cm diameter. In each unit, the adjacent metal rods 67 of a string are connected by a linkage ring 68, wherein said rings of one string are connected to the centers of the rods 67 of its paired string. The FIG. 9 illustrates them in a magnified schematic. Such an arrangement prevents the strings from sideward bending or sinking, so as to maintain their desired axial length, whereby the modular is precluded from floating closer to the rig. To serve a similar purpose, the strings 6 are anchored to the modular or to the rig by direct hardware bolting of the rods 67, with no connecting linkage rings. The devised arrangement helps to distance the fire spreading on water, and the wind blown gases to be dissipated before they can breeze to the area of the modular. The units of coupled strings 6 are multiple, and they are clustered at the rig side, while fanning horizontally about the modular side. As an alternative thereof, they can fan in a vertical disposition about the rig side, and fan out horizontally approaching the modular, such arrangement leaving needed space about the rig periphery. The length of a rod 67 is configured to be long, that only few of them are incorporated. Submerged threading of low voltage solar lights accompany the strings 6. Intermittently, the metal rods 67 of the strings are configured as air filled cylindrical capsules in a manner that the strings may not float to the surface, yet carry their own weight with no strain to the rig they are anchored to.

Provisions for the stability of the modular and its interior—the modular is better stabilized as the helium is filled in the flat top compartments in a volume far larger than the bottom air capsule. When the ocean is exceptionally turbulent, the modular may sway, but comes back to its upright positioning due to the helium resisting such instability. All the structures within the modular are built in. The sleeping beds are bound, and the utilities of the kitchen/dining and others are made unbreakable. The barged base also provides much needed stability to the modular. By any means as during construction, helium may not be inhaled in large amounts, as it can proportionally reduce oxygen content of the blood with untoward consequences.

Heating of surface waters—submerged heating coils accompany the metal rods 67, to be put on in harsh cold weathers. They can be solar powered also. The modular best serves its purpose, as the crew can swim to a known destination not far away, its direction led by the anchoring units, and its path lit up. The lighter inflammable gases may not access surface waters, even adjacent to the rig, as they usually ascend or spread sidewise, but not descend in an open expanse of the atmospheric air, and swimming to the modular is safer than it is anticipated. However, carbon monoxide has the same density as the air, and $CO_2$ is heavier.

Safety and utility provisions—for rigs having no in situ or in site fire escape provision, the off site modular serves as a sole refuge. It is also the refuge to the fire fighters of the DIR evacuating the stationary rig, and those strayed in ocean waters. The modular also serves as a destination for life boats/lift boats that can be temporarily chained to the safe side of the modular.

The crew signs in through 'entry data portals'. A key person keeps vigilance to the events of the ocean waters, and about the rig far away, through night vision binoculars. At least two security crew members stay in the modular on a regular basis. Upon rig fire, water is pumped from greater depths of the ocean. Two days worth of food supplies for the whole crew is stored in the modular to use and refill prior to their expiration dates. The modular is monitored by drones as also by security guards.

An alternate means of anchoring the modular at a safe distance from the rig—if doubt exists that anchoring a modular to the legs or to the submerged base structure of a DIR is an undue strain, as a better alternative, it can be structured on a single leg from the ocean bed, at a desired distance from the rig. The leg must have a broad base for needed stability. Few attachments to the rig are still in place, to stabilize the heating coils and solar lights. The unit's barge like base is yet positioned about the ocean surface without an 'air gap', whereby a single person can board with a fire victim. The BRS entry door (BRED) way for the fire victims is set forth with two watertight doors, one with a bottom threshold of ½ foot height and the other of 1 foot height, with ramps on either side, the door of the lower set threshold being closed about the times the water tides rise, flooding the doors. Such structuring serves the dual purpose that the modular is protected from flooding, and also provide an easy and safe access to the fire victims and their single rescuers.

The Fire Escape Model for a Conventional Jack Up Rig (Sumathi Paturu's in Site Model)

FIGS. 10 and 11, not drawn to scale, illustrate a Jack up rig based fire escape unit. The following description, in conformity thereof with the figures, enumerates such devised model. Structure 197 represents a spray room in a jack up rig 1, supported by its legs 2. A 'water seal' about the fire escape entry of a Jack up rig is herein created by an incomplete shell of water enclosure 47, said enclosure having four walled outer structure 37 and four walled inner structure 33, each having a bottom, but open about the top, with water circulating between the inner and the outer enclosures. As the inner walls 33 of the water enclosure rise above the outer walls 37, water overflows as a 'water fall' 39 about the outer walls 37 into a small water tub 40 that surrounds the outer walls 37 about the spray room floor 41. The interior of the water enclosure 47 comprises a 'Top Sliding Room' (TSR) 32 and a bottom 'Water Seal Room' (WSR) 34. The TSR 32 is set forth in the spray room 197, whereas the bottom WSR 34 sunken below the spray room, stands on a sturdy traversing structure 43 that courses between one leg to another, and materially structured similar as the legs. It may also be supported by a strongly configured dipping floor of the spray room itself. The two rooms within the water enclosure 47 are separated by the TSR's fire retardant floor 48. The floor 48 of the TSR 32 comprises one or more floor windows (as per the dimensions of the TSR) 46 through which sliding unit(s) 17 course down from the top of the TSR 32. The sliding unit(s) 17 span about the lengthwise dimension of the TSR 32, to reach the floor 44 of the WSR 34. Each sliding unit 17 is made of a top structure and a bottom structure with a small gap between the two, to create an intervening space of 4-5 inches for a fire retardant window closure 5 to slide sideward like a car roof closure. The gap between the sliding structures 17 is covered by a rubber sheet 3 that lifts up when the window closure 5 moves towards the center to close the floor window 46, whereas the rubber sheet 3 moves down to close the gap of the sliding unit 17 when the window 46 is open. There is one staircase structuring, said staircase being structured to curve in a shape of C or S within TSR 32 and the WSR 34, so that stretchers of fire victims can be carried over a smooth sloping incline to reach the floor of the WSR 34. It can be made as a ramp also. The sliding unit(s) 17 is/are mostly devised to swiftly transport the crew from the spray room to the under water fire rescue modular 42. The spray room also has staircase(s) 45 about the fire escape entry to reach the sliding unit(s) 17. These staircase structures 45 are not solid, and are designed as frame works that overlie the area of the water fall 39. The water in the tub 40 is continuously let out, preventing flooding about the spray room floor 41. The spray room has spray poles 25, their structure and function similar as those within a spray room of the DIR.

The slide tubular—the floor 44 of the WSR 34 sunken below the rig level also accommodates an originating slide tubular 28, the tubular 28 steadied in the air gap by supports from the floor of the rig, while some paired slings of overlapping metal rods such as unit 6 of FIG. 9 described for the off site modular, can also anchor it to a leg underwater. Multiple water feeders 8 originating from deeper level under water, ascend through the roof of the slide tubular 28, to reach the water enclosure 47. The tubular 28 about the air gap and the sunken water enclosure 47 are protected by layers of burlaps and wide caliber self bathing sprinklers originating from the feeders 8. The slide tubular 28 courses curvilinear to the devised fire rescue modular 42, the latter submerged below the water surface 164. In large rigs, due to lack of needed stretch of space in any particular area, there can be more spray rooms 197, and one or more rescue modular units 42, anchored to different legs of the rig, distributing the imposed load, said anchoring made sturdy with materially similar structuring as the leg. There can be a separate slide tubular 28 with staircase provision and a gradual slope, to carry fire victims in stretchers, as also to return to the rig from the fire rescue modular 42.

The fire rescue modular—the modular unit 42 (FIG. 11) comprises an entry room 10 and a main area inside. It has break proof glass windows to monitor the events outside, and to be guided as to when to lock its door 12. The modular 42 has an air capsule 14 in its top structure to attain buoyancy and not to impart undue strain on the legs, to which it is secured by strong supports (such as the overlapping rod structures 6 of FIG. 9 pertaining to the off site modular, so that undue mobility and collision with the leg is precluded). Said supports originate from sturdy transverse structures 20 of the leg. There is an emergency exit door about the modular unit 42, and SCUBA devices are provided to the crew to exit in a diving mode. The crew can also get out through a rescue marine unit similar as in the DIR.

Entry of the crew and water sealing of the fire escape-upon a rig fire the crew should enter the spray room, wherein a fire proof safe contains remote controls for the sliding window door 5. When a person is ready to slide down, he opens the window door 5 by the remote control, to slide down immediately through the sliding unit 17 into the WSR 34, as the window door 5 automatically closes in few seconds. As an alternative thereof, a button adjoining the sliding unit 17 can also be configured to open the window door 5.

The water sealing of the fire escape entry—in case a gas fueled fire is uncontrollable, and had spread to the spray room, the inner wall 33 just below the risen part, is the structure that is consumed first, whereby the circulating water within the water enclosure 47, flows into the TSR 32, water sealing the sliding window door(s) 5 and the WSR 34. For an unfailing water seal, an area about the inner wall 33, is made of a material that is easily burnt and is crumbled by heat, to let the water flow-in instantly, if the interior of the water enclosure 47 is engulfed all at once by the spreading gas fire that can otherwise enter the WSR 34. To that effect, a circumferential area just below the top risen part of the inner wall 33, in multiple areas, is made of stout metal mesh filled with wax, these meshed bottoms inclining inwards to direct the molten wax into the TSR walling, to instantly create many gaps in the inner wall 33 for water to flow into the TSR 32. Additionally, upon ringing of the TSR gas alarm all the sliding window door(s) 5 are designed to be shut, while also are water sealed soon.

The modular safe guard—it is imperative that the modular unit 42 is sufficiently protected. The obvious danger is the heavy weight structures of the rig losing their footage and tumbling down, at least their tail ends falling onto the modular 42, as an early or a late event upon a rig fire. A modular surface guard 31 (FIG. 11) is a protective structure secured to two legs and positioned in an incline covering the modular all through its linear stretch about the legs, to obstruct and divert a falling structure. The surface guard 31 also has redundant chains 9 anchoring it to the legs under water. The legs have self bathing sprinklers about the air gap, as these are the back bones of the rig, and should not crumble even upon a deadly fire. Spanning all through the length, the surface guard 31 has a top air column 7 that is devised to be larger about the leg side, thereby creating a desired incline of the surface guard, to let a falling structure tumble into the ocean and diverted away from the modular 42. Additionally, the surface guard has studded bottom magnets 23, wherein their lower magnetic poles facing the modular unit. 42 are similar as the opposing poles of the magnets 15 studded about the top of the modular 42 creating repelling forces and preventing a damaging impact with the modular. However, if world wide experience had taught that the floor of the rig had not collapsed even in a catastrophic rig fire, the modular unit 42 can be structured right under the rig.

Wherein the surface guard 31 had not resisted the weight, and had broken off from the leg, it still protects the modular 42 by several means: (1) it resists sinking by its buoyancy and is precluded from being swept away by virtue of its redundantly anchored chains 9 that remain intact by not taking the impact of the heavy weight when it had fallen; (2) it maintains its devised incline making the weight drift into the water; (3) it will be repelled by the modular 42 so as the weigh will not impact the modular 42 with an exceeding force, in the event the chains 9 break under the weight of the fallen object; (4) its underwater disposition makes all the contacting objects lighter than they actually are.

MULTIPLE EXITING SLIDE TUBULARS—a jack up rig can have an additional provision of safe guard against rig fire, said provision being the 'multiple exiting slide tubulars' structured in remote and upper levels work stations with no access to spray walks or water tracks. The originating rig side of the slide tubular resembles a shower cubicle of high caliber sprinklers (with an inch of water stagnation), and is devised to be a water seal to the exiting tubular. In a corner away from the direction of the fire and free of sprinklers, a raised floor entry to a lit up slide tubular is structured with its lower end leading to a 'flat terminal' in superficial ocean waters not far away, the terminal's water tight door normally kept bolted.

Exiting people swim to surface waters from a swimming pool depth of the flat terminal, to then reach the off site fire rescue modular, the ocean course warmed up by heating coils at a deeper level. Soon after the bolted door is opened to exit, the terminal part of the tubular is water filled, which is so cautioned upon the door, and hence, swift movement is urged. Once opened, the door stays open. The exit tubular comprises hand rails throughout and occasional resting foot pedals about the sides to slow down if needed, its course also punctuated by 'speed breakers' at strategic places. The flat terminal is heavily padded with water proof cushioning, there being also a mandated speed breaker short of the terminal. An exit tubular can be added as a modular structure to the existing Jack up rigs, to be positioned away from tall heavy structures, or else exiting should be an early event upon a rig fire. The model however is not suitable for temperate regions where surface water may freeze in icy zones. The earlier described 'in site' fire escape modular can be receptive to the exiting tubulars in such areas. In the event that superficial waters are warmed up by heating coils, the boats devised for icy zones (detailed later) are mandated to be hoarded in the flat terminal. The model also can be used for the fire rescue station of the stationary rig in the set up of a DIR 108, and all the fire fighters after a loud announcement by a key member, will be getting out through a bigger flat terminal wherein the 'first arrived' should be awaiting the rest. A lift boat is a suitable provision at this terminal, whereby a fire fighter maneuvering a severely injured member to the surface, can also easily lift him into the lift boat. The 'air gap' course of the tubular is guarded by burlap layers and self bathing sprinklers, fed by interior tubing. A suction device above the water level of the slide tubular drains the water back into the ocean, whereas the heating coils heat up the tubular after the event is over. The flat terminal and the adjacent underwater tubular have strategically placed air capsule(s) to make the over all structuring light weight, whereas the tubular traversing the air gap about a Jack up rig or the stationary base structures of a DIR, is supported by vertical, horizontal, or tangential bars from adjacent rig structures. The strings of overlapping metal rods similar to those shown as 67 in FIG. 9 can additionally anchor the tubular to a nearby leg immediately beneath the surface water, so as they can prevail even if the supporting bars collapse. The exiting slide tubular is the single most useful exiting and fire escape device, in any number, that the crew can count on.

FANNING COVERS—for the extreme complexity of a rig, no single emergency measure addresses all the structural diversities that are expected and encountered. For that reason, multiple devices to be fitting for any one of the diverse structures and encounters, are herein described. An explosion accompanied by rising inflammable gases on fire, to surround the large and tall structures of the rig, is one of such diverse encounters. The devised fire protective jackets of these tall structures that are instantly made wet by studded sprinklers, can be a saving measure to some extent.

Additionally, as 'gas chasing' measures, all tall structures of the rig can comprise a steel grid of scant exoskeleton (with or without conforming to structural locomotion), wherein suitably sized fans are scattered in strategic positions to be instantly turned on upon a fire/gas alarm, to blow away the gases approaching from the direction of their source. Unlike rig cranes, they are structured easily upon a derrick with no locomotive function. The fans with minimally sized stems solely face the direction of the rising gases about the source, and are made of light weight metal, wherein each blade tapering as a spike, spans at least five feet length (two blades being functionally optimal). The fans drawing in fresh air from the opposite direction at the outset of the event, force the lighter inflammable gases to rise to the sky, and not to spread sidewise. Said grid of frame additionally has self bathing sprinklers all through, drawing water from deeper ocean. Tall structures with significant locomotive function, and structures like rig cranes with telescoping towers, after they are wholly deployed, can still have such fans and sprinklers appended to their exterior without affecting their mobility, said appended structures to be initially removed upon their future time of dismantling.

The gas chasers about the conduction platform—about the conduction platform, clustered around the marine riser and the drilling conductor there are high powered fans, activated by the well site gas alarms, to drive away the approaching gases sideward, that they will not breeze into the rig nor rise up towards the derrick. About the bottom framework of the derrick, fans are appended and are configured like the domestic ceiling fans, however with a 45° tilt, wherein the wind blown by the fans are in the same direction as the other fans are directed to. The guiding principle in utilizing the breezes of the fans to blow out the inflammable gases is—the direction of the breezes from all the fans must be synchronized towards one direction, and preferably in any rig, it has to be chosen as per the dominantly prevailing direction of the wind in that part of the world. In the area of the conduction platform that direction is kept open when ever feasible.

Cylinders of Compressed Oxygen-free Atmospheric Air (OAA) or compressed $CO_2$ ($CCO_2$)—as the well site gas alarms signal major catastrophe, the vigilance squad (VS) wearing closed circuit SCBA mask and stationed about the conduction platform, instantly opens the enormous cylinders of Compressed Oxygen-free Atmospheric Air (OAA) or compressed $CO_2$ ($CCO_2$) kept in reserve, for the OAA/$CO_2$ to admix with the approaching inflammable gases, to avert an explosive fire. Compressed OAA/$CCO_2$ cylinders should also be appended to the frame work of the derrick at the lowest level (that is, lower than the installed area of the fans), and the OAA/$CO_2$ released upon a gas alarm. Both OAA and $CO_2$ being heavier, they encounter the inflammable gases as soon as they approach the rig level. The VS, specially consigned about the time of down hole completion, is vigilant round the clock for the well site gas alarms. The VS must be aware that the soda lime within the canisters of the SCBA masks are exhausted in proportion to the amount of $CO_2$ exposure. Other crew members must leave the area before the cylinders are opened, to get to the 'spray walks' leading to the fire escape entry, and they are allowed into the area only after the atmospheric oxygen/$CO_2$ levels are optimized. The COAA/$CO_2$ cylinders are clamped as soon as feasible, and they are vacated from the rig soon after the passing of the event. After the critical time had passed, regular atmospheric air is released into the rig confines, to make it safer in emergent manner. The atmospheric air is stored in compressed atmospheric air (CAA) cylinders that are brought to the rig about the time of down hole completion and kept in the DIR basement, or kept under water by restrictive holders in a Jack up rig, to be brought up to the rig, if needed. After the down hole completion, unused cylinders are returned to the land. The VS should also use specially designed large standard type 'fire-extinguishers', capable of pressured distant ejection, in case gas-fueled fire starts in the area.

A contemporary application 'WELL BORE TO OCEANIC DIVERSION OF A GAS ENTRAINMENT WITH PREVENTION OF A WELL BLOW OUT' describes how the gas entrainment is mostly diverted into the ocean waters (from the well bore as also from the marine riser) and that only a meager fraction is reaching the rig level. A thorough review of said application is a suggested mandate for a wholesome understanding of available remedial measures and a meaningful management of a rig fire without losses of life or expensive amenities.

FANNED CURTAINS—it can be a saving provision for the rigs to additionally have a curtain of high powered fans (structured as in the foregoing) in a tall arch of metal grid (to be erected as tall as necessary) rising from the sea, and spanning from one side of the rig to the other (preferably over the fire proof corridor 110 of the DIR), shielding the rig and its tall structures from the side of danger. The arch of frame additionally supports powerful jets of sprinklers. The high arch is supported by strong metal/concrete base structures, the latter with top air capsules, situated beneath the water surface. Said base structures are restrained in place being affixed by sturdy bolting hardware to the cross bars about the legs, said cross bars materially having similar sturdy structuring as the legs. The air capsuled base structures should remain under water. The tall arch will not preclude the DIR 108 from steering away, as its course is towards the opposite direction, while the rig's tall structures are protected during the few minutes it is preparing to be detached. It implies powerful fans are also situated within the corridor 110 of the DIR. It better serves the purpose if the arch not only passes over the rig but also through the rig in a jack-up rig, which, obviously can be done easily during the construction of a rig.

PROTECTION OF ROOFED/CLOSED ENCLOSURES—the enclosed structures within the rig have no easy or known means of countering provisions, in the event a gas fueled fire engulfs in an instance. To minimize the catastrophic consequences of such an event, a rig should elect to have chimney structuring to roomed enclosures, the chimneys having widely spaced outlets to let off the lighter inflammable gases. The rig should additionally have a circuiting of air tubing opening about the mid level of all the roomed enclosures. The flow through the tubing is made maximally forceful upon a gas alarm, to be a powerful gas chaser, by quickly filling the interiors with pressured air. In conjunction, short stemmed up tilted fans can further aid the gases to ascend to the top chimneys, or not enter the room altogether.

In a DIR with no air gap or in a Jack up rig with an air gap, a multiple number of circuiting air tubing situated about the safe side opposite to the conduction platform, after leaving the rig, make an inverted U turn above water surface, for preventing ocean water entering the rig through a breached air tubing, said U tubing hung to the rig wall or a leg by holders. Each down going limb of the U tubing dip into the water about 2-3 feet, to then run in an incline to the ocean side, to rise to the surface at a distance, each tube terminating in a large cubical or rectangular block of air capsule, where from large inverted J terminals of the air tubing or chimney like structuring rise vertically sufficiently tall, so that the rising ocean tides will not find their way into the tubing. The top of each block of air capsule contains more air volume, whereby its heavy base can support the top structures, without letting them turn down upon the surface waters. The underwater tubing running in an incline can be a flexible metal duct hoses of large caliber, the tubing supported by devising such as the metal strings 6 of the off site modular illustrated in FIG. 9, so that the air tubing maintain the linear distance from the rig, to supply fresh air uncontaminated by the smoke filled air of the vicinity. The air tubing are in a size and number proportional to the size of the rig.

Most of the involved structures in the foregoing sections can be incorporated into/appended to existing rig models, without structural/functional compromise. However, the sprinkler tubing should project beyond the adjacently located fans so that the water jets are propelled forwards. All the devices are monitored by drone(s) as also by the mobile unit security guards as well as by the stationary vigilance squad with night vision zoomed videos, and are checked periodically to ensure a maximal functional state.

Emergency Breathing Provisions for all Fire Escape Models

The fire escape units of the DIR and the off shore rigs, upon a rig fire, receive unlimited fresh air supply from air tubing originating about the fire escape units and terminating about nearby ocean waters wherein the devising of said fresh air tubing is as in the following—

(a) In the DIR with no air gap or in a Jack up rig with an air gap, originating air tubing 16 from a tub of the fire escape unit, after leaving the unit, make an inverted U turn above water surface, said U tubing hung to a rig wall or a leg by holders; the tubing further courses few feet vertically down underwater, to then turn to ocean side in an incline, to rise to ocean surface at a distance, wherein each tube passing through a large cubical or rectangular block of air capsule, terminates into a large inverted J structure or into a chimney like surround, precluding ocean waters entering the tubing; said air capsule containing more of top air volume and lower heavy base is set forth to support the erected top J structure or chimney surround of the air tubing; the air tubing made of multiple large caliber light weight metal duct tubing are subject to compensating for any compromised member(s); the air tubing are supported by paired strings of overlapping metal rods, so as the terminal air capsule maintains a set forth linear distance from the rig.

(b) The tub of the originating air tubing in the fire escape unit is located in an opposite side of the fire escape entry, and is set forth with a provision of suctioning in fresh air thereby forcing out pervaded smoke through a second tub located about fire escape entry.

(c) Said second tub located about the fire escape entry, comprises an additional set of inverted J tubing subject to evacuating the smoke entering the fire escape unit.

(d) Smoke is devised to be let out or suctioned out through the tubing of the tub near the fire escape entry, wherein a longer vertical limb of each inverted J tubing originating from the tub terminates into deeper ocean waters, the smoke's carbon dioxide with an exceptional diffusion/solubility coefficient in water, not subject to returning to the surface: the fire escape unit being submerged, an inverted U turn of the J tubing set forth above surface water lets out the smoke entering the fire escape unit into the ocean water, whereas the ocean water is not let into the fire escape unit; the curving of the inverted J tubing rising above the surface waters, is protected by layers of burlaps and self bathing sprinklers.

(e) The air tubing are in a size and number proportional to a rig size.

A 'gas escape' annex—additionally, it can be improvised that the basement is constructed with a gas escape annex at a lower level, to be accessed through a floor door entry, the annex structured at the opposite side of the basement entry. It is implied that the basement has a separate smoke and gas alarms activated by local accumulation of either, such alarms located at a different site with different lighting and ring tones, which are also differentiated by large labels. When a local gas alarm or smoke alarm is ringing in the basement, the crew gets into the annex, as air is suctioned out from the entry side tub and suctioned in through the tub of the opposite side, while both elements of gas and smoke are forced to get out through the former. The entry of the annex is safe guarded by high powered fans that are facing the basement entry, and are put on as soon as an alarm rings in the basement.

The Special Features of a Rig's Rescue Boats

The herein devised life boats/lift boats are not accessories but are invariable aids in a DIR with a dysfunctional basement's fire escape entry, and in a Jack up rig with no 'in site' fire escape modular.

The Life Boats

Most of the life boats 138 are stationed in the DIR adjacent to the spray room 197 (FIG. 1). A life boat has the following special features needed of its intended purpose: a fire resistant surface with strategically placed maneuvering bars; two pairs of bottom wheels as those of a train wagon, the wheels set forth about an exterior metal frame work nailed to the top edge of a boat (FIG. 12); a hanging ladder on one side if the boat has significant depth, while the boat also having black stripes on the ladder side, to identify as a side to approach, the whole boat being painted white for enhanced visibility; the boat's hemi-section on the opposite side of the ladder having thicker proportions, preventing toppling of the boat with the weight of a boarder climbing up the ladder, and the boat additionally comprising a light metal or a PVC air capsule in its exterior, coursing the ladder side adjacent to the bottom about a depth that otherwise stays immersed in water, whereby an unmanned boat may tilt, but it can be corrected if a tilted side is preferentially occupied; raised rubber guards, strong but yielding, structured in strategic places about the boat exterior for preventing collision injury; water tight compartment storing medical supplies (analgesics like Tylenol with generic names such as acetaminophen or paracetamol, hospital gowns, dressings, 1-2 sets of IV transfusion bags); secured oars; a snapping joint to an anchoring metal chain, to disconnect a boat from the rig; a solar powered light put on by remote control upon a rig fire happening after a nightfall; a built in break resistant lighted compass, as at least a compass directs to the north and south, and thereby to east and west, to reach the coast line and not be lost farther into the ocean waters until the break of the dawn, hinting directional geography, however, a compass is only a rough guide, and reaching an inhabited and non rural coast is paramount if a fire victim is boarding a boat, and conversely, reaching an uninhabited coast can be the beginning of endless troubles both for a search team and the strayed crew, making it clear that aiming to reach an off site modular is a dire necessity, wherein the guide light is indeed a best guide; a GPS connection is an invariable future option, as the rigs, not being far away from the coast line, should have a dedicated GPS line to direct the lost crew members in ocean waters, to the rig, to the off site modular, and to the designated coastal town.

The Lift Boats

The rigs are also equipped with 'Lift boats' devised for lifting the 'severely injured' from the ocean waters, the lift boat otherwise having the general features of a life boat. A victim can be pulled easily underwater, but above the water surface, the 'weight of gravity' comes into effect, and additionally, the rescuer has no solid footage to bear even a moderate weight. A person may tilt a boat down, to roll in an injured victim, but with the flat base configuration of a lift boat, it is hard to accomplish.

The Hammock Model of Lift Boat

The FIG. 12 illustrates a hammock model of lift boat 500, devised larger than a life boat, so that more than one to be rescued, can be boarded. Its flat bottom ensures stability and thereby an undivided attention of a rescuer, if the ocean waters are turbulent. A cut section in part 518 of one side of the boat interior depicts such flat based boat structure. A lift boat, as in a life boat, has four wheels as those of a train wagon, said wheels affixed to a metal framework 580, nailed to the boat edge. It has rubber guards scattered about the exterior contacting areas. The boat 500 comprises of a lift hammock (LH) 502 on one side of its exterior. The LH 502 is structured to have a pouch shaped bottom hammock 504, the latter anchored on its side, to a flat panel 528 of the lift hammock (LH) 502. The LH 502 is wholly made up of a network of burlap, and comprises a length of four feet. The pouched bottom hammock 504 is a double layer of close knit burlap incorporating a smooth yet strong pouch like frame work of metal reinforcement in between.

The Barge Structuring and the Boat Window—

The 'rescue barge'—the lift boat 500 comprises a barge about 1½ foot wide on either side, wherein the boat wheels are configured outside the barge area. On one side, the barge conforms to a 'rescue barge' 542 having provisions for belt-buckling a rescued fire victim. The netted flat panel 528 of the lift hammock 502 is attached to the edge of the rescue barge 542, whereas, the latter adjoins a boat window 547 configured on this side of the boat. The flat surface of the rescue barge 542 is structured with a ramp like incline (with a mirror image incline about the boat interior), so that the rescued is pulled in without undue discomfort. Additionally, the rubber edging of the barge 542 subdues a possible collision of the boat while boarding in turbulent ocean tides, whereas, its rolled-in outer edge stabilize the rescued upon the ramped surface. To prevent undue tilting of the boat while boarding, a light metal or a PVC air capsule 524 is devised to run about the rescue side of the boat adjacent to the bottom, at a depth that otherwise stays immersed in water. Similar air capsule 525 courses about the submerging bottom of the rescue barge 542 adjacent to the attached flat panel 528 of the lift hammock 502.

The boat window—the closure of the boat window 547 about the rescue barge, is made in any of the following structuring—1) as in domestic models, a water proof window closure can slide up, with reliable hardware holders in its ascended position; 2) a window closure made of weather hardy plastic or water proofed canvas with a zippered closure flap opening about the bottom and the sides like a suit-case closure, the closure flap encompassing a pouched rod about the bottom like a canvas window closure, which upon unzipping, is rolled up and secured to U shaped sideward hardware, by sturdy rabbit ear loops. The window may conform to a curvilinear shape, as the boat itself, instead of being flat, to accommodate more length. The window being not lengthy, the head side of the 'rescued' is brought in first, the head side being adjacent to the window, and not past beyond it.

The storage barge—about the barge on the other side of the boat, a locked built in water proof box with a break proof glass panel, stores boat oars, solar powered heating coils, a solar powered suction device, and the medical rescue supplies. The key is chained to the lock with a large key hole glowing in the dark that hints from a distance to approach from the opposite side. Such storage facilitates spacious boat interior, while also balancing the weight of the rescue barge.

Rescuing a victim—the rescuer after getting into the boat and unbuckling the 'rescued', slides him into the boat through the window 547, by pulling a sturdy water proof plastic sheet normally held in place by Velcro bindings (to the outer corners of the barge 542) that were undone initially by the rescuer, soon after belt buckling the 'rescued'. Inside the boat, the rescuer is buckled at two places on a plastic sheathed bubbled air mattress. The boat 500 has solar powered lights inside and outside, with glowing switches. With two rescuers and two 'rescued', the second rescuer stands and waits about the lift hammock with the victim, as the hammock is built strong enough to hold 2-4 people at a time, with its height being limited to four feet.

The appended rescue accessories—the rescue barge 542 is equipped with appended structures to non-traumatically board a victim, as only one hand of a rescuer is free, and laying down onto the barge an injured/unconscious victim who is hanging on in a vertical disposition is not an easy task without some physical aids. Such aids and the concerned maneuvers include:

(1) the lift hammock 502, secured in a zippered enclosure underneath said water proof sheath on the barge 542, to be pulled out by unzipping (its two large zipper handles amenable for easy handling and coming towards the center, however they may not close completely, the incompletely enclosed lift hammock 502 being affixed to the edge of the barge 542); the hammock pouch 504 with a metal frame work immediately gets under water, for the rescuer to stand on; the 'rescued' is initially supported on the hammock 504 before being lifted on to the barge 542 by the rescuer, while the flat panel of net 528 providing needed hold for both;

(2) a strong but soft air inflated neck-chest harness to the 'rescued', suitably structured to bind him as follows: first the rescuer fastens a chest harness 7-8 inches wide, its Velcro binding secured under an appropriate arm pit, so as the air inflated part runs across the chest; the center of the inflated part comprises an attached neck harness to go around the neck, to then come to the front, to be fastened to the originating part of the neck harness by a Velcro band, the neck harness also having an air inflated front part; the Velcro fasteners are provided with bag like plastic wrapping (with easily expandable elastic closures and soft plastic plates on either sides), so as the Velcro bands are not exposed, as it is not always possible unhooking a Velcro with one hand, a mock practice on a manikin to carefully yet swiftly fasten a victim, being beneficial; if the neck-chest area is burnt, the fastening with the neck-chest harness must be lax as also the fasteners are cushioned inside; being fastened by the neck-chest harness, the head and neck of the victim stays afloat, and having gained a firm footage about the hammock pouch 504, the rescuer lifts the body of the victim onto the barge 542 for belt-buckling, the redundant length of the belt going around one leg; the neck-chest harness is unfastened just before the 'rescued' is pulled into the boat; the neck-chest harness is normally secured in a zippered burlap case, the burlap case secured to the rescue barge about the left side of the rescuer as he approaches the barge 542, a suitable location for the needed maneuvers by a right handed person, with the 'rescued' positioned on his left side.

It is worthwhile considering that the worker's uniform has a waist belt with Velcro binding, its left side having an attachment to the shirt under the left sleeve joint, so that one can bind the injured with the waist belt, thereby freeing both hands from the start, the rescuer unbinding his own waist belt as soon as he notices somebody to be rescued.

Other essential features: (1) the boat interior has a lowered corner, wherein the tip of a suction device is positioned in its frame and the suction put on, as the rescuer gets into the boat; the boat's plastic sheeted floor lets the water drift towards the lower corner, whereas the suction's water outlet clears the water into the ocean; (2) the boat interior adjacent to the window is equipped with a fixed yet removable hard board, for a victim's immediate resuscitation; (3) the barge on either side being only 1½ foot wide, the boat can be still steered with the oars in an incline, and as an alternative thereof, the front ⅓$^{rd}$ of the boat can be made barge free, however, it may be noted that while a single rescuer is caring for a victim, the boat steers its own course provided it is out of danger zone, the rescuer steering it when his hands are freed, the guide light or a GPS directing him at this time to the off site fire rescue modular; (4) the fire fighters getting out of the 'Exiting slide tubular' are most likely DIR crew members boarding the lift boat in this situation, few being less injured.

The Lift Boat with Inflated Lift Mattress

FIG. 13 shows a vertical end-on cut section of a lift boat 570 with a burlap sheathed air inflated 'lift mattress' 572 that is positioned adjoining the right side 571 of the boat interior (shown in the boat depicted in the left side of the drawing). Unlike a typical mattress, the lift mattress 572 comprises a wedged configuration in a vertical end-on cut section. Its side 587 configured flat and resting in an incline is facing an adjacent air inflated 'receiving mattress' 582, whereas its side 583 configured concave, is positioned adjacent to the boat side 571, while its top horizontally positioned side 573 is also concave. The lift mattress 572 is anchored to the edge of the boat side 571 at two places, by burlap ropes 520, positioned in equidistance from the center of the side 571. The air-inflated receiving mattress 582, also burlap sheathed, is adjacent to the left side 584 of the boat, the mattress 582 in its cut section resembling an end-on vertical hemi-section of the boat, except that the top is ramped. Such configuration is better appreciated in the boat as it is depicted in the right side of the FIG. 13, wherein the boat 570 shows the mattresses 572 and 582 as in the manner they are repositioned by the rescuer, whereas in the left side, the boat 570 shows their original positioning as initially encountered by the rescuer. The side 583 of the lift mattress 572 has buckling belts 574 and the side 548 of the receiving mattress 582 also has buckling belts 541, and the mattresses are configured light weight for easy maneuvering. The rescue side of the boat has identifying black stripes, whereas the whole boat is painted white.

Both the lift mattress and receiving mattress can have a layer of Saffil alumina blanket material (sealed by aluminum vapor to at least saturate the outer surface layer) underneath the burlap layer.

The rescue of a fire victim—upon approaching the lift boat 570, the rescuer lifts the lift mattress 572 from within the boat by holding the wide eye-lets that the lift mattress has on its burlap sheath through out, and inverts it onto the ocean surface, so as its concave side 573 abuts the exterior of the boat side 571, and the concave side 583 conforms to a ramped sloping top, while the horizontal side 587 floats upon the ocean surface 164. The side 583 can be identified by its buckling belts. To understand the changing dispositions of the mattresses, a similar paper cuttings with sides numbered, can be made, and move them on a paper in the manner a rescuer would move them (being mindful that the rescuer rotates the lift mattress 572 almost by 360° about the edge of the boat side 571), so that their repositioning can be better perceived than by imagination alone. The rescuer thereupon spreads out the unbuckled belts 574, pulls out a soft cushioned plastic sheet from the zippered mattress edge 576 of the lift mattress 572 to spread onto the ramping top 583, tying the center tie of the sheet to a center tie of the ramp top. He then maneuvers the thin mattress edge 576 to position the 'rescued' onto the lift mattress 572, to then roll in the edge 576 for the 'rescued' to slide inwards, wherein he is belted about the torso while another belt goes all around the lower part of a thigh positioned about the boat side, wherein the buckles are set forth about the boat side. Thereafter, the rescuer gets into the boat, and positions the receiving mattress 582 to abut the interior of the boat side 571, so as, the side 548 with the buckling belts 541 conforms to a ramping top that inclines down to the boat interior. The rescuer positions himself upon the receiving mattress 582, and to start with, the 'rescued' is unbelted about the head side, and his head and torso are slid onto the receiving mattress to be belted again in place, by the mattress belts 541. Following that, the foot side is similarly slid onto the mattress 582 to be belt-buckled, the buckles positioned towards the boat side 571. Following it, the rescuer unbuckles the belts 541 about the head side to slide down the 'rescued' upon the belt 541 onto a padded board 581, and he then slides down the foot side. To accomplish the fore going, the rescuer keeps the belt 541 of the receiving mattress taut by a firm foothold, so as to use its 'incline' to slide down the 'rescued'. The rescuer should have prior awareness of the maneuvers in sequence, to perform them in a swift secure manner. The mattress 582 can also be hung out about the boat side 584 to create room inside. Metal chains normally restrain both the mattresses with snapping closures about the boat side 571 that are secure, yet can be easily undone.

The instant model suits for old boats as the mattresses can be appended, whereas the hammock model conforms to newly built lift boats, though improvising into old boats is not impossible.

Medical supplies are stored in a lift boat compartment. The walls of all boats have hooked rings structured as 'near circles' so that a hung infusion bag may not be easily disengaged. All crew members should learn to do an IV line in the incorporated basic life support (BLS) training while they are being trained in basic fire fighting, as it may be a long wait before the EMS takes over. The local hospitals should allow them to learn live from the experienced nursing staff.

Extra Provisions to the Boats in Icy Zones

The fire engulfing a rig in cold icy zones is not an impossibility, as a gas entrainment with rig fire can happen despite freezing climate. There can be seasons when blocks of intervening ice amidst ocean waters make the course of a boat formidable. For rigs in such icy zones, it is beneficial that the boats have additional provisions that are simple, yet structured to surmounting the known obstacles.

As described in the foregoing sections, the boats in these rigs are also devised with train wagon wheels, for safely exiting the rig. In this setting, the boat's four wheels should have an additional provision of rotatable pedaling (as in a bicycle), the latter structured inside the boat, to be hand-maneuvered, whereby the boat can still continue its course over the intervening solid blocks of ice amidst ocean waters. Unlike a foot pedal, a hand pedal is functional singly, being capable of a full revolution. Though the term 'pedal' is applicable to a foot oriented device, it is herein used to a hand oriented device, the phrasing being meant as a general term. The boat's pedaling hardware penetrating the boat interior is invariable. Hence the wheels are provided with water-proofing rubber washers about the areas where the pedaling hardware pierces the boat's side walls. Based on the rarity of using the boats, wear and tear on the washers should not be a threat. With hands stretched out, a person can maneuver two pedals to move both the fore wheels. The wheels are structured in a manner that they are not blocked by the encountered solid zones, the wheels exceeding the boat's minimally scalloped bottom only by 2-3 inches. Wherein two people are boarded, the hind wheels can also be pedaled, and for larger boats, more than 4 wheels can be optional. The movement of the boat is slower by hand pedaling, but worthwhile, to pass the obstacles On encountering a solid zone, vigorous pedaling of the front wheels should also pull-in the rare end of the boat, with the high set hind wheels not being caught up by an over hanging edge of a solid zone. Wherein a thicker block of ice is hindering the boat's movement in a solid zone, a boarder is required to manually pull the boat holding the large maneuvering bars that are appended to the boat. To accomplish that, the boarder sets out one foot on the solid zone while firmly steadying the hand pedal on that side, and then holding the maneuvering bars of the boat, he gets out of the boat completely, whereby the boat will not drift back into the water. The boat oars have shovel like pedals with sharp metal edges, as such design is helpful to break the ice or shovel the snow, either occasionally needed. These extra provisions are needed for the life boats as well as the lift boats, about the rigs of the icy zones, wherein only a hammock model of lift boat is feasible to accommodate the herein devised hand pedals.

The boats move away only as far as it is safe, to await a rescue team, or can reach an off site modular, if one was invested in. If a DIR was elected in this setting, keeping the surface waters fluid by heating coils is paramount, and deeper underwater extensions of heating coils that stretch from the rig to the off site modular best serve the purpose, when the DIR needs to be steered away. However, sinking the unit is only possible if an uniformly heated zone with total fluidity will surpass the height of the DIR itself (with all its tall structures). It is not impractical, as the DIR needs to be only moved off from the basement to the adjoining ocean waters, and does not need to be steered far away, and the rig's adjacent waters can be always kept heated up during the seasons the ocean waters freeze.

The Boat Exit from a Conventional Jack Up Rig 1

The Jack up rigs are set up higher with an 'air gap', and letting out a boat can be a challenging proposition. There must be a plan for their smooth and safe exit by mere click of a remote control. It is implied that the boats are devised in the manner described in the fore going sections. If not, at least the wheels as herein devised, appended to existing boats, should not be a hardship, as moving a boat without, is a hardship by any standard. The wheels can be set forth about an exterior frame work.

All the aforementioned boats about the water exposed bottoms can optionally have a surface layer of any of the fire resistant Ceramic Matrix Composites (CMC s) to be safeguarded from spreading fire upon oil-laden surface waters.

In a typical boat exit, there are rail road like tracks starting from the deck and reaching the ocean surface, said tracks structured in an air tight 'ocean tubular' (OT) with fire resistant surface, covered by layers of burlaps. The OT comprises interior spray poles, feeding water to self bathing exterior sprinklers, as also the interior sprinklers, the latter needed occasionally. The OT is supported by vertical bars, the latter in turn supported by bottom horizontal metal beams extended from a leg. The OT and the supporting vertical bars impose no strain upon the leg, as the bottom horizontal metal beams are firmly affixed to large air capsuled metal (or PVC) blocks underwater that are in turn immovably connected to each other, their size proportional to the weight they need to support. The hardware framing is materially similar as the leg.

The rail road like tracks run parallel to the walls of a tunneled sloping deck, wherein the boats with train wagon wheels are stalled in a row. The deck and the OT have hand rails running on either side of the tracks for the boarders to hold on when needed, to slow down, or stop the course of a boat during a downward sojourn. The boats can also be stopped by a boarder as he anchors its side chain to the hand rail. Each boat is stalled in position by said side chains that the boarder disengages upon boarding, to mobilize it on the down slope, with also a push if needed, as he firmly grips the hand rails. The grooves of the boat wheels are deep set, with no danger of derailing, as the tracks make a down ward L turn exiting the deck, wherein the boarder should also be mindful to maintain the needed distance from a preceding boat. He should also operate a blinking red light (that is visible to the one behind), if he intends to slow down or stop. A boarder wears fire proof attire stored in the deck, if the fire is wide spread. The tubular exit is closed normally by car garage like air tight sliding closure, its lower indentations for the tracks also made air tight, however, the tracks may terminate short of the sliding closure. Large fans about the tubular exit face upwards to blow off the smoke and lighter inflammable gases. Just as the boats having raised rubber guards to be protected against collision injury, the terminals of the ocean tubular and the leg adjacent also have rubber guards about the ocean surface, that are structured to be submerged under surface waters.

The deck is modified into a spray room, when there is no availing space for its structuring within a rig, the latter also not having an 'in site' fire escape modular for similar reason. In this instance, the 'track drives' or the 'spray drives' are driven to the deck, to exit in boats there from. These rigs must invest in an 'off site' fire escape modular in the least, as a destination for those so evacuated. To return the boats to the deck, a group work is needed, some leading the boats to the ocean tubular, while others are drawing them by chains upon the tracks. Each boat thereafter, as before, is restrained in its destined position about the tracks. If the boats have regular wheels, yet they are initially chained in a row, and their tracks have to be carved on the floor, or a path defined by closely set side rails, or else, un-boarded, they are maneuvered throughout their course.

As an alternative thereof, all the boats can be stationed on the tracks un-restrained, wherein the first boat is stopped by a cross bar that moves horizontally in and out of the track, to stop or let out a boat. Upon a click of a remote control, the cross bar moves out of the track to let out a boat, and moves in after its passage, to hinder the boat behind, unless there is another click. A boat's sloping front and back creating sufficient gap between the boats, allows the plan to work as in the configured manner. Un-restraining boats has an advantage that they are released from outside. As only the crew are the boarders from inside, a button next to the cross bar can also be pushed, to let out the boats. Upon a catastrophic event, the exit door is kept unlocked for the crew to get out emergently, in this instance, the interior sprinklers activated. A water proof remote with controls to the exit door and the 'let out' cross bar, has to be carried by the crew, in the event a boat has to be let out from outside.

A boat exit from a DIR—in a DIR, the boat enclosures 125 (FIG. 1) facing the ocean side, have the following safe exit plan: the enclosure with a down sloping floor is triangularly devised about a vertical plane, said triangle conforming to a 105° angle on the rig side and a 30° angle on the ocean side, with a down sloping roof conforming to a diagonal, wherein the rig side wall of the enclosure conforms to 90° angle about a horizontal plane; a boat is restrained upon the sloping floor by the normally down sloping diagonal roof; said down sloping roof conforms to a down sloping ramp when slid completely into ocean waters by a remote control; the boats on wheels thereupon unrestrained, can slide over the sloping floor and the sloping ramp, onto ocean waters; the sloping ramp has sideward ramp tracks (as 2-3 feet inclined extensions in a same plane of the down sloping roof) beyond the down sloping floor; the ramp has strong but yielding rubber guards about the lower edge, to be shock absorbers upon a boat collision; wherein the ocean side angle of a triangular enclosure is less than 30° (that is, more acute the angle is), more gradual will be the sloping roof, and smoother will be the descent of the boat onto the sloping ramp made out of the sloping roof.

Returning to the rig, a boarder should secure the lengthy 'fastener' chain to connect to the boat, and then enters the enclosure, wherefrom he pulls the boat upon the ramp into the enclosure. He hooks the fastener chain to a wall allowing no redundant length of the chain, so as to steady the boat on the incline, and the ramp is made to retreat to its original roof positioning. The boat's chain thereupon is loosely secured to the 'enclosure fasteners', so as to maintain its original redundant disposition. In this model the boats can also be released from out side. If multiple boats are let out when a DIR could not be detached, even if not boarded, they stay afloat in water connected by the 'fasteners', and so can be salvaged if not consumed by the fire.

Other models—(a) in a different embodiment, the DIR boat enclosures approximate a rectangular configuration in a vertical plane (like a car garage with a sliding roof door), but structured to having a sloping floor. From the boat enclosure rail road like tracks (instead of a ramp) extend into the ocean waters, through indentations about the closed door, the latter made air tight as a whole by rubber seals. The boat's wheels are deeply grooved (the 'staple grooves'), whereby their de-grooving may not be an anticipated concern while sliding upon the tracks lacking the rooming structure as the OT reaching to the ocean surface. While exiting, the boarder temporarily chains the boat until the door slides up sufficiently after which the boat is released, and the door locked. Standing fans about the door blow off the approaching gases. This model also lets a boat out without a boarder. To return the boat to the enclosure, the boarder should un-board in water, and two people should work on aligning the deep set grooves of the front wheels and also the back wheels upon the sloping tracks, to slide up the boat to its stand; (b) if DIR platform is too high, the model described for the foregoing Jack up rigs, can be elected for the DIR. Due to shorter length of an ocean tubular in a DIR with no air gap, horizontally or tangentially supporting cross bars from the side walls of a DIR are appropriate and reliable. This model as also in a Jack up rig model, has an added advantage that a single exit is secure, as it can be easily closed when the DIR is stationed.

Devising, showing off, and ensuring a safe work and rig environment to the prospective workers are paramount for the present day labor scarcity. The related contemporary application earlier noted enumerates some other safety provisions, as also it details how oil-admixed gases can be safely separated for use, and not flared in the rig vicinity. With increasing concerns of climate change and a drive for clean energy, every small improvement will add up to the total picture, and the rigs can be easily improvised with herein devised safety provisions. For new rigs, their implementation is easier.

Natural Island Coast as a Rig Base

The structuring of a Natural Island Based Rig (NIBR)—there are countless inhabited and uninhabited islands clustering the coast lines of many countries, wherein the island coasts are about the same level or only slightly higher than the oceanic surface. There are also islands far away from the main land that were not explored due to the unacceptable depth of the ocean, for the legs to be safely set up. It is not hard to demolish the surface land about the coast line to build a submerged basement and upon it, an 'above water' stationary rig as herein devised. It is done by blasting the land few yards away from the coast line, to build the basement structured far below the sea level and the stationary rig above, and after the construction is completed, said few yards of coast line is also demolished, so that the ocean water flows onto the structured area submerging the basement. As an alternative thereof, it can be a modular basement, with wheels and an air capsule, the latter water filled for the basement to be submerged. A DIR, conforming to its standard structuring, can be locked onto the basement. In this latter model, the intervening coastal ground is demolished as soon as a low level flat ground is prepared to station both units. The basement can be locked to the ground, the lower components of the locking hardware, as many as needed, being firmly affixed in a suitable manner, to the cemented terrestrial ground underneath.

The topography for the NIBR—wherein a stump like projectile coast line 501 is chosen, which is an ideal option, three sides of the rig base 124 can naturally be opened to the sea (as in FIG. 14 A), the conduction platform 102 being an extended structuring into the sea. However, in a linear coast line, more work and planning are required, wherein with a perpendicular conjoining of the DIR with the conduction platform and the fire-proof corridor (FIG. 14 B), one dimension accommodating the steering station 122 and another dimension accommodating the conduction platform are opened to the ocean waters (it can be recalled, that upon unlocking, the risen DIR assumes a straight course in ocean waters, until taken over by the steering crew). The conduction platform 102 and the fire-proof corridor 110 are built by sturdy extended structuring into the ocean. The positioning and a sidewise conjoining of the conduction platform 102 with the DIR 108 about a linear coast line, as in FIG. 14 B differ from FIG. 1. The shaded areas of the FIG. 14 A and the FIG. 14 B denote possible sites of the superficial coast land demolition.

In a NIBR, the legs from the sea bed are not required of, which is a great economic incentive, as also the rig is less subjected to natural climatic adversities. It also means islands about deeper oceans can be explored for well digging, including Arctic bases, preferably in mid summer, as long as the fluidity of water is preserved by heating coils. Lengthier marine riser and conductor can be structurally feasible (rather than structuring lengthier legs), wherein to prevent buckling, both the structures throughout their course can have intermittent supports from the adjacent solid structures of the island (such supports structurally similar as the units of metal strings 6 described in the context of the off site fire escape modular) that stay resilient, yet maintain their axial length. Evidently, an oil reservoir located in the vicinity is a vital topographical prerequisite for a NIBR structuring. The coast lines of most of the countries must have been exploited over the past decades, and only the distant off shores being the remaining choices, however in all instances, preserving pristine ocean waters being aimed for by strictest means available. Any suspicion of an oil gusher, if can be possibly predicted, is a definite contraindication to the plan, at least in the Arctic area.

The terrestrial territory—the adjacent terrestrial territory can be used for varied purposes like accommodating the 'off site' fire escape modular. It can be built to be mimicking the familiar one about an off shore rig described in the earlier sections. Clearing off the bushes, grass and shrubbery on a regular basis is no easy job, and uncontrolled wild fires as in the continental regions may yet happen. Accordingly, the off site fire escape modular, not far off from the DIR can be set forth with a bottom air capsule, to be floating on ocean waters extended from the DIR site, upon extended demolished grounds. It demands only one time extended ground excavation, with no added constructional labor. All the provisions of a prototype 'off site fire escape' is herein applicable. The off site fire escape modular is anchored by many chains to the adjacent terrestrial ground so that its destined position away from the DIR is not changeable. Few rig and well based structures described in 'WELL BORE TO OCEANIC DIVERSION OF A GAS ENTRAINMENT WITH PREVENTION AND RESTORATION ABOUT A WELL HEAD BLOW OUT' (Ser. No. 17/803,746) by the inventor can be accommodated also in the terrestrial base. The inverted J tubing of the tub near the fire escape entry (that diverts the $CO_2$ accumulated within the fire escape) terminates into the greater depths of the adjacent ocean. Though escaping to the land is easier upon a rig fire, negotiating through a fire engulfed rig interior from the work stations is yet a challenging proposition, and hence, the basement's fire escape, safely accessible via 'spray walks', is still a secure refuge.

Partially Submerged Oceanic Dir with No Leg Supports—

Under the captioned paragraph 'The structuring of a Natural Island Based Rig (NIBR)' in the foregoing, mention was made about an island stationing of a modular basement with wheels and an air capsule, the latter water filled for the basement to be submerged, wherein the DIR conforms to its standard position of partial submersion. In the same token, such combination of structuring can make up a submerged off shore oceanic rig with no legs, however having the same provisions for the DIR to be detached in the event of a rig fire, whereas the basement remains submerged in the usual manner. However, the air-water ratio within the air capsule of the basement needs to be pre-determined and facilitated, so that it maintains the same depth of submersion even after the DIR is detached. Obviously, it is also connected to the marine riser which in turn has its foot hold to the sea floor. The great advantage in this model is, the need for the legs as support structures in the ocean, is obviated. Partially submerged oceanic rigs are known to the industry, but there is no detachable rig within its structuring that detaches to distance from the site of fire, to salvage the amenities, nor there is an allocated fire escape refuge for the crew. The air capsules are unique to the instant model to serve the desired unique functions.

There are stabilizing devices in the industry for a floating rig without leg supports so as the rig may not succumb to climatic threats. Similar provisions can be incorporated in a DIR With No Leg Supports (DWNL) such provision being anchoring a floating rig by metal wires to the ocean floor.

Water-Wind Shifting Compartments

Additionally, the following model as in FIG. 15 wherein the four sides of the DWNL 801 comprise Water-Wind Shifting Compartments (WSC) 803, is devised to further stabilize the DWNL 801 in turbulent waters 804. A partition 809 divides WSC 803 into two mirror image structures in the lengthwise dimensions (LWD) 807 as also in the widthwise dimensions (WWD) 808. Each WSC 803 communicates with the WSC 803 of the adjoining side, as shown in a shaded areas about one of the lengthwise dimension (LWD) facing south(S) and the widthwise dimensions (WWD) 808 facing east (E). The two dimensions facing west (W) and north (N) are hidden from view. The WSC 803 on all four sides encompass Water-Wind entry/exit windows (WEW) 802. The turbulent water-wind enters the WEW 802 from the direction the turbulence originates but exits from the adjacent side, also from the WEW 802, passing through the intervening WSC 803. In FIG. 15, the turbulent Water-Wind is shown by in-going arrows 805 from south(S) and outgoing arrows 806 from the east (E) and west (W). They are depicted to be entering the WEW 802 about the LWD 807 of the DWNL 801, and passing through the WSC 803 on either side, they exit through the WEW 802 about east (E) and west (W). In so doing, though the force of the Water-Wind hits the DWNL 801, it is shifted sideward to be forced out through WEW 802 of either side (the east and the west) countering the thrust of the water-wind directed towards the north (N). In the same token the turbulent water-wind originating in the east (E) is forced out from WEW 802 of the north (N) and the south(S). The conventional means of anchoring a floating rig by metal wires to the ocean floor can further stabilize the rig from a deeper level. Intermittently, all wires about four corners can be joined in a horizontal plane by structures that mimic the WSC 803 and WEW 802, to counter the thrust of water from any direction. Anchoring a floating rig by metal wires to the ocean floor is an option, not a mandate.

It may be noted that as shown in the drawing, the WSC is a shell like outer compartment of the rig on all four sides encompassing all its counters and deviant counters though may be present (such as general purpose basement entry area) are not shown in the drawing, wherein the outlines are limited to a box like uniform configuration.

DIR detachment—to facilitate the DIR detachment, an imperceptible cleavage is configured within the fore structure of the WSCs with a snapping closure about the side of the general purpose basement entry, and a hinged conjoining in the opposite side, the locked snapping closure opening by remote control and spreading out by 100°, whereby upon uncontrollable rig fire, the unlocked DIR can steer forwards from the stationary rig. It also facilitates the low lying truck crane bridging crane to pass through. A great force is needed to open it, if along with the fire, the wind force is blowing in opposing direction. A manual aid from the DIR initially, and from the stationary rig following it (from the opposite side of the general purpose entry), can be required of in this instance.

THE VULCANIZED RUBBER—all the rubber washers, assembly devices and other structures of rubber incorporated into the well-rig structuring, such as—the tubing of all types, the well/rig interior, the water tight closures of the basement's fire escape, the rubber seal about the fire escape entry of the moving carrier model, to mention a few, are made of vulcanized rubber, the only type that resists the degrading attack of the petroleum analogs. A conscious effort should be made to commit to such policy and procedure, as many unconventional structures are encountered in this invention, and it is otherwise possible to overlook quite inadvertently. The industry is familiar with such practice in case of older structures as a matter of routine.

The Instant Joint Configurations and Closing Caps

The invention further envisions a model of tubing and methods of instant system joining or closing, for all future units, or as a replacement tubing for existing units. Many industries are familiar with piping glue or other means of joining, but they do not comprise an 'instant joining' and takes at least many minutes to attain a strong sealing. Such wait time is unsuitable for emergencies involving well/rig adversities. Herein devised tubing is structured to have a threaded configuration in the inside or outside, traversing the entire lengths. Inner threading is better (though manufacturing is more involved). To exemplify, the threading of the tubing small or lengthy, can encompass the well and its vicinity, the rig, the air tubing and the appended tubing structure of costly equipment (the list being not exhaustive), facilitating instant joining or closing of a broken system, aided by means of:

(1) Instant joint configurations—these joints are devised to be shaped as I, T, J, L, C, U, Y etc. with similar inner or outer threading as the tubing itself, to be inserted for system joining wherein a conduit line is broken. The working of the 'joint-structures' conforms to a 'sliding screw', aided by two or more conjoining I shaped tubing with complimentary threading about an opposite side. The 'conjoining' I tubing are subject to have their threaded outer diameter smaller than the threaded inner diameter of the involved tubing system of the rig and the 'joint configurations' herein devised, as also the vice versa. Wherein a conjoining I tubing alone is suffice, it is inserted all by itself, as a sliding screw, joining a broken conduit line. The functionally uninvolved middle part of the devised 'joint structure' may be enlarged externally for handling even by robotic maneuvering.

(2) Closing caps with stems—the closing caps have complimentary threading to their stems (to be configured with a smaller dimension and outer threading, wherein the tubular system has an inner threading) for closing a system, when system joining is not an option. The functionally uninvolved cap of the stem terminal enlarges to sturdy and massive size, to resist enormous pressure, at times exerted by the tubular system at the terminal, and the massive cap with also similarly sized distal stem is amenable to robotic maneuvers. Simple closing caps with complimentary threading are used to temporarily seal one end of a severed tubing while the other end is worked on.

How to find the source of gas/oil leak and mending it—about the oil tubing of the rig confines and outside, oil/gas sensing 'equipment' are placed in equidistance, each numbered, defining its territory. Wherein leak occurs following a tubular damage, its territorial equipment rings its alarm first, though other alarms ring later, as the leak spreads. The devised computer soft ware notes the timing, however, the one that first rings, is the source (unless the leaks are multiple). The leak is confirmed by the adjacent alarms that ring immediately following. The computer sets forth the chronology, for an instant information. The security crew familiar with all the numbered territories, should emergently deploy the instant joint structures. The 'joint structures' being fixed in dimensions, the length of the tubing to be severed should be properly configured. On the other hand, as the minimal length of a damaged tubing to be severed cannot be minimized any further, the number of the joint structures (with one or more 'conjoining' I tubes) are to be properly configured before severing the tube. The I configurations are structured as both joint-structures and conjoining tubes, the latter with complimentary threading. The leak is insulated first, and the tubing including the I tubes to be inserted, are articulated outside, and then the damaged tubing is cut, for the 'articulated set' to be inserted. While one cut end is worked on, the other cut end if not securely insulated, is temporarily closed by a simple cap. The final manipulations of the two or more conjoining I tubing are done in situ, to establish a conduit line, with vulcanized rubber washers also, for a fluid tight closures. A distorted tubing may need an intervening U/C joint. A bent L-shaped curve needs an L-joint, whereas a complex interconnection needs a T-joint. The crew must have a mock practice of possible maneuvers. The 'joint-configurations' can conform to two designs-'subtle' or 'striking'. In the 'subtle' configurations, the devised curves are less obvious.

What ever be the cause (that at times can be an arson), unceasing oil/gas emission from a tubing following a breach (that may also be due to a trivial initial fire) that cannot be detected/mended can be the cause of an unceasing fire, or else for an uncontainable pollution of the ecosystem, after a well completion. Hence, said tubing mandates are as important as all the other security measures put together. Moreover, what needs to be herein implemented is only a small step forwards in means familiar, however, with a big leap thereof in the remedial measures achievable.

The time old wisdom says: 'The time and tide wait for no man!'

Let a 'tide' in time save a man or men, and then some more.

The invention claimed is:

1. An invention directed to prototype fire escape models of off shore rigs with an emphasis on a Detachable Island Rig (DIR), said DIR reversibly locked to a roof platform of an underwater basement and mobilized by a steering crew to be salvaged upon a rig fire, wherein the underwater basement serving as a fire escape refuge for remaining crew, is water sealed upon a rig fire, the fire escape models of the DIR and the off shore rigs comprising provisions—

(a) wherein the DIR can instantly unlock or lock with a completely submerged permanent basement, wherein upon disengaging, a partially submerged DIR separating from the roof platform of the basement with stationary rig structures comprising: (i) a conduction platform; (ii) a fire station with an exiting slide tubular; (iii) a general purpose basement entry; (iv) an intervening stretch of fire proof corridor conjoining the DIR and a stationary area, wherein traversing metal tubing and electric wiring of the fire proof corridor being instantly disconnected for disengaging the DIR, while watertight doors of both the corridor and the DIR are shut, and a short water proof walkway in between both is disengaged, (b) wherein the DIR has a working platform untouched by rising tides, the DIR further comprising: provisions for restoring immediate functions of the conduction platform upon a fire damage, tall and hefty rig equipment, working quarters and working devices, living quarters, a bridging structure to the general purpose basement entry, locking components to be locked with the basement, a fire escape basement entry about a spray room with encompassing accessory provisions, the accessory provisions being spray walks or water tracks with track drives, boat stands with, boat exits, a security monitoring and response station, a fire station, a bottom air capsule imparting buoyancy to the DIR, and at farthest end away from the fire proof corridor, a steering station to smooth steer the DIR in an automated straight course following a remote signal by the crew, (c) wherein the DIR further comprises locking devices to the basement allowing room for some imprecision and operable by remote controls, having a common control about each side in addition to controlling an individual device, (d) wherein the DIR further comprises omnidirectional retractable hooded wheels facilitating precise positioning about the roof platform of the basement, (e) wherein the DIR and the off shore rigs further comprise: (i) room to store large sheets or spools of burlaps in roof structures, to be made wet and thrown on burning mechanical devices and also fire victims, said mechanical devices covered by fire resistant jackets, the fire resistant jackets being layers of burlap or fire insulating High Purity Poly-crystalline Alumina (HIPPA) Blanket (HIB), either surface of HIB sprayed with vaporized aluminum; (ii) lengthy tongs to direct cut burlap sheets onto burning objects; (iii) powered long range jetting sprays along with pressured fire extinguishers, (f) wherein, in order to be instantly cut for DIR disengagement, the metal tubing passing through the stretch of the fire proof corridor, at a conjoining of the DIR contains a plurality of short segments of rubber tubing comprising a C or U configuration;

(g) wherein while stationing back onto a base structure built to stay submerged, a reversible buoyancy of the DIR is overcome by water filling the bottom air capsule, while by similar means of water filling or air filling, the DIR being sunken or risen from ocean waters upon an uncontainable rig fire, (h) wherein the DIR further comprises an in-situ fire escape entry comprising a water seal of a devised Moving Carrier Model (MCM) upon a rig fire, whereas devised accessory provisions to safely leading to fire escape entry comprise the spray walks or the water tracks, or else less space occupying spray drives, conforming to new as also old rigs with limiting space, (i) wherein the DIR and the off shore rigs further comprise voluminous sealed canisters of soda lime strategically placed about work areas, the sealed canisters remotely unsealed upon a rig fire minimizing carbon dioxide and carbon monoxide gas-inhalation, the gases being absorbed by soda lime, (j) wherein the DIR further comprises a truck crane serving as a bridging structure to the general purpose entry of the basement, said general purpose entry water sealed upon a rig fire, while the DIR steers away the truck crane bridging resting about the general purpose entry housing, (k) wherein the DIR and the off shore rigs further comprise an off site fire escape modular—(i) serving as a safe refuge to crew members not entering the fire escape basement entry; (ii) serving as a destination to injured fire fighters of the DIR and also other fire victims; (iii) serving as a receptive site to crew members in life boats lost in ocean waters, guiding by rotating high bean sky light, (l) the DIR and the off shore rigs further comprise multiple exiting slide tubulars as fire exit units about remote and upper level work stations with no access to spray walks or water tracks, (m) the DIR and the off shore rigs having additional provisions for safe guarding unprotected interiors and exteriors of the rigs against gas fueled fire, said provisions comprising: (i) fanning covers; (ii) fanning curtains; (iii) pressured air circuiting about closed interiors, (n) the off shore rigs having further comprise wheeled life boats and lift boats, to be lowered through an ocean tubular into ocean waters, upon a rig catching fire that is un-contained, the lift boats comprising two models: (i) a hammock model; and (ii) an air inflated lift mattress model, (o) wherein further, a minimally modified prototype DIR for remote natural island coasts and island coasts of deeper oceanic zones, subject to having no legs, (p) and furthermore, the fire escape of the DIR comprising a water seal upon a rig fire, also serving as a schematic of water seal for an in site fire escape unit of a jack up rig with an air gap and no provision for an underwater basement.

2. The prototype fire escape models of the off shore rigs with an emphasis on a Detachable Island Rig (DIR) according to claim 1, wherein the bottom air capsule of the DIR is devised with reversible buoyant forces, with the bottom air capsule water filled to be sunken and air filled to be risen, and for said devising, the DIR comprising below encompassing measures—

(a) wherein: (i) the air capsule of a room size occupying a geometrical center of DIR bottom and dipping into ocean waters as a hemisphere or a hemi-ovoid, maximizing exposure to ocean waters; (ii) the air capsule of polyvinyl chloride is structured in a rooming station with sprinklers that are activated upon a fire alarm; (iii) the air capsule in a rooming station connects to a bottom annex of the steering station, for the steering crew to perform computer directed operations and other manual or remote operations of sinking and rising the DIR (b) wherein the bottom air capsule of the DIR further having below set forth means and methods—(i) means of four air tight water let-in windows with washer like rubber edgings occupying the bottom of the air capsule in circumferential equidistance are operable by remote or manual control, wherein one or all windows are opened for a non-emergent or emergent sinking of the DIR, and also for controlling needed depth of the sinking; (ii) means of letting out air through the windows while ocean water is flowing in, wherein for sole manual operation, four divers opening locked windows from outside; (iii) means for a compressed or Pressured Air Chamber (PAC) of metal with a manually operable one way valve about a devised top of the air capsule, the PAC directing air flow to inside of the air capsule; (iv) means for an air-filler with a threaded-in massive cap, aiding air-filling the PAC, the PAC separating the air capsule below from the rest of the DIR above; (v) means for at least four large suction tubes set forth to run upon inside walling of the air capsule dipping into the bottom of the air capsule facilitating suctioning of water from the bottom; (vi) means for the bottom of the air capsule to be filled with water sufficiently submerging the bottom windows, to be conforming as a reliable air-proofing of the air capsule; (vii) means within the capsular interior for few video devices, a pressure gauge, bright lights, bridging structures joining opposite sides about the windows with adjacent stand-on platforms, and grab-bars—aiding monitoring and mending operational failures, (c) wherein further, two models of compressed air chambers opening into the air capsule with one way valves having means and methods, as below: (i) a Basket and Sphere Model (BSM) comprising an upper component housing an upper metal sphere, and a lower component housing a lower metal sphere, each component having basket like nested configuration, the baskets opening on both sides and set forth with rubber linings; the lower component of the BSM conforming to be a single basket unit; the upper component of the BSM conforming to be a two basket unit, wherein the two baskets are connected by open broader faces opposing each other; the two metal spheres of the BSM are connected by a connecting rod, while the upper metal sphere is also connected above to a metal rod threaded into a tubular continuity of the upper component, the metal rod terminating into a rod handle; being connected to each other, the two spheres, the connecting rod, and the threaded metal rod tend to be moving up or down as an unit upon the rod handle turning in a clockwise or in an anti-clockwise direction; upon the rod handle moving down, both the metal spheres are subject to wedging into the baskets closing them, and upon the rod handle moving up, only the lower sphere opening the lower basket, allowing air from PAC entering the air capsule, implying that the upper metal sphere is set forth to closing the PAC from the DIR interior in either position of the rod handle; the threaded rod depicting markings, so as the positioning of the lower sphere subject to precisely controlling the air flow into the air capsule as 'slow-medium-fast', while also equalizing it to atmospheric pressure, aided by a pressure gauge within the air capsule; (ii) in an Air Cylinder Model (ACM), a metal cylinder replacing the PAC contains compressed air, with an air outlet tubing entering the air capsule; said outlet tubing of the ACM controlled by an air control valve, is set forth to allowing high or low air flow volumes, while also creating atmospheric pressure in the air capsule aided by a pressure gauge; the air cylinder model comprising an air-filler tubing fills the metal air cylinder to a required high air pressure, following an air let-out into the air capsule, (d) wherein about the foregoing, the sinking and rising of the DIR are set forth by following means: (i) sinking the DIR—for the DIR to be submerged emergently, the air tight water let-in windows are subject to be opened manually or by remote control, when the air capsule starts filling with water displacing air simultaneously into ocean waters, while the DIR descends in the water; only a required amount of water is subject to filling the air capsule to submerge the DIR to sufficient depth to put off the fire, while the windows are closed soon after; manually opening or closing the windows is done from outside the air capsule; (ii) rising the DIR—for the DIR to be risen, water is suctioned out of the air capsule from within the DIR via the suction tubes, while letting air from the PAC or ACM into the air capsule by manually opening the one way valve; upon the DIR rising to the surface waters, the PAC or ACM valve is closed as also the suctioning of the water from the air capsule stopped; the DIR is not subject to sinking to ocean depths upon delaying the steps of air filling and water suctioning, as the DIR stays submerged or suspended in sub-surface waters of the ocean, about a level wherein the air capsule windows were closed, (e) when the DIR returns to the base, the sequence operations of stationing onto the basement roof platform comprising means and methods as follows—(i) opening only 1-2 window(s) allowing slow water filling of the air capsule for a slow descent of the DIR onto the base platform; (ii) said opening of the windows being manually done via a tunnel created about the DIR bottom for an unrestricted entry and exit towards the bottom air capsule; (iii) after the DIR is locked to the base, water is suctioned out from the air capsule to an extent that only the windows stay submerged, while air is slowly released from the PAC or ACM equalizing the air capsule pressure with atmospheric air; (iv) closing the one way valve of the PAC or the ACM; (v) filling the PAC or the ACM to an optimal high air pressure through the air-filler to be readied for a subsequent emergent operation, (f) wherein, to preventing an explosion of the air capsule upon spreading fire and inability for mobilizing the DIR, all the one way valves of air-locking enclosures as also the air fillers are freely opened to atmospheric air; and as an additional measure, the PAC and the ACM having locked-in hidden compartments with air let-outs that are also opened, for letting out pressured air and freely communicating with atmospheric air, (g) in addition to the foregoing, a different model comprises a structuring, wherein: (i) the air capsule is being built without windows, while both water-filling and water-emptying are done by filler and suction tubing of wide caliber originating from the DIR; (ii) for sinking the DIR, many tubing at once used to water fill the air capsule when the DIR is emergently sunken to put off the fire, whereas, one or few are used for gradual water-filling, as when the DIR is brought down onto the basement roof in a slow descent; (iii) the air capsule additionally comprising a separate set of air-suction tubing also arising from the DIR and terminating atop the air capsule causing equal volume of air to be suctioned out while water filling the air capsule; (iv) for the DIR to be risen to the surface, water is suctioned out of the air capsule, while air fills in from the PAC or ACM; (v) all the foregoing tubing are devised to be running along the walls of the air capsule, and are numbered and color coded, whereas at least one window is yet devised for divers to getting in for structural mending of the air capsule, (h) wherein, in the foregoing, to prevent undue jolting of larger structures while sinking and rising the DIR, a schematic of equal distribution of weights in all four quadrants during construction of the DIR, is set forth below—(i) the schematic comprising, that the four quadrants of the DIR are subject to be built as per constructional needs, to then equalizing the weights of the quadrants by compensatory weights of large water barrels, by facilitating filling and emptying of the water barrels, the equalization programmed by computer software, as also a rig manufacturer creating boundary lines of the quadrants; (ii) the schematic comprising, that a preliminary of the DIR is constructed as a proportionally exact miniature model, and trial sinking it without a tilt by equalizing volume of water needed in each quadrant, wherein accounted DIR heavy structures are presumed immobile, a conduction platform with a derrick and other stationary rig structures being not included in the weights of the quadrants; (iii) the schematic further comprising, that upon a later date, shifts in large or small equipment, as also a head count, are noted by a data entry computer, and shifting weights balanced by input or output into and out of the water barrels; (iv) the schematic furthermore comprising, that as the DIR is prepared to be steered away, the computer fine tunes the weights of the four quadrants, (i) and wherein oil is collected in a rig before a pipe line diversion to land facilities, said rig storage of the oil with a schematic of equalizing the four quadrants, is as follows: (i) the schematic comprising arranging the oil storage units in concentric ovoid manner conforming to the rectangular shape of the DIR, and spreading all through the rig, while each concentric containment connects with inner and outer counterparts; (ii) the schematic comprising that the oil enters via top of the storage unit through a small inlet, and also leaves from the top through a small outlet after filling the unit, wherein adjacent storage units having sliding screw joint configurations as also flow control clamps; (iii) the schematic comprising said oil collection as a round-about rather than as one quadrant at a time, facilitating equalizing the weights of the four quadrants of the DIR; (iv) the schematic further comprising of devising the storage units with bolted lids with vulcanized rubber sealing, wherein the units are affixed to the floor, facilitating instant sinking of the DIR upon uncontrollable fire, whereas empty barrels are subject to vacuum sealing; (v) the schematic furthermore comprising of preserving vital functions of the air capsule, wherein its bottom is structured to be in flush with, or 1-2 inches above the bottom of the DIR; (vi) the schematic further improvising that the air capsule is of sufficient air volume to be countering a pre-configured weight with sufficient safety margin, said pre-configured weight including numbered crew as also oil collected.

3. The prototype fire escape models of the off shore rigs with an emphasis on a Detachable Island Rig (DIR) according to claim 1, wherein a structuring of a prototype model of an emergency fire escape entry about the basement of the DIR comprising a moving carrier model (MCM) and accessories of an encompassing vicinity, having below provisions—

(a) wherein—(i) said MCM comprises a continuous staircase framework stretching through an entire lengthwise dimension; (ii) the moving carrier ascends from basement floor, rising through a Basement Roof Window (BRW) and a floor opening of the DIR; (iii) the moving carrier in a completely ascended position reaches an unenclosed top opening of a Permanent DIR Enclosure (PDE), (b) wherein further—(i) the moving carrier comprising bottom wall windows stretching throughout the lengthwise dimension; (ii) the moving carrier while in an ascended position each bottom wall window opens to a top of a staircase structuring about the basement, for the crew to be getting down to basement floor, said staircase having basement floor supports and no material connection to the moving carrier, the latter being devised an ascending and a descending structure, (c) wherein further, while in a completely descended disposition of the moving carrier as when the DIR needs to be steered away, the carrier opening to the basement floor, (d) wherein, in the foregoing—(i) the BRW is closed from ocean waters by a rectangular Water Barrier (WB) of metal erected upright around the BRW creating an enclosure of four walls WB articulating with each other and affixed to the roof platform of the basement by hinge-joining about the exterior; (ii) the water barrier is water-proofed by an interior rubber sealing stretching from the base platform onto the four walls of the WB; (iii) the disarticulation of the walls of the WB during DIR disengagement upon a rig fire being done by manual and remote controls, (e) wherein further—(i) the water barriers about the lengthwise dimensions termed as Length Wise Barriers (LWB), conform to a full inward movement towards the BRW, whereas an outward movement beyond 90° being restricted by outwardly placed brackets about the basement roof platform; (ii) corresponding Width Wise Barriers (WWB) of the WB enclosure similarly attached to the basement roof platform by hinge-joining and rubber sealing, however manifest outward movement beyond 90°, whereas moving inwards, the WWB are devised to articulate with side walls of the LWB, wherein the LWB comprising wall thickness approximating door structuring of a bank vault for reliable water-proofing, (f) wherein in the foregoing, about opposing walls of the LWB and the PDE, a water-blocking unit being subject to isolating and guarding a normally open structure of the PDE and the BRW from unexpected rising tides of the ocean waters, wherein a PDE component of water-blocking unit about the lengthwise dimensions comprises a linear block of vulcanized rubber with a central indent, into which a complimentary structure, also made of vulcanized rubber arising from the LWB engages, creating a water-block, (g) and about each widthwise dimension, two similar wedged structures stretching about widthwise inter-space of the WWB and the PDE are subject to creating a nested configuration, wherein a complimentary rubber guard, by virtue of a smaller spanning dimension, being manually inserted for a water-blocking closure, said differing structuring about the WWB facilitating an outward movement of the WWB beyond 90° for a snapping closure with the LWB during an articulation, (h) for the DIR to be disengaged and steered away, a sequence of steps is as set forth below: (i) after the widthwise rubber guards of the WWB are removed and the rooming enclosure of the WB disarticulated by remote controls, the two LWB are set forth to closing over the locked BRW, just as two doors of a room; (ii) there upon, the two WWB close are set forth to close resting upon the LWB, wherein the closed four walls of the WB are devised to staying in flush with rest of the basement roof platform, the basement entry site being structured lower than adjacent roof platform; (iii) upon the DIR floor opening about the basement entry being freed, the DIR is ready to be unlocked by a remote control from multiple locking devices of the basement, to be steered away, (i) wherein, upon the steered away DIR returns to the base, the walling enclosures of the WB are erected manually or by lift prongs, to be rearticulated, as water is suctioned out from within the WB enclosure, where upon the BRW is opened, (j) a devised alarm provision following a water rise within multiple capillary suction tubes erected about the sheeted rubber seal inside the WB enclosure, signals a leak about the seal, so as the BWD is closed, for the rubber seal to be replaced or repaired, (k) and wherein, in the foregoing, the moving carrier is lifted up or brought down by any of the following: (i) a devised giant lift prong; (ii) a devised crane like structure, wherein the moving carrier conforming to a spread out terminal of the crane; (iii) a devised pulley movement wherein maneuvering ropes of the pulleys are fixed to a bottom support structure about both widthwise dimensions of the carrier, wherefrom each ascending rope passing through a pulley positioned about an adjacent ceiling site of the basement, upon descending yet traversing another pulley about the basement floor, to be terminally maneuvered by a powerful motor, facilitating either a clockwise or anti-clockwise movement of the pulleys, wherein an ascending movement of the terminal rope reverses an earlier descending movement, as also a clockwise movement of a pulley reversing an earlier anticlockwise movement.

4. The prototype fire escape models of the off shore rigs with an emphasis on a Detachable Island Rig (DIR) according to claim 1, wherein a fire escape entry of the DIR and the off shore rigs is structured in a spray room, wherein the spray room being a destination of converging spray walks from work areas of the rig, the structuring of the spray room and the spray walks is as set forth below—

(a) wherein—(i) the spray room comprising spray poles drawing ocean waters to be feeding roof and room sprinklers; (ii) the spray room comprising a roof with a top metal sheet, layers of burlaps, layers of mattress-like sponge, and a bottom Ceramic Matrix Composite (CMC) insulator; (iii) the spray room comprising a floor stagnating an inch depth of water; (iv) the spray room comprising walls protected by outward extensions of similar roof and floor structures, and spray poles; (v) the spray room comprising an entry door guarded by high powered fans and 4-5 oversized overlapping curtains of burlaps enclosing aluminum sprayed fire-insulating HIPPA Blanket, said curtains hindering fire, gas, and smoke; (vi) wherein work stations are isolated, additional spray rooms with basement entries are devised, and wherein the work stations are about different levels, additional upper level spray walks and spray room are devised, the latter structured above the lower level spray room with a connecting sliding structure the basement entry being common; (vii) with no availing space for spray room or spray walks, a boat stand being subject to be a spray deck, with structuring similar as a spray room; (viii) the carbon dioxide of emanating smoke with high diffusion and solubility coefficient in water, is being precluded to enter the fire escape through the intervening spray room with uninterrupted inflows and outflows of water sprays, whereby a danger of smoke inhalation being minimized; (ix) wherein the fire is un-controlled in a steered away DIR, people stayed back in the spray room having an access to get into an adjacent boat deck facing ocean side, to board and mobilize the life boats, (b) wherein further, the spray walks structured about work stations, and leading to the spray room destination, comprising provisions as set forth below: (i) the spray walks are bound by two walls coursing parallel, with doors un-opposing, wherein outer doors are curtained by aluminum sprayed HIB, lined by burlap on both sides; (ii) the spray walks nearly mirroring the spray room, comprising layered roof and down pouring water sprays, the latter jetting water about walk ways and between the two walls; (iii) the spray walks comprising lit up floor arrows pointing to spray room destination; (iv) the spray walks with water jets of uninterrupted inflows and out flows, precluding the $CO_2$ with high solubility coefficient in water, entering the basement fire escape.

5. The prototype fire escape models of the off shore rigs with an emphasis on a Detachable Island Rig (DIR) according to claim 1, wherein the off shore rigs with no space for spray walks having provision for less space occupying water tracks to be operative with a track wheeler, the structuring of said water tracks and track wheelers having following provisions—

(a) wherein the water tracks made of concrete are canals dipped into rig floor or set forth above the floor like rail road tracks in metal, wherein the tracks are water filled upon a fire alarm, while precluding an overflow, (b) said track wheeler comprising a shell of enclosure with sloping outer contours is sized for an adult pedaling a child type tricycle, to be riding from a merger track stand of each work station, (c) wherein the track wheeler comprising: (i) jacketing layers of burlap sheathing the underlying aluminum sprayed HIB, as also a covering sheet of burlap, with a heavy bottom dipping into track waters; (ii) two closely set back wheels; (iii) a larger front wheel with a pedaling hardware minimally sized to be wholly accommodated within the wheeler even about a pedaling downward turn; (iv) a back seat sized for 1-2 people, and comprising cushioned back rests and side supports; (v) a front plastic shield and a single wiper blade; (vi) solar head lights, and similarly lit track arrows directing towards the spray room destination; (vii) additional back pedaling without a directional steering for larger vehicles, (d) as an alternative thereof, the track wheeler comprising structuring like a motorized child type tricycle with car like interior foot pedal and rotating steering wheel, a pedaling foot pressure moving the track wheeler, (e) the track wheeler additionally comprising an interior suction device activated upon a fire alarm and deriving water from the water tracks for feeding a set of exterior self-bathing top sprinklers wetting surface burlaps, and a set of interior sprinklers wetting a hung-in burlap attire as also a fire victim.

6. The prototype fire escape models of the off shore rigs with an emphasis on a Detachable Island Rig (DIR) according to claim 1, wherein the off shore rigs with no space for water tracks or spray walks, yet having a provision for spray drives wherein apart from general features of the track drives excepting the suction devising, the spray drives having additional structuring needed of their function, with following provisions—

(a) wherein the spray drives with two widely set back wheels and more height, comprise a top water compartment supplying water to a set of interior sprinklers and to a set of self-bathing exterior sprinklers, the latter drenching the burlap jacketing about the wheeler, (b) wherein further—(i) the spray drive about an interior comprises a bottom basin like receptacle receiving interior sprinkler water; (ii) a devised recirculation from the basin receptacle returning the interior sprinkler water to the top tank; (iii) a bottom exterior water channel also returning down-pouring water to the interior receptacle, (c) and wherein further, the spray drive with an on-off provision of the interior sprinklers saving water for keeping the surface jacketing wet unto a time of reaching the spray room destination.

7. The prototype fire escape models of the off shore rigs with an emphasis on a Detachable Island Rig (DIR) according to claim 1, wherein the off shore rigs exposed to $CO_2$ and CO of a pervasive smoke upon a rig fire, are protected by devised canisters of soda lime, the structuring of the canisters being set forth with following provisions—

(a) wherein the canister of soda lime comprises a fire-proof flat boxed container with a top, a bottom, and two sides permanently closed, while a front panel and a back panel unlocking and unsealing by a remote control upon a rig fire, the canister having approximating dimensions of half foot depth, 3 feet width, and 5 feet height, larger or smaller sizes being not precluded, (b) wherein, in the foregoing, the opened panels falling to the floor upon unlocking, expose pigeon hole like compartments of the canister, wherein pellets of soda lime occupy almost to a full extent, the pellet like structuring of the soda lime setting forth recesses in between for maximum exposure and absorption of the pervading $CO_2$ and CO, (c) and the canisters are light weight being made of sturdy fire-resistant material like CMC or aluminum sprayed HIB, (d) wherein the canisters comprise rubber edging about contacting frame work, to be made air tight upon locking, (e) wherein the canister further comprising a permanent fire-proof spray shade on all sides atop, the shade configured with an upward incline approximating 15-20° from a horizontal plane, to be protecting the soda lime of an unsealed canister from direct sprays of rig sprinklers, (f) the canisters of soda lime are kept in strategic places of the rig, as inside work areas and adjacently about merger water tracks, (g) and wherein in the foregoing, the $CO_2$ can be recaptured from the soda lime to be used for commercial purposes, the most utilitarian being a large scale synthesis of urea, an ubiquitous plant fertilizer.

8. The prototype fire escape models of off shore rigs with an emphasis on a Detachable Island Rig (DIR) according to claim 1, wherein the general purpose entry structure to the underwater basement of the DIR is devised in a model of truck crane bridging from the DIR to a general purpose entry housing, said devised structuring comprising below provisions—

(a) wherein the general purpose entry housing of the underwater basement is set forth about a discrete basement corner of a devised DIR steering side, (b) and said bridging structure from the DIR to the general purpose basement entry, is configured in the model of a truck crane of a drivable truck, the truck positioned within the DIR, (c) wherein the devised bridging crane is minimally inclined, with a crane terminal resting upon, but not connecting with an entry walkway about the general purpose entry housing, (d) wherein further a bridging platform of the drivable truck being set forth in level with work platform of the DIR, (e) and the bridging crane is wholly enclosed and covered with layers of burlaps and self bathing exterior sprinklers, (f) wherein in the foregoing, the general purpose entry housing is set forth above surface waters, whereas an interior basement entry about a floor window is set forth below the surface waters, so as a locked floor window is water sealed if the entry housing above the surface waters is engulfed upon a rig fire, (g) and wherein further, the bridging crane of the drivable truck not materially connected to the entry walkway about the entry housing, is instantly lifted and moved off from the walkway, by the DIR rising to be steered away upon a rig fire.

9. The prototype fire escape models of off shore rigs with an emphasis on a Detachable Island Rig (DIR) according to claim 1, wherein the off site fire escape modular improvised as a fire escape refuge for all types of off shore rigs is structured with special provisions as—

(a) wherein—(i) the fire escape modular comprises a Basement like Room Structure (BRS) and a Towered Top Structure (TTS) atop the BRS; (ii) the modular comprises a wooden barge set forth with metal-shielded sloping edges, said sloping edges set forth with hand rails in equidistance; (iii) the modular comprises a wide staircase structuring outside the BRS, to be accessing the TTS from outside; (iv) the modular comprises a terrace about the TTS to access TTS's a Sliding Door (SD) opening into the TTS; (v) the modular comprises an exterior emergency entry to the BRS, said emergency entry having small mirror image ramps about high set doors, (b) wherein, in the foregoing, the metal SD comprising doors sliding side-wards into walls of the TTS, the SD locked by mechanical means as also by remote controls, (c) wherein, in the foregoing, the BRS comprising—(i) air capsuled flooring set forth about a central area of the wooden barge; (ii) bullet proof glass windows with night vision video monitoring; (iv) a helium filled top compartment, or helium sacs secured about the top, (d) and the interior of the TTS comprising—(i) a spacious hall having bullet proof glass windows; (ii) a wide staircase leading to the BRS; (iii) a break-proof high tower glass enclosure housing a large rotating high beam sky light, lit upon a fire alarm, to be guiding lost crew members in ocean waters, to the modular, (e) the modular is being anchored to bottom of the DIR basement, or to submerged legs, by units of metal strings structured as follows: (i) each unit of strings comprising a pair of metal strings, each string made of narrow caliber metal rods; (ii) adjacent rods of a string are linked by a metal ring, each ring in turn linked to a rod center of a paired parallel string; (iii) preventing sideward bending or sinking, said structuring keeping desired axial lengths of the strings precluding the modular floating closer to the rig; (iv) intermittently, the metal rods of the strings are configured as air filled cylinders in a manner that the strings may not float to surface waters, yet carry their own weight, imposing no strain upon the rig, (f) wherein the units of metal strings are subject to anchor adjacently coursing electric or solar powered heating coils, and lights, (g) and powerful jets of water about the edges of the modular barge platform, distancing a spreading fire of oil laden surface waters, (h) wherein the modular is set forth on an erected leg with no devised air gap, its structuring comprising: (i) a barge like base platform accessible to a single rescuer; (ii) few rod attachments to the rig, to be anchoring heating coils and solar powered lights; (iii) a high set BRS door entry having two doors with small mirror image ramps about thresholds of differing heights, a lower set door closed upon flooding of the barge hit by high ocean tides, (i) and wherein further, the off site fire escape modular upon a rig fire, being a sole destination for: (i) rig crew without an in site fire escape unit; (ii) strayed crew members in ocean waters; (iii) fire fighters of the DIR evacuating the stationary rig; (iv) the crew failing to enter the underwater fire escape before the fire escape entry was locked; (v) critically wounded fire victims to be air lifted to coastal facilities.

10. The prototype fire escape models of the off shore rigs with an emphasis on a Detachable Island Rig (DIR) according to claim 1, wherein the DIR and the off shore rigs, to be safe-guarded against a rig fire, having additional provision of multiple exiting slide tubulars from remote and upper level work stations, a structuring of the exiting slide tubular comprising following provisions—

(a) wherein the exiting structure of the slide tubular about a remote work station comprising a structure resembling a shower cubicle with high caliber sprinklers, and an inch of water stagnation about a raised floor structuring, (b) wherein further, a deeper safe side corner free of sprinklers and free of water pooling, comprising a raised floor entry to a lit up slide tubular leading to a flat ocean terminal with a bolted water tight door, the door staying open upon unbolting, (c) wherein said slide tubular comprises hand rails, and occasional foot pedals on either side for a course to be punctuated by speed-breakers, (d) wherein further, an exiting person having a devised set up comprising either one of following options: (i) when the flat terminal is subject to hoarding a boat, the person getting to surface waters; (ii) as an alternative thereof, the exit tubular optionally terminating into an in site fire escape unit, (e) wherein, in the foregoing, exiting crew swim up to surface of shallow waters to be reaching the off site fire escape modular, with ocean course warmed up by heating coils, (f) wherein furthermore, the course of the tubular through an air gap is guarded by multiple burlap layers with self-bathing sprinklers, put on by a fire alarm, (g) wherein the slide tubular of the DIR curves by an edge of the stationary rig, being protected by self-bathing surface sprinklers, a lift boat being a suitable provision at the terminal, the boarders being injured fire fighters, (h) while additionally, the underwater slide tubular and the flat terminal incorporated as modular structures, comprise strategically placed under water air capsules, making the structures light weight, whereas the tubular is furthermore supported by vertical, horizontal, or tangential bars from adjacent rig structures, (i) and in icy zones wherein surface waters are frozen, it is mandated that the ocean surface about a rig vicinity is warmed up by heating coils creating a fluid zone, and a specially devised life or lift boat for icy zones, is being hoarded about the flat terminal, whereas connecting the exiting tubular to an in site fire escape unit is always a better option.

11. The prototype fire escape models of off shore rigs with an emphasis on a Detachable Island Rig (DIR) according to claim 1, wherein the DIR and the off shore rigs comprising additional provisions to safe guard interiors and exteriors of the rig against a gas fueled fire, said provisions being set forth as below—

(a) wherein the rigs comprising chimney structuring about roof tops of roomed enclosures, the chimneys improvised with wide outlets, to let off the lighter inflammable gases, (b) wherein further the rigs comprising circuiting air tubing opening about a midlevel of roomed interiors, wherein an air flow through the tubing is made maximally forceful upon a gas alarm, filling the interiors with pressured air, a devising of the circuiting air tubing being set forth as below: (i) in the DIR with no air gap or in a jack up rig with an air gap, exiting air tubing about a safe side away from the conduction platform, after leaving the rig making an inverted U turn above water surface, preventing ocean water entering submerged areas of the DIR, said U tubing hung to the rig wall or a leg; (ii) the tubing further coursing few feet vertically down underwater, to then turn to ocean side in an incline, to be rising to ocean surface at a distance, wherein each tube passing through a large cubical or a rectangular block of air capsule terminates into a large inverted J structure or a chimney like surround, precluding ocean waters entering the air tubing; (iii) the air capsule by comprising more of top air volume, a lower heavy base supports the erected top J structure or chimney surround of the air tubing; (iv) multiple air tubing of large caliber light weight metal duct subject to compensating for any compromised member; (v) the air tubing is further supported by paired strings of overlapping metal rods, causing the terminal air capsule maintaining set forth linear distance from the rig; (vi) the air tubing being set forth in a size and number proportional to a rig size, (c) wherein the rig interiors in conjunction further comprising short stemmed up-tilted fans, to drive away inflammable gases from entering the roomed interiors, or fan away entered gases through the roof chimneys, (d) and furthermore, tall and hefty structures of a rig comprising—(a) appended outer metal grid of fans protected by self bathing sprinklers to blow away approaching gases skyward, the grid dismantled before dismantling the tall and hefty structures; (ii) wherein said fans made of light weight metal, comprise minimal stems and spiked blades spanning about five feet, two blades being functionally optimal.

12. The prototype fire escape models of off shore rigs with an emphasis on a Detachable Island Rig (DIR) according to claim 1, wherein the model of the basement fire escape entry of the DIR with the schematic of a water seal upon a rig fire, being also a schematic for an in site fire escape unit for the crew of a jack up rig, whereas the rig itself is salvaged by emergent helicopter air-drop of fire resistant HIB struts, cutting off oxygen and smothering of flames, either of the models having provisions as below—

(a) wherein a jack up rig based fire escape entry about a spray room, upon a gas fueled rig fire, is subject to having a water seal created by an incomplete shell of water enclosure said enclosure comprising: (i) a four walled outer structure and a four walled inner structure, either one having a bottom, but nether having a top structure, and water circulating between the inner and outer structures, wherein said outer structure having lower set walls than said inner structure; (ii) a rooming interior of the water enclosure comprising a Top Sliding Room (TSR) in level with flooring of the spray room, and a sunken Water Seal Room (WSR) set forth below the spray room, the rooms separated by a floor structure of the TSR, said floor structure having a window opening to the WSR, said window opening having a horizontally sliding moving window closure; (iii) a sliding unit slants down about the window opening, said sliding unit originating about a top area of the TSR to be reaching a bottom area of the sunken WSR, said sliding unit comprising a top structure, a bottom structure, and an intervening gap about the window opening; (iv) a spray room (iv) a stair case structured about the fire escape entry of the spray room, is set forth to be accessing the top structure of the sliding unit about the water enclosure; (v) the WSR floor comprises a down going curvilinear slide tubular leading to a modular underwater fire rescue station, large rigs comprising multiple fire escape entry rooms and equal number of said modular fire rescue stations; (vi) a stair case comprising a C or S configuration with a gradual sloping may substitute the sliding unit about the water enclosure, as also the curvilinear tubular leading to the fire rescue station, said C or S staircase facilitating transporting fire victims to the fire rescue station, (b) wherein in the foregoing, said curvilinear tubular about the WSR floor terminates into an entry room about the fire rescue station, said entry room having glass windows and a water tight entry door to a main rescue unit, (c) wherein further—(i) the curvilinear tubular comprising partitioned multiple sliding structures when set forth as a sliding tubular; (ii) the curvilinear tubular comprising water feeders originating about deeper oceanic waters and traversing the tubular to filling the water enclosure, creating an over flow and a water fall about the lower-set outer walls of the water enclosure, wherein the water fall flows into a surrounding tub, wherefrom the water is being continuously let out, precluding a flooding of the spray room, (d) wherein upon a rig fire: (i) each crew member after remotely opening the sliding window door about the TSR, slides through the sliding unit, while the window door is automated to close in few seconds; (ii) upon a gas-fueled fire spreading to the spray room, at least few wax-filled parts of the inner wall of the water enclosure below the top risen part instantly melting, for the water to flow down into the TSR, water sealing the window closures, while also the TSR window closures are subject to shutting upon a gas alarm about the water enclosure, (e) the sunken WSR stands upon a sturdy support structure coursing from one leg to another, said support structure materially similar as the legs, (f) wherein in the foregoing the underwater fire rescue station is secured to two legs with overlapping rod structures, avoiding collision injury with the legs, (g) the fire rescue station further comprising an air compartment atop, a resultant buoyancy imparting no undue strain upon the legs, (h) the fire rescue station furthermore comprising an emergency exit door articulating with a staircase tubular opening into a marine rescue unit, the crew exiting with protective SCUBA equipment, (i) the fire rescue station additionally having a protective surface guard traversing between two legs, and spanning lengthwise dimension of the fire rescue station, to be obstructing and diverting a heavy falling structure upon a rig fire, said surface guard comprising safeguarding features as set forth below: (i) additional supporting chains from the legs, the chains having redundant length, not to be taking damaging impact of a falling structure; (ii) an air capsule structured to be larger about rig side, creating a downward incline about ocean side, letting a fallen object tumble into the water; (iii) a spanning bottom comprising magnets with lower magnetic poles similar as adjacent magnets studded atop the modular, repelling an impact upon a damaging fall of the surface guard, (j) wherein the surface guard not resisting a fallen weight and breaking from the legs, the modular is yet protected by the surface guard resisting sinking by the imparted buoyancy and staying in place yet by the redundant chains that escaped the impact of the falling object, (k) the jack up rig additionally comprising multiple exiting slide tubulars from work stations remote from the spray room, and optionally reaching the underwater fire rescue station(s), (l) whereas the underwater fire rescue station is devised to protect the crew, the rig itself is subject to be protected by emergent helicopter air-drop of HIB Struts (HIBS) devised to extinguishing a rig fire, (m) wherein the HIBS of a pliable aluminum vaporized light weight HIPPA blanket comprises a wide rectangular sheet with a spread out length of 48 feet, a width of 6-8 feet and a thickness of 13 mm, wherein the lengthwise dimension is folded twice to minimize the length to 16 feet, a closely woven water drenched burlap sheet made of jute fiber being used similarly, (n) said HIBS comprising a central pivot, and on either side about the lengthwise dimension two thin flexible strut ribs made of a CMC or of a thermoplastic with memory, the strut ribs holding about an under-surface a sheet of HIB comprising similar dimensions, (o) wherein—(i) the flexible strut ribs on either side comprising three strut segments folding twice inwards, an outer segment folding onto a middle segment, and the outer-middle segments together folding onto an inner segment, wherein the segments conforming to ⅓$^{rd}$ of the spread out rib frame; (ii) the strut ribs upon fully folding, a bend about the outer and middle segments subject to be positioned near a small perforation about the central pivot; (iii) the strut furthermore comprising two central ribs spread out from the central pivot, positioned about widthwise dimensions of the HIB sheet, (p) wherein the HIB sheet further comprising eyelets about terminal lengthwise dimensions to be held by terminals of the strut segments stretching about the lengthwise dimensions, (q) and upon the lengthwise rib frame unfolding by strut air drop, the released HIB from the under surface of the HIBS falling onto a fire zone, smothering flames and cutting off oxygen, while the HIB comprising HIPPA resisting temp up to 1600° C., (r) said HIBS further comprising lengthy Ultra High Molecular Weight Polyethylene (UHMWP) strands originating from the folds about the outer and middle segments near the central pivot, and the strands after passing up through the HIB as also through the central perforation of the strut frame finally conjoining upon passing through a metal tubing: (iii) and a helicopter pilot subject to holding said metal tubing and the conjoined UHMWP strands, (s) wherein, upon sliding the folded strut comprising metal tubing a foot down from the aircraft, the pilot cutting off all the UHMWP strands below their conjoining, whereupon the strut segments with memory unfolding and air-dropping the bottom HIB onto the fire zone, (t) wherein further, the whole strut frame can be retrieved by the lengthy UHMWP ropes that connect the center of the strut frame to the metal tubing, held by the pilot, (u) and furthermore, the pilot in the aircraft carrying multiple struts, air dropping them in rapid succession upon the fire zone.

13. The prototype fire escape models of off shore rigs with an emphasis on a Detachable Island Rig (DIR) according to claim 11, wherein the fire escape units of the DIR and the off shore rigs, upon a rig fire, receiving unlimited fresh air supply from air tubing originating about the fire escape units and terminating about nearby oceanic waters a devising of said air tubing is as set forth below—

(a) wherein, in the DIR with no air gap or in the jack up rig with an air gap, a set of originating air tubing from a tub about an opposite side of the entry of the fire escape unit, after leaving the unit comprising a structuring as below—(i) the air tubing makes an inverted U turn above water surface, said U tubing hung to a rig wall or a leg by holders; (ii) the air tubing further coursing few feet vertically down underwater to then turning to ocean side in an incline, to rise to ocean surface at a distance, wherein each tube passing through a large cubical or rectangular block of air capsule, terminating into a large inverted J structure or a chimney like surround, precluding ocean waters entering the tubing; (iii) the air tubing conforming to multiple large caliber light weight metal duct tubing, are subject to compensating for any compromised member(s); (iv) the multiple air tubing anchoring to paired strings of overlapping metal rods, facilitate the terminal air capsule(s) to be maintaining set forth linear distance from the rig, (b) wherein said air capsule(s) comprising more of top air volume and lower heavy base(s), steadying the erected top J structure or chimney like surround, (c) wherein further, the air tubing about the originating tub comprising a provision of suctioning-in fresh air while forcing out pervading smoke through a second tub located about the fire escape entry, (d) wherein said second tub located about the fire escape entry comprising a set of inverted J tubing, is subject to suctioning out the smoke entering the fire escape unit, (e) wherein said inverted J tubing of the tub near the fire escape entry comprising—(i) a longer vertical limb terminating into deeper oceanic waters, the carbon dioxide of the smoke with an exceptional diffusion and solubility coefficient in water, is not subject to returning to the surface; (ii) an inverted U turn of the J tubing set forth above surface water lets out the smoke of the submerged fire escape unit into the ocean water, whereas the ocean water is not let into the fire escape unit; (iii) the U curving of the inverted J tubing rising above the surface waters is protected by layers of burlaps and self-bathing sprinklers, (f) and the rigs comprising air tubing in a size and number proportional to the size and numbered crew of the rig.

14. The prototype fire escape models of off shore rigs with an emphasis on a Detachable Island Rig (DIR) according to claim 1, wherein the life boats of the off shore rigs to be swiftly and safely operable upon a rig fire, have special provisions needed of such functions, as devised below—

(a) wherein—(i) the life boat comprises fire resistant surface, train wagon wheels, hanging ladder about one side, and a watertight compartment storing basic medical rescue supplies; (ii) said train wagon wheels are subject to be deployed by nailing wheel suspension frame work to edges of the boat; (iii) the boat about water exposed bottom having a fire resistant CMC surface layer to be safe-guarded from spreading fire upon oil-laden surface waters, (b) wherein further the boat is painted white, while having intervening black stripes about a side of the ladder, to be identified as a side to be approached, (c) wherein further, to preventing toppling of the boat with a boarder climbing up the ladder a boat's hemi-section about opposite side of the ladder being built heavier while the ladder side of the boat is subject to comprising a light metal air capsule running about submergible lengthwise bottom of the boat, (d) the life boat furthermore comprising secured oars, built-in break resistant lighted compass, a GPS unit, and a disengaging snapping joint of an anchoring metal chain to the rig, (e) the life boat furthermore comprising a solar powered light source, put on by remote control upon a rig fire happening about a nightfall, (f) the life boat furthermore comprising strategically placed maneuvering bars and surface rubber guards, (g) wherein further, for the life boats in a jack up rig, a boat deck and a boat exit comprising structuring as below: (i) said boat deck having rail road like tracks reaching the ocean surface across a sloping incline of an exiting ocean tubular wholly covered and supported by vertical beams from horizontal cross bars of a leg, said horizontal bars further supported by underwater air-capsuled metal blocks, imposing minimal strain upon a leg; (ii) said life boats being restrained by chains about a sloping deck; (iii) said sloping deck comprising said rail road like boat-tracks making a smooth L-turn, wherein sideward hand rails supporting a boarder about the sloping tracks; (iv) said ocean tubular having interior spray poles and exterior self-bathing sprinklers; (v) said ocean tubular about a ocean terminal having up tilted fans blowing away approaching gases; (vi) said tubular terminal and the leg nearby having rubber guards about a level of surface waters; (vii) the ocean terminal furthermore having an air tight car garage like down sliding closure, opening upon a remote control; (viii) wherein the boats are unrestrained, a horizontally moving cross bar letting passage of each boat by a control from within as also from outside; (ix) the boat deck is made into a spray-deck in a rig with no designed fire escape, wherein a spray wheeler is driven to the deck, for exiting to the off site fire escape modular by mobilizing a life boat, (h) for a life boat in a DIR, a boat enclosure facing ocean side, having following safe exiting plan: (i) the boat enclosure with down sloping floor is devised triangular about a vertical plane, the floor of the triangle about a horizontal plane conforming to a down sloping 105° angle about rig side, a 30° angle about ocean side, whereas a down sloping roof conforming to a diagonal, while a straight rising rig side wall of the enclosure with no incline conforming to 90° angle; (ii) a boat within a closed enclosure is restrained upon the sloping floor by a down sloping diagonal roof; (iii) said down sloping roof with terminal rubber guards conforming to a down sloping ramp when slid completely into ocean waters upon a remote control; (iv) the wheeled boat thereupon unrestrained, sliding down the sloping floor and the sloping ramp onto the ocean waters; (v) wherein more acute the ocean side angle of the triangular enclosure is, lengthier is the diagonal roof and smoother is a boat descent onto the sloping ramp; (vi) for the sloping roof to be sliding down through sideward ramp tracks, the ramp tracks are being set forth in a same sloping plane as the down sloping roof; (vii) and a gas fueled deck fire is being minimized by the boat decks built about a far side of the conduction platform, as also more often the DIR being steered away early on, (i) in a different embodiment the DIR boat exit comprising a devising as below: the boat enclosure is structured with a car garage like sliding closure, a sloping floor, and rail road like tracks, the boats upon the tracks exiting to the ocean surface by a remote control from within or from outside wherein, the boat wheels comprising staple-grooves, precluding de-grooving about the sloping tracks, (j) yet in another embodiment encompassing a moderately high deck of the DIR, the boat exit is made as a short ocean tubular with supporting tangential cross bars from the DIR, wherein the boats are released from within or from outside by a remote control, (k) and encompassing the rigs of icy zones, the boats having additional provisions for maneuvering over solid blocks of ice amidst ocean waters, said provisions comprising: (i) bicycle like rotating wheel pedals about a boat interior, two wheel-pedals on either side being hand maneuvered by a single boarder, wherein a devised hardware of the hand pedals traversing boat walls is set forth with water-proofing rubber washers; (iii) wherein further, the wheels are high set, to exceed a scalloped bottom of the boat only by 2-3 inches, whereby the wheels can maneuver the boat from the ocean waters, onto overhanging solid blocks of ice; (iv) the boat oars having shovel like pedals, said pedals set forth with sharp metal edges.

15. The prototype fire escape models of off shore rigs with an emphasis on a Detachable Island Rig (DIR) according to claim 1, wherein the lift boats are devised to lifting severely injured fire victims from ocean waters, the lift boat in a hammock model, apart from the general features of a life boat, having special features needed of designed functions of the boat, as set forth below—

(a) wherein said hammock model lift boat comprising: (i) a flat base and a barge on either side, a rescue barge of one side being structured for rescuing an injured fire victim; (ii) on the side of said rescue barge, the boat comprising a wide bottom window, a window door opened by up-sliding, or, the window comprising a zippered plastic closure, the closure flap when unzipped on three sides, rolling up to be secured atop; (iii) the rescue barge structured with buckling belts, wherein by unbuckling, a fire victim is pulled into the boat upon a sturdy plastic sheet, through the boat window ramped on either side; (iv) a submerging rescue side of the boat as also a submerging bottom of the rescue barge comprising light metal air capsules running lengthwise, keeping the rescue side from swaying down by weights of the boarders; (v) the boat and the barges about water exposed bottom, having a surface layer of a CMC, to be safe-guarded from spreading fire on oil-laden ocean surface, (b) wherein, the rescue barge further having appended structures comprising: (i) a four feet length netted burlap panel of a lift hammock having a metal reinforced bottom burlap pouch, the latter set forth as a standing structure to a rescuer and the fire victim, the lift hammock being hung to the edge of the rescue barge, while a zipped enclosure about the rescue barge securing the lift hammock; (ii) a front inflated neck-chest harness fastened to the victim to be lifted onto the rescue barge, while keeping the head side afloat, (c) and the barge about the other side of the rescue barge, devised as a storage unit, comprising storage barge, comprising: (i) a locked-in box with an unbreakable glass panel, the lock having an appended key and a glowing key hole; (ii) said locked-in box comprising two boat oars; medical supplies; a solar powered suction device for clearing water from a boat's interior; and a solar powered heating coil.

16. The prototype fire escape models of off shore rigs with an emphasis on a Detachable Island Rig (DIR) according to claim 1, wherein the lift boats of the rings in an air inflated lift mattress model, apart from having the general features of a life boat, having special features needed of designed functions of the boat, as set forth below—

(a) wherein said air inflated lift mattress model of a lift boat comprising: (i) a burlap sheathed lift mattress having a wedged configuration in an end-on vertical cut section of the boat, said burlap sheath having eye-lets for a rescuer to invert the lift mattress from the boat onto rescue side of the ocean surface; (ii) a minimally concave side of the inverted lift mattress with a ramped incline conforming to be a side for rolling-in the victim, and belt-bucking there upon; (iii) yet another concave side of the lift mattress set forth to abutting the rescue side of the boat; (iv) a flat side of the lift mattress subject to stay upon the rescue side of the ocean surface; (v) an air inflated receiving mattress is subject to be positioned against the rescue side of the boat interior by the rescuer upon boarding, said receiving mattress about an end-on vertical cut section of the boat, approximating to a hemi-section of the boat; (vi) the rescue side of the boat comprises identifying black stripes, while the whole boat is painted white; (vii) the lift mattress and the receiving mattress additionally having a layer of HIB material with a sealing of aluminum vapor to at least saturate the surface layer underneath the covering of the burlap layer, (b) wherein further, about the rescue side of the boat, the rescuer is subject to boarding the fire victim into the boat in a preconfigured manner, as set forth below: (i) the rescuer inverts the lift mattress from the boat onto the ocean surface, so as the concave side with buckling belts conforms to a ramped sloping top; (ii) the rescuer then maneuvers thin mattress edge of the lift mattress to for rolling the victim onto the lift mattress, and belt-buckling his torso and a leg positioned about boat side; (iii) the rescuer then boards and positions the receiving mattress to be abutting the interior of the rescue side, so as, the mattress side with the buckling belts conforms to a ramping top; (iv) there upon, the rescuer slides the head side and then the leg side of the victim onto the receiving mattress, for belt-buckling him thereupon; (v) there after, upon an incline of un-buckled belts of the receiving mattress, while the belts kept taut by a firm foothold, the rescuer slides down the head side and then the leg side of the victim onto a padded hard board inside the boat, (c) and, the lift mattress model is better elected for existing boats, wherein the mattress structures can be appended, whereas the hammock model lift boat is better structured as a new boat.

17. The prototype fire escape models of off shore rigs with an emphasis on a Detachable Island Rig (DIR) according to claim 1, wherein the prototype DIR and the underwater basement are modified to be built with no legs about an elected coast line of a natural island in a distant off shore, as also in islands about great oceanic depths, said modified structural measures being set forth as below—

(a) wherein inhabited as also uninhabited natural islands clustering many a coast lines, are subject to naturally having island coast lines about a same level or slightly higher than adjoining ocean waters, wherein a surface demolition about the coast line is subject to effectuating stationing of the DIR and of a submerged basement, (b) wherein further, legs from ocean bed are not required of, in said model of the natural island base, (c) wherein in the foregoing, a modified natural island based DIR is built with means and methods as set forth below: (i) a chosen land site few yards away from the coast line is excavated to build above water stationary rig and under water basement, the latter in a required depth below water level; (ii) surface layers of said intervening few yards about the coast line are demolished for the in-flowing ocean water to be submerging the basement; (iii) a modular conduction platform is deployed as an extended structuring from the stationary rig into the ocean where after a steered in prototype DIR is locked onto the basement, (d) and as an alternative thereof, said surface layers about the coast line are demolished after a leveled flat ground is prepared about an elected site, following which a modular basement with wheels and a bottom air capsule is submerged after water filling the air capsule, where upon the prototype DIR is locked on to the basement, to be partly submerged, (e) wherein about the foregoing, two prevalent natural island topographies are—(i) an ideal stump like projectile coast line, wherein three sides of the rig base are open to the ocean; (ii) a linear coast line with only one side open to the ocean, wherein the conduction platform and the fire-proof corridor are subject to be built as sturdy extended structuring into the ocean, and are designed for a perpendicular conjoining with the stationary rig, facilitating direct access of ocean waters to the steering station, for an automated straight course when the DIR needs to be steered away, (f) (i) an adjacent terrestrial territory is cleared of trees and shrubbery to be not fire prone, and to be accommodating the off site fire escape modular; (ii) and, as a better alternative thereof, with an extended ground excavation and ocean water in-flowing, an air-capsuled off site fire escape modular can be set afloat, not far from the DIR; (iii) the off site fire escape modular is firmly anchored by many chains to the adjacent terrestrial ground so that its destined position away from the DIR is not changeable, (g) wherein about the modified DIR and the air capsuled underwater basement, the basement is locked to the leveled flat ground, with lower components of locking hardware firmly affixed to the cemented ground, to resist climatic perturbations, (h) in rigs about great oceanic depths, an encompassing greater lengths of a riser comprises intermittent supports of overlapping metal rods affixed to adjacent island structures, whereas fluidity of waters is preserved by heating coils for well digging and later well sustenance, (i) the modular basement with air capsule along with the air-capsuled DIR serving as a model for a partially submerged oceanic DIR With No Leg (DWNL) supports wherein, in the devised model, before the DIR is detached upon a rig fire, a pre-determined amount of water is being added to the basement's air capsule, so as the basement maintains a same depth of submersion even after the DIR detachment, for a needed water seal to the fire escape entry, (j) and a model wherein four sides of the DWNL comprising Water-Wind Shifting Compartments (WSC) to be stabilized in turbulent surface waters, is as set forth below—(i) the WSC, a shell like outer compartment of the rig and a partition divides comprising partitions dividing the WSC into mirror image structures in Length Wise Dimensions (LWD) as also in Width Wise Dimensions (WWD), wherein each WSC communicating with the WSC of an adjoining side; (ii) the WSC on all four sides further comprising Water or Wind Entry-Exit windows (WEW), facilitating turbulent water or wind entering the WEW from a same direction of turbulence, but exiting from the WEW of the adjoining sides, whereby prevailing directional force of turbulence is shifted sideward into opposite direction, to be also subdued, thus countering the forces of the turbulence, said devising applicable to all four geographical sides; (iii) wherein four corners of the DWN are wired to sea floor anchors, conjoining said wiring in a horizontal plane by similar structures as the WSC and WEW in vertical equidistance, causing diverting and countering a thrust of deeper water turbulence from any direction; (iv) and by an imperceptible cleavage and opening of the WSCs about the steering side, the DIR can steer forwards from the stationary rig upon an uncontrollable fire.

* * * * *